(12) United States Patent
Shim et al.

(10) Patent No.: US 10,712,848 B2
(45) Date of Patent: Jul. 14, 2020

(54) ELECTRONIC DEVICE

(71) Applicant: Samsung Electronics Co., Ltd., Suwon-si, Gyeonggi-do (KR)

(72) Inventors: Won-Geun Shim, Yongin-si (KR); You-Bi Seo, Seoul (KR); Joon-Il Kim, Seoul (KR); Jeong-Min Park, Hwaseong-si (KR); Yo-Ywang Im, Suwon-si (KR); Dong-Ho Jang, Hwaseong-si (KR); Yong-Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 15/370,350

(22) Filed: Dec. 6, 2016

(65) Prior Publication Data

US 2017/0205923 A1    Jul. 20, 2017

(30) Foreign Application Priority Data

Jan. 14, 2016    (KR) .................. 10-2016-0004858

(51) Int. Cl.
*G06F 3/041* (2006.01)
*G06F 3/044* (2006.01)
*G06F 3/14* (2006.01)

(52) U.S. Cl.
CPC ............ *G06F 3/0412* (2013.01); *G06F 3/044* (2013.01); *G06F 3/0416* (2013.01); *G06F 3/1423* (2013.01); *G06F 2203/04102* (2013.01)

(58) Field of Classification Search
None
See application file for complete search history.

(56) References Cited

U.S. PATENT DOCUMENTS 8,665,236 B2    3/2014    Myers
2013/0076612 A1    3/2013    Myers

FOREIGN PATENT DOCUMENTS

| CN | 103747123 A | 4/2014 |
| KR | 10-2014-0039961 A | 4/2014 |
| KR | 10-2015-0042123 A | 4/2015 |
| WO | 2014/091829 A1 | 6/2014 |

*Primary Examiner* — Brian M Butcher
(74) *Attorney, Agent, or Firm* — Jefferson IP Law, LLP

(57) ABSTRACT

A display that surrounds the external appearance of an electronic device is provided. The electronic device includes a housing that includes a first surface, a second surface opposite to the first surface, and a third surface formed of a side surface that encloses the space between the first and second surfaces, wherein each of the first to third surfaces are includes a material capable of transmitting light, a first display disposed in the housing adjacent to the first surface, a second display disposed in the housing adjacent to the second surface, and a third display that is disposed in the housing adjacent to the side surface and extends from the edge of the first display to the edge of the second display, wherein the first to third displays are disposed to substantially provide a display region to a whole surface of the housing.

23 Claims, 43 Drawing Sheets

ELECTRONIC DEVICE

CROSS-REFERENCE TO RELATED APPLICATION(S)

This application claims the benefit under 35 U.S.C. § 119(a) of a Korean patent application filed on Jan. 14, 2016 in the Korean Intellectual Property Office and assigned Serial number 10-2016-0004858, the entire disclosure of which is hereby incorporated by reference.

TECHNICAL FIELD

The present disclosure relates to an electronic device of which the whole external appearance is surrounded by a display.

BACKGROUND

Recently, various electronic devices, such as a cellular phone, a Moving Picture Experts Group phase 1 or phase 2 (MPEG-1 or MPEG-2) audio layer 3 (MP3) player, a portable multimedia player (PMP), a tablet personal computer (PC), a Galaxy Tab, an iPad, and an electronic book terminal, have been provided to users, and the users can access various types of content while carrying them.

With the rapid development of information and communication technologies, electronic devices have a variety of functions, such as a music and video playback function, a game function, a camera function, a scheduling function, a dictionary function, and the like, in addition to their own original functions, in order to meet users' demands. The electronic devices also allow searching for various types of information and the ability to add new applications.

For example, the electronic devices are used in various tasks, such as word processing, social media networking, and games, and these tasks are performed by touching the screen of a display.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display on the front surface thereof, but not on the rear surface thereof so that the existing electronic devices cannot perform display through the whole exterior thereof.

Another aspect of the present disclosure is to provide an electronic device that can perform display through the whole exterior thereof.

In accordance with an aspect of the present disclosure, an electronic device is provided. The electronic device includes a housing that includes a first surface, a second surface opposite to the first surface, a second surface opposite to the first surface, and a third surface formed of a side surface that encloses the space between the first and second surfaces, wherein the first to third surfaces are formed of a material capable of transmitting light, a first display disposed in the housing adjacent to a first surface, a second display disposed in the housing adjacent to the second surface, and a third display disposed in the housing adjacent to the side surface and extending from the edge of the first display to the edge of the second display, wherein the first to third displays are disposed to substantially provide a display region to a whole surface of the housing.

According to the various embodiments of the present disclosure, the whole exterior of the electronic device is constituted by multiple displays so that it is possible to display content in cooperation with each other on all the displays of the electronic device, thereby easily delivering visual information through the displays of the product, making the design of the product appealing, and enhancing the aesthetic impression of the design. In addition, according to the various embodiments of the present disclosure, it is possible to display appealing design in low-power/standby states of the product and freely change the exterior design of the product.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
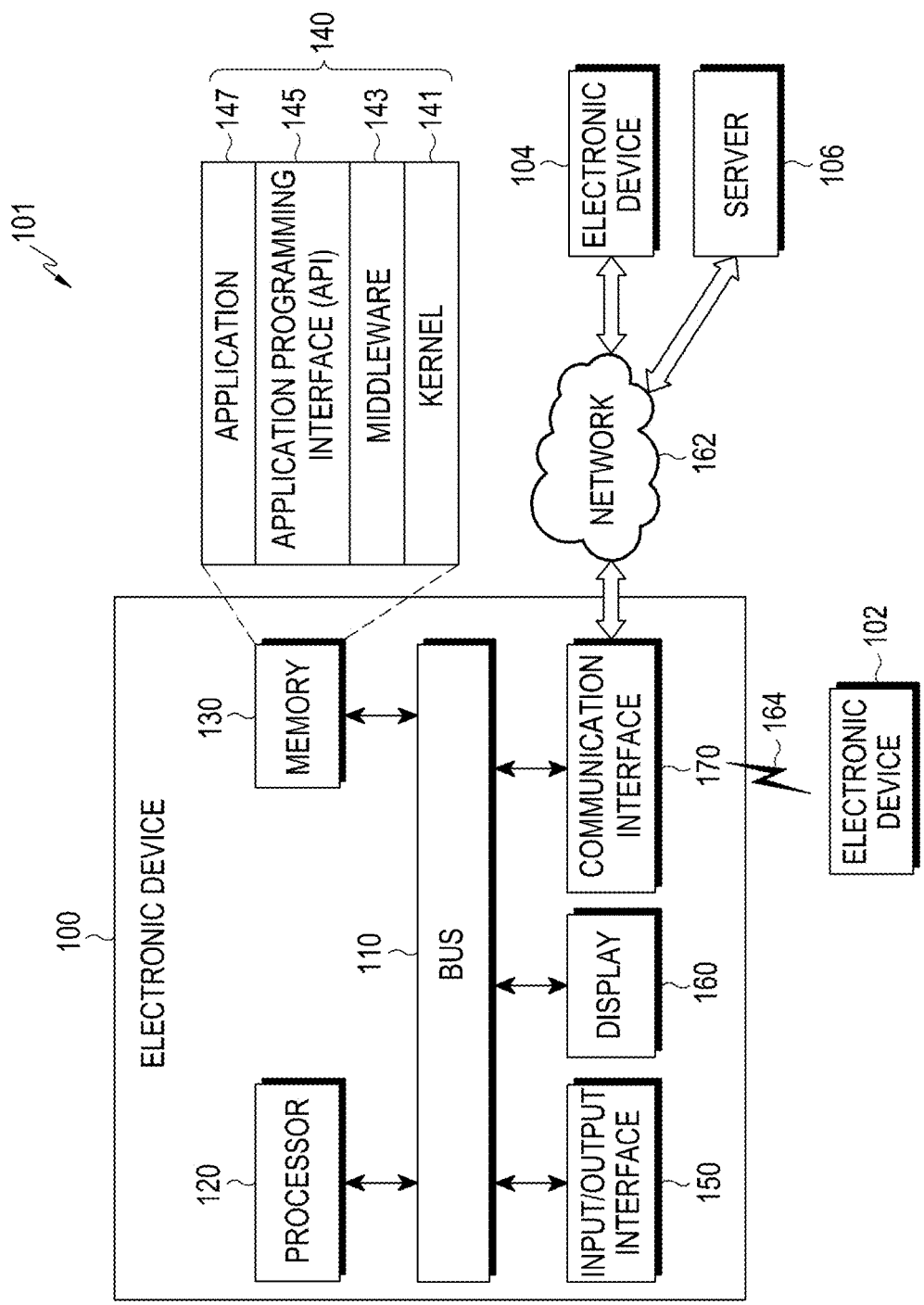
FIG. 1 is a block diagram of a network environment that includes an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no elements (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude various embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to various embodiments of the present disclosure, the electronic device may be a home appliance. The home appliance may, for example, include at least one of a television (TV), a digital video disc (DVD) player, an audio player, a refrigerator, an air conditioner, a cleaner, an oven, a microwave oven, a washing machine, an air purifier, a set-top box, a home automation control panel, a TV box (e.g., HomeSync™ of Samsung, Apple TV™, or Google TV™), a game console (e.g., Xbox™, Playstation™), an electronic dictionary, an electronic key, a camcorder, and an electronic frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram of a network environment that includes an electronic device according to various embodiments of the present disclosure.

Referring to FIG. 1, an electronic device 100 within a network environment 101, according to various embodiments is described. The electronic device 100 may include a bus 110, a processor 120, a memory 130, an input/output interface 150, a display 160, and a communication interface 170. In some embodiments, the electronic device 100 may omit at least one of the elements, or may further include other elements.

The bus 110 may include, for example, a circuit that interconnects the elements 110 to 170 and transfers communication (e.g., control messages and/or data) between the elements.

The processor 120 may include one or more of a CPU, an AP, and a communication processor (CP). For example, the processor 120 may carry out operations or data processing relating to the control and/or communication of at least one other element of the electronic device 100.

The memory 130 may include a volatile memory and/or a non-volatile memory. The memory 130 may store, for example, instructions or data relating to at least one other element of the electronic device 100. According to an embodiment, the memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, the memory 130, etc.) that are used for performing operations or functions implemented by the other programs (e.g., the middleware 143, the API 145, or the application programs 147).

According to the various embodiments of the present disclosure, the kernel 141 may provide an interface by which the middleware 143, the API 145, or the application programs 147 may access the individual elements of the electronic device 100 to control or manage the system resources.

The middleware 143 may function as, for example, an intermediary that allows the API 145 or the application programs 147 to communicate with the kernel 141 to exchange data.

According to the various embodiments of the present disclosure, the middleware 143 may process one or more task requests, which are received from the application programs 147, according to priorities thereof. For example, the middleware 143 may assign a priority for using the system resources (e.g., the bus 110, the processor 120, the memory 130, etc.) of the electronic device 100 to at least one of the application programs 147. For example, the middleware 143 may perform scheduling or loading balancing on the one or more task requests by processing the one or more task requests according to the priority assigned to the at least one application program.

The API 145 is, for example, an interface by which the applications 147 control functions provided from the kernel 141 or the middleware 143, and may include, for example, at least one interface or function (e.g., instruction) for file control, window control, image processing, text control, etc.

The input/output interface 150 may function as, for example, an interface that may transfer instructions or data input from a user or an external device to the other element(s) of the electronic device 100.

According to the various embodiments of the present disclosure, the input/output interface 150 may output instructions or data received from the other element(s) of the electronic device 100 to the user or the external device.

Examples of the display 160 may include a liquid crystal display (LCD), a light-emitting diode (LED) display, an organic LED (OLED) display, a micro electro mechanical systems (MEMS) display, and an electronic paper display. For example, the display 160 may display various types of content (e.g., text, images, videos, icons, symbols, etc.) to a user. The display 160 may include a touch screen and may receive, for example, a touch, gesture, proximity, or hovering input using an electronic pen or a part of the user's body.

The communication interface 170 may configure, for example, communication between the electronic device 100 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM) as a cellular communication protocol. According to one of the various embodiments of the present disclosure, the wireless communication may include, for example, short range communication 164. The short range communication 164 may include at least one of, for example, WiFi, Bluetooth, near field communication (NFC), global navigation satellite system (GNSS), etc. The GNSS may include at least one of, for example, a GPS, a global navigation satellite system (Glonass), a Beidou navigation satellite system (hereinafter referred to as "Beidou"), and a European global satellite-based navigation system (Galileo), according to the place of usage, a bandwidth, etc. Hereinafter, the "GPS" may be used interchangeably used with the "GNSS" in the present disclosure. The wired communication may include, for example, at least one of a universal serial bus (USB), a high definition multimedia interface (HDMI), recommended standard 232 (RS-232), and a plain old telephone service (POTS). The network 162 may include at least one of a communication network, such as a computer network (e.g., a local area network (LAN) or a wide area network (WAN)), the Internet, and a telephone network.

Each of the first and second external electronic devices 102 and 104 may be the same type as, or a different type from, the electronic device 100. According to an embodiment of the present disclosure, the server 106 may include a group of one or more servers. According to various embodiments of the present disclosure, all or some of the operations performed in the electronic device 100 may be performed in another electronic device or in a plurality of electronic devices (e.g., the electronic devices 102 and 104 or the server 106). According to an embodiment of the present disclosure, when the electronic device 100 has to perform a function or service automatically or in response to a request, the electronic device 100 may request another device (e.g., the electronic device 102 or 104 or the server 106) to perform at least some functions relating to the function or service, instead of performing the function or service by itself or in addition thereto. The other electronic device (e.g., the electronic device 102 or 104 or the server 106) may execute the requested functions or the additional functions and may forward the result of the execution to the electronic device 100. The electronic device 100 may process the received result as it is or additionally to provide the requested function or service. To this end, for example, cloud computing, distributed computing, or client-server computing technology may be used.

An electronic device 200, which will be described below, may be one of a wearable device, a notebook computer, a netbook computer, a smart phone, a tablet PC, a Galaxy tab, iPad, and a wireless charging device. In this embodiment, the electronic device 200 may be a smart phone.

According to one of the various embodiments of the present disclosure, the whole external appearance of the electronic device may be surrounded by a display so that the screen region may extend to the front, rear, and side surfaces of the electronic device. Since the display surrounds the exterior of the electronic device to extend to the rear and side surfaces thereof, the screen region may be extended, or a separate screen may be provided on the rear and side surfaces of the electronic device, thereby implementing a luxurious design.

In the following description, the configuration of the electronic device 200 that includes a plurality of displays, according to various embodiments of the present disclosure, will be described in detail.

At least some elements of the electronic device 200 may be configured to be similar to, or the same as, those of the electronic device 100, which has been described above.

Figure 2A:
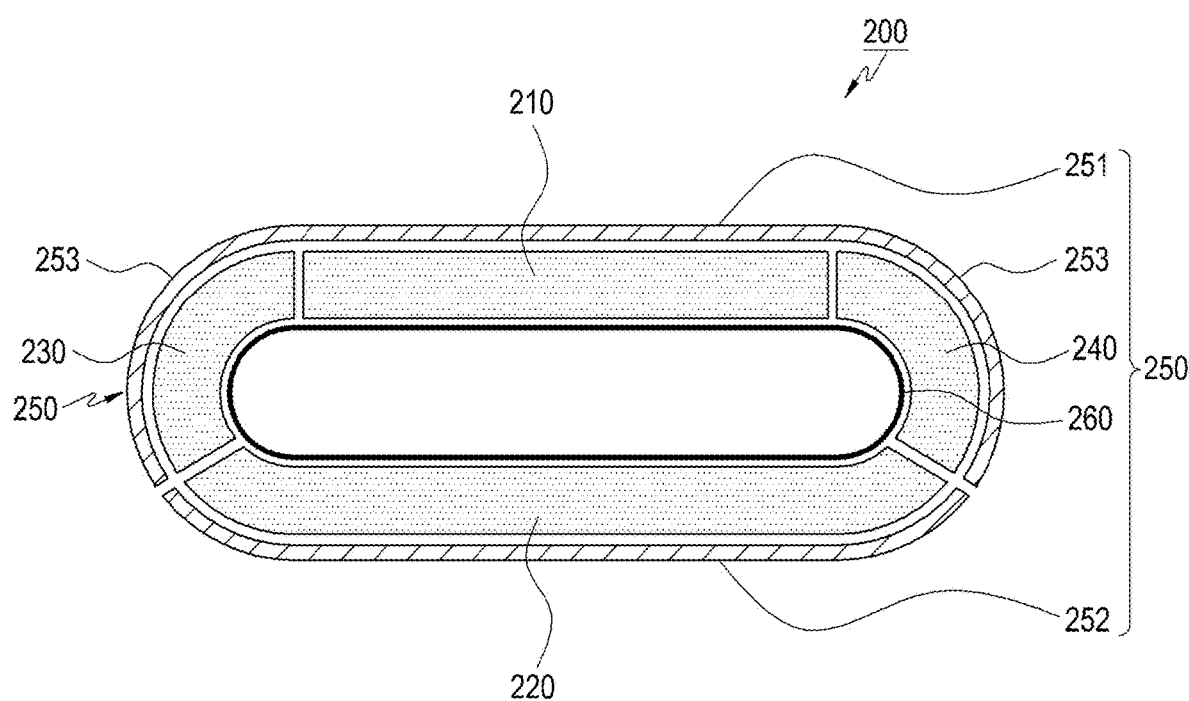
FIG. 2A is a side sectional view of an electronic device according to various embodiments of the present disclosure.

FIG. 2A is a side sectional view of an electronic device according to various embodiments of the present disclosure.

Referring to FIG. 2A, an electronic device 200 may include, for example, a housing 250, first and second displays 210 and 220, third displays, and a touch panel 260.

The housing 250 may include a first surface 251, a second surface 252 opposite to the first surface 251, and a third surface 253 formed of a side surface that surrounds the space between the first and second surface 251 and 252, and at least a part of the first to third surfaces 251, 252, and 253 may be formed of a transparent material that can transmit light.

The first display 210 may be disposed in the housing to be adjacent to the first surface in order to deliver visual content through the external appearance of the electronic device 200 and may be disposed on the front surface of the electronic device 200.

The second display 220 may be disposed in the housing to be adjacent to the second surface in order to deliver visual content through the external appearance of the electronic device 200 and may be disposed on the rear surface of the first display 210.

The third displays may be disposed in the housing 250 to be adjacent to the side surface and may extend from the edges of the first display 210 to the edges of the second display 220. For example, the third displays may be disposed on the sides of the first and second displays 210 and 220 in order to continuously display content, which is displayed on the screens of the first and second displays 210 and 220, without breaking off the content.

The third displays may include first and second curved displays 230 and 240 that are disposed on the opposite sides of the first and second displays 210 and 220. According to one of the various embodiments of the present disclosure, the first and second displays 210 and 220 may include a curved display.

The touch panel 260 may be included inside the first and second displays 210 and 220 and the first and second curved displays 230 and 240 to recognize the coordinates of a touch of a person's hand or an object on a specific point of the housing 250 and to perform the command of software specified for the corresponding touch point to process a specific function.

The housing 250 may include at least one of a transparent glass window and a transparent polymer window. Although the disclosed window is described as an example of the housing in this embodiment, the housing is not limited thereto. Various transparent materials that can transmit light may be employed for the housing. For example, the housing may be formed of a transparent acrylic material, etc.

As described above, the first and second displays 210 and 220 and the first and second curved displays 230 and 240 are configured to display visual content on the screens thereof in cooperation with each other, thereby delivering visual information through the whole external appearance of the electronic device 200 and implementing an appealing design even in low-power and standby states. For example, the display of the electronic device 200 may change as a whole according to the weather, and the first and second displays 210 and 220 and the first and second curved displays 230 and 240 may display an external environment state and a user's heartbeat and physical activity.

The first display 210 may include at least one of an LCD, an LED display, an OLED display, a MEMS) display, and an electronic paper display. According to one of the various embodiments of the present disclosure, the second display 220 may include an e-ink display, a color display, an LED display, and an OLED display.

The OLED display may include an active matrix OLED (AMOLED) display.

The third display may include an AMOLED display.

Other types of displays, in addition to the disclosed displays, may be employed for the first to third displays.

The touch panel 260 will be described in more detail. The touch panel 260 (i.e., touch screen panel) refers to a panel that recognizes the coordinates of a touch of a person's hand or an object on a specific point on the screen thereof without a separate input tool or device, such as a keyboard, a mouse, etc., and performs the command of software specified for the corresponding touch point to process a specific function. The touch panel 260 may be broadly categorized into a resistive type and a capacitive type. In order to implement a capacitive type of touch screen, a first electrode formed of driving lines Tx and a second electrode formed of sensing lines Rx have to be independently constituted. The first and second electrodes may form a pattern on a single layer, or may form patterns on different layers. However, the intersections of the first and second electrodes have to be isolated from each other by insulating materials, and each intersection forms one coordinate (X, Y).

According to one of the various embodiments of the present disclosure, the different layers may be inserted into the touch panel. For example, the different layers may include a solar layer, etc.

According to one of the various embodiments of the present disclosure, the touch panel 260 may also be classified into an infrared (IR) type, a surface acoustic wave (SAW) type, an electromagnetic (EM) type, an electromagnetic resonance (EMR) type, etc. according to the operating principle, in addition to the resistive type and the capacitive type, which have been mentioned above. A capacitive type of touch panel will be described as an example of the touch panel 260 according to various embodiments of the present disclosure.

The operating state of the electronic device 200, according to the various embodiments of the present disclosure, will be described below.

Figure 2B:
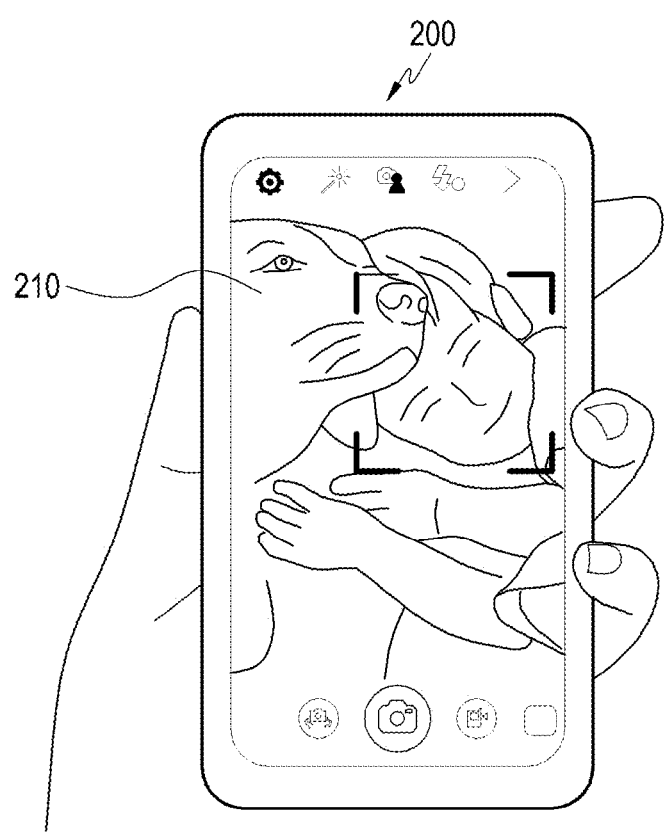
FIG. 2B is a front view illustrating of an electronic device according to various embodiments of the present disclosure.
Figure 2C:
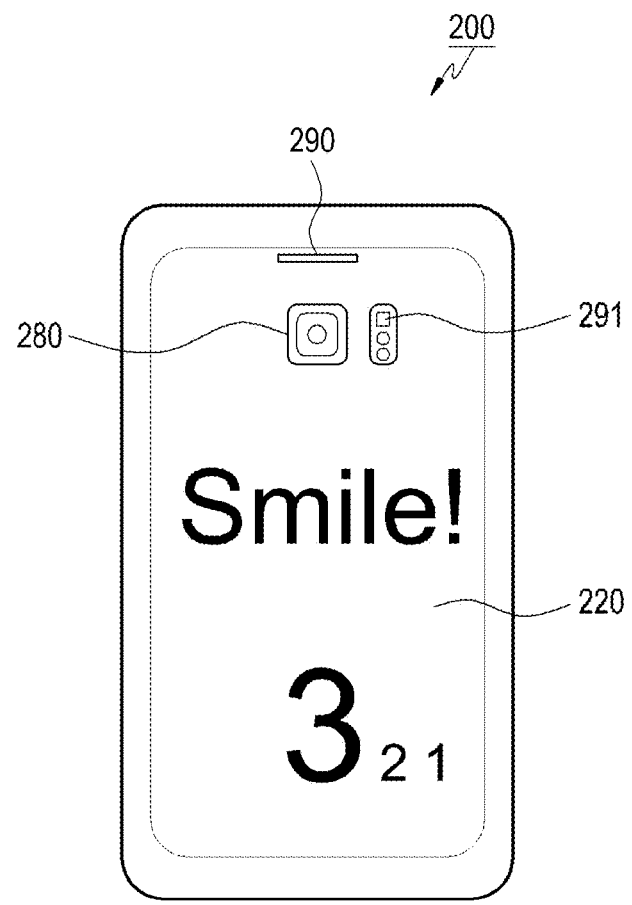
FIG. 2C is a rear view illustrating an electronic device according to various embodiments of the present disclosure.

FIG. 2B is a front view illustrating of an electronic device according to various embodiments of the present disclosure, and FIG. 2C is a rear view illustrating an electronic device according to various embodiments of the present disclosure.

Referring to FIG. 2B, a front view illustrates the operating states of the first display 210 and the third displays, which include the first and second curved displays 230 and 240, of the electronic device 200, according to various embodiments of the present disclosure. Referring to FIG. 2C, a rear view illustrates the operating state of the second display 220 of the electronic device 200, according to various embodiments of the present disclosure.

Referring to FIG. 2B, the first display 210 may be disposed on the front surface of the electronic device 200. The first and second curved displays 230 and 240 may be disposed on opposite ends of the first display 210. FIG. 2B illustrates an example in which the main home screen is displayed on the first display 210. The main home screen is the first screen that is displayed on the first display 210 when the electronic device 200 is turned on.

According to one of the various embodiments of the present disclosure, in cases where the electronic device 200 has several pages of different home screens, the main home screen is the first home screen of the several pages of different home screens. Short-cut icons for executing frequently used applications, a main menu switching key, time, weather, etc. may be displayed on the main home screen. The main menu switching key may be used to display a menu screen on the first display 210.

According to one of the various embodiments of the present disclosure, a status bar may be formed on the upper end of the first display 210 to display states, such as a battery charging state, the strength of a received signal, and the current time. A home key, a menu button, and a back button may be formed on the lower portion of the first display 210.

The configuration of the aforementioned housing, according to various embodiments of the present disclosure, will be described below in detail.

Figure 2D:
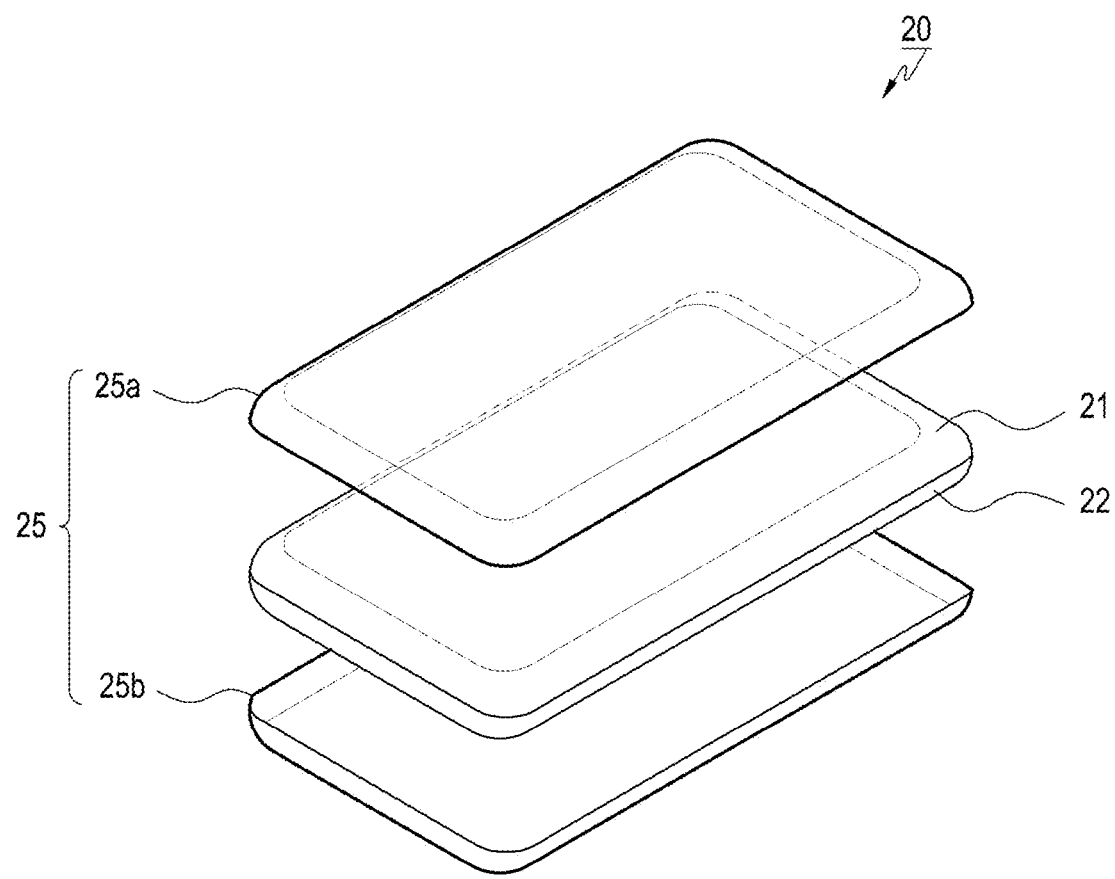
FIG. 2D is an exploded perspective view of an electronic device according to various embodiments of the present disclosure.
Figure 2E:
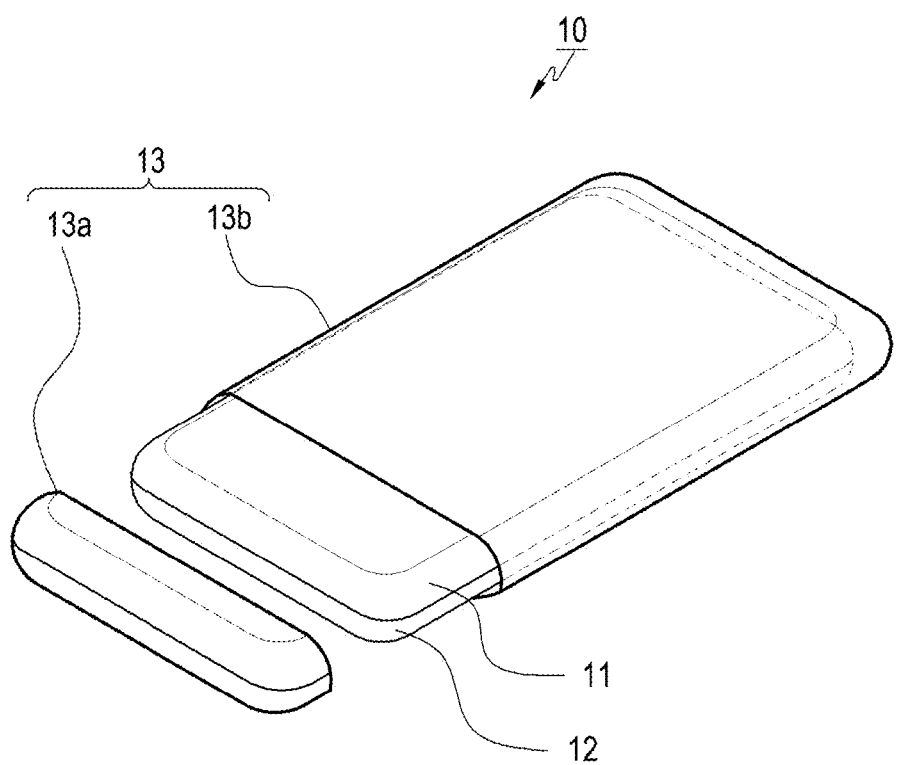
FIG. 2E is an exploded perspective view illustrating an embodiment of a housing according to various embodiments of the present disclosure.

FIG. 2D is an exploded perspective view of an electronic device according to various embodiments of the present disclosure, and FIG. 2E is an exploded perspective view illustrating an embodiment of a housing according to various embodiments of the present disclosure.

Referring to FIGS. 2D and 2E, at least some elements of the electronic device 20 may be configured to be similar to, or the same as, those of the electronic devices 100 and 200, which have been described above.

According to the various embodiments of the present disclosure, a housing 25 may include first and second housings 25a and 25b. The first to third displays may be coupled to each other, and the first and second housings 25a and 25b may be coupled to each other to surround the entirety of the first and second displays 210 and 220. For example, the first and second housings 25a and 25b may be attached to the top of the uppermost display and the bottom of the lowermost display, respectively, and thus assembled together. The first housing 25a may form the upper housing, and the second housing 25b may form the lower housing. The displays 21 and 22 may be disposed within the first and second housings 25a and 25b.

Referring to FIG. 2E, an exploded perspective view illustrates another embodiment of the housing among the configuration of the electronic device according to the various embodiments of the present disclosure.

At least some elements of the electronic device 10 may be configured to be similar to, or the same as, those of the electronic devices 100, 200 and 20, which have been described above.

A housing 13 may include a first housing 13a and a second housing 13b. The first housing 13a may form the left housing, and the second housing 13b may form the right housing. For example, the first to third displays may be coupled to each other, and the left housing 13a may be coupled to one end of the right housing 13b while a display 11 and a display 12 are inserted into the right housing 13b. The displays 11 and 12 may be disposed within the left and right housings 13a and 13b.

The internal configuration of the electronic device 200, according to the various embodiments of the present disclosure, will be described below in detail.

Figure 2F:
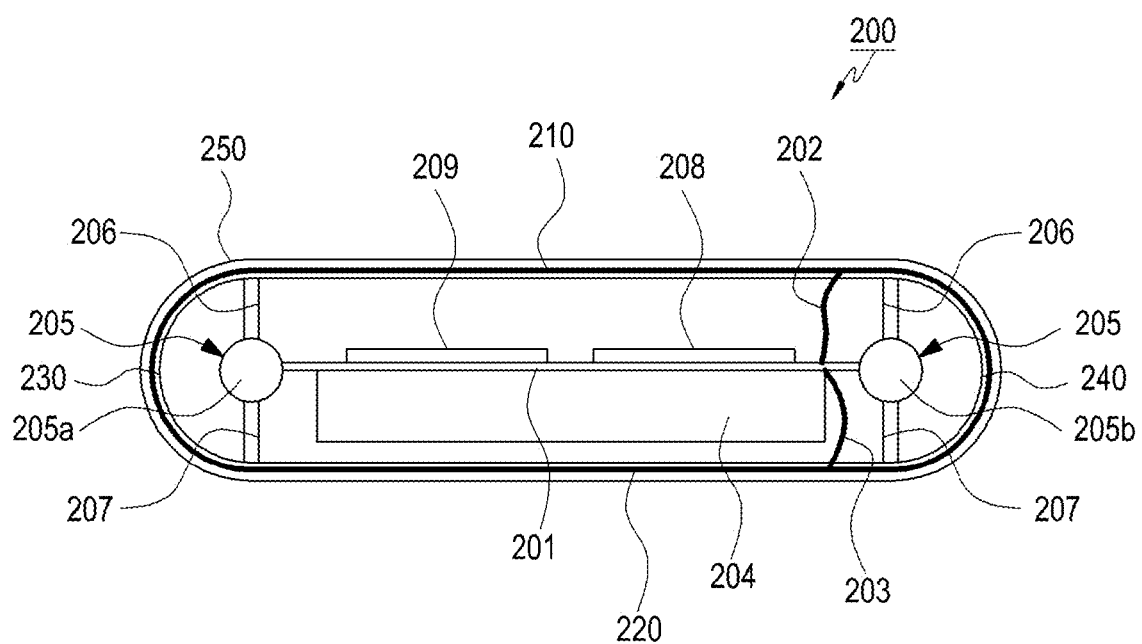
FIG. 2F is a side sectional view of an electronic device according to various embodiments of the present disclosure.

FIG. 2F is a side sectional view of an electronic device according to various embodiments of the present disclosure.

Referring to FIG. 2F, at least some elements of an electronic device 200 may be configured to be similar to, or the same as, those of the electronic devices 100, 200, 20 and 10, which have been described above.

The electronic device 200 may include, for example, first and second displays 210 and 220, a third display that includes first and second curved displays 230 and 240, the housing 250, and the touch panel 260. The housing 250 may include an external transparent glass window. The first and second displays and the first and second curved displays 230 and 240 may be disposed within the housing.

The first and second displays 210 and 220 may be disposed on the front and rear surfaces of the electronic device 200 in order to deliver visual content through the external appearance of the electronic device 200. The first and second curved displays 230 and 240 may be disposed on the side surfaces of the electronic device 200 in order to deliver visual content through the external appearance of the electronic device 200.

A space may be informed inside the displays, and a printed circuit board 201 may be provided in the space. The printed circuit board 201 may include first and second connectors 202 and 203 that electrically connect the printed circuit board 201 with the first and second displays 210 and 220.

For example, the first and second connectors 202 and 203 may be connected to independently operate the first and second displays 210 and 220.

A plurality of support columns 205 for supporting the printed circuit board 201 may be provided inside the displays.

The plurality of support columns 205 may include first and second support columns 205a and 205b. The central portion of the first support column 205a may be connected to a first end of the printed circuit board 201, and the central portion of the second support column 205b may be connected to a second end of the printed circuit board 201 that is opposite to the first end.

Each of the plurality of support columns 205 may include first and second support members 206 and 207 for supporting the curved portions of the first and second displays 210 and 220. For example, the first and second support members 206 and 207 may provide an internal space between the displays and may be disposed on the upper and lower portions of the first and second support columns 205a and 205b to support the vertical axes of the first and second displays 210 and 220. According to the various embodiments of the present disclosure, one or more processors 208, a communication module 209, a sensor (not illustrated), and a battery 204 may be mounted on the printed circuit board 201. The battery 204 may be a solid type battery or a flexible type battery.

The first and second displays 210 and 220 and the first and second curved displays 230 and 240 may be electrically connected to the communication module 209 and may perform an antenna function. For example, each display may be used as an antenna of the electronic device 200.

The aforementioned touch panel may be integrally provided with the first and second displays and the first and second curved displays.

The sensor (not illustrated) may include a fingerprint sensor, a temperature sensor, a proximity sensor, or an image sensor. The disclosed sensors may be integrally provided on the first and second displays and the first and second curved displays.

Figure 3:
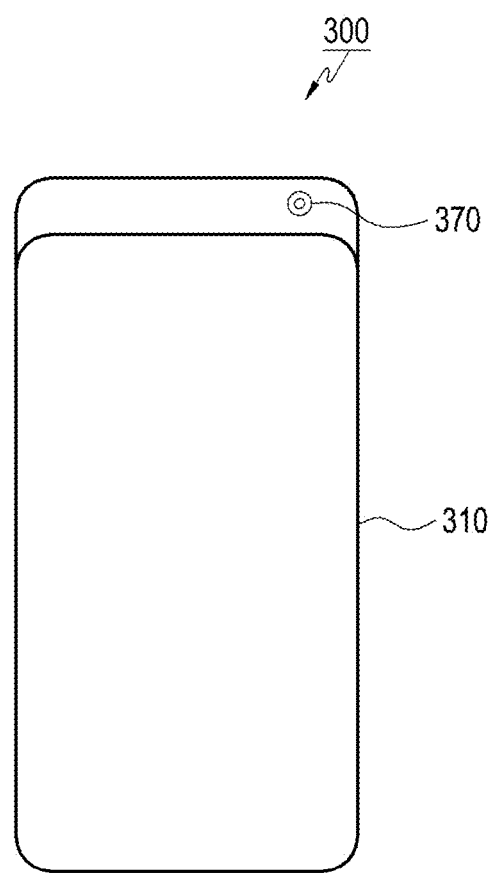
FIG. 3 is a front view illustrating a camera module of an electronic device according to various embodiments of the present disclosure.

FIG. 3 is a front view illustrating a camera module of an electronic device according to various embodiments of the present disclosure.

Referring to FIG. 3, a first camera module 370, an illumination sensor (not illustrated), or a proximity sensor (not illustrated) may be included in the upper end region of the front surface of the electronic device 300. At least some elements of the electronic device 300 may be configured to be similar to, or the same as, those of the electronic devices 100, 200, 20 and 10, which have been described above.

For example, a housing 350 may be formed of a transparent material. The transparent housing 350 may cover the exterior of a first display 310 so that the camera module 370 is hidden by the housing 350, and hence is not shown from the outside. In this case, the first camera module 370 may photograph an image through the transparent housing 350.

As described above with reference to FIG. 2C, a second display 220 may be disposed on the rear surface of the electronic device 300 and may display various types of content displayed on a first display 210 and first and second curved displays 230 and 240. A second camera module 280, a flash 291, or a speaker 290 may be included in the second display 220. For example, the elements provided on the rear surface of the electronic device 200 illustrated in FIG. 2C may be disposed on the rear surface of the electronic device 300.

According to an embodiment of the present disclosure, as illustrated in FIG. 2C, the camera module, the speaker, and the flash that are included in the second display may be exposed to the outside. In this case, the second display may include the function of the camera module, the speaker, and/or the flash, and a part of the second display may be replaced for another module function, or the second display may have a gap formed therein. For example, the camera module, the speaker, and the flash may be exposed to the outside through the gap of the second display.

The second camera module 280 may include a photo/video photographing function, a video call function, and an iris recognition function. According to one of the various embodiments of the present disclosure, the second camera module 280 and the speaker 290 may be configured not to be hidden by the second display 220. For example, the second display 220 may be used when the second camera module 280 photographs an image.

According to an embodiment of the present disclosure, it is possible to make a telephone call through the rear surface of the electronic device 200.

Figure 4A:
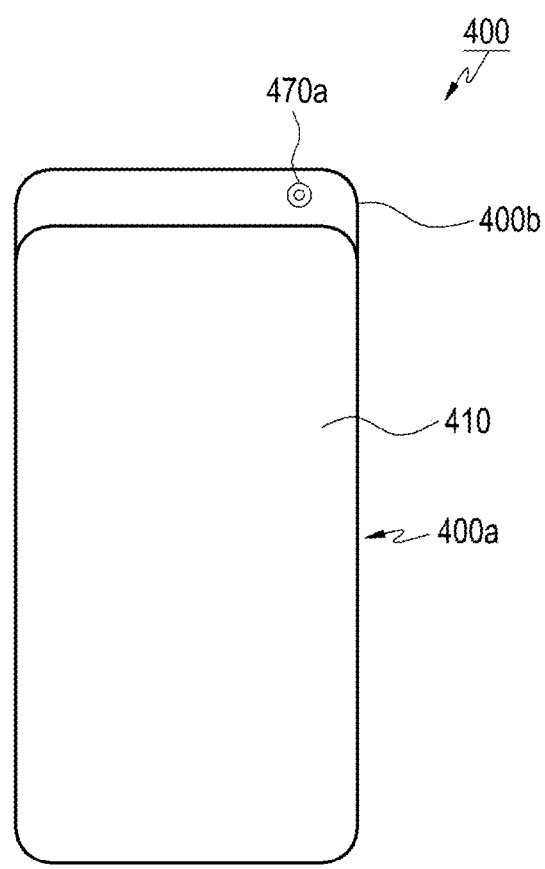
FIG. 4A is a front view of an electronic device according to various embodiments of the present disclosure.
Figure 4B:
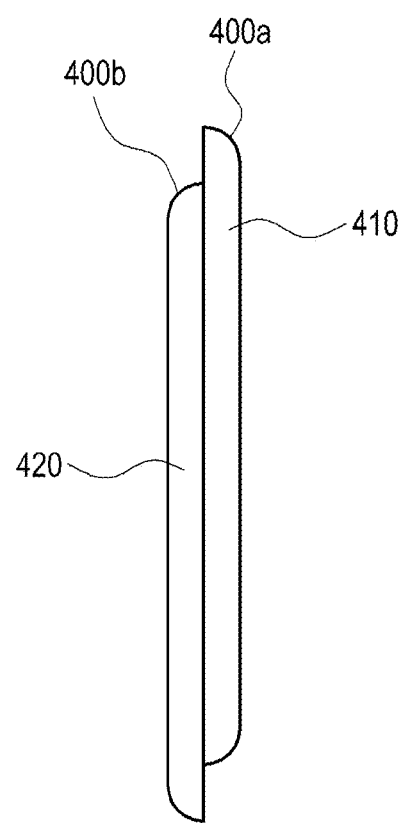
FIG. 4B is a side view of an electronic device according to various embodiments of the present disclosure.

FIG. 4A is a front view of an electronic device according to various embodiments of the present disclosure, and FIG. 4B is a side view of an electronic device according to various embodiments of the present disclosure.

Referring to FIGS. 4A and 4B, an electronic device 400 may include at least some may be configured to be similar to, or the same as, those of the electronic devices 100, 200, 20, 10, and 300, which have been described above.

According to an embodiment of the present disclosure, there may be a view illustrating another embodiment of the camera module included in the electronic device 400.

The electronic device 400 may include, for example, first and second body parts 400a and 400b and a touch panel (not illustrated). The first body part 400a may include a first display 410 and a first housing (not illustrated) that surrounds the exterior of the first display 410, and the second body part 400b may include a second display 420 disposed on the rear surface of the first display 410 and a second housing (not illustrated) that surrounds the exterior of the second display 420. The touch panel (not illustrated) may accommodate the first and second displays 410 and 420 therein. Since the operation and configuration of the touch panel have already been described, the description thereof will be omitted.

The first body part 400a may slide relative to the second body part 400b in order to open/close the camera module 470a embedded in the rear surface of the first body part 400a. For example, while the first and second body parts 400a and 400b face each other, the first body part 400a may slide relative to the second body part 400b so that the camera module 470a embedded in the rear surface of the first body part 400a may be opened. It is possible to photograph a photo and a video through the open camera module 470a. According to one of the various embodiments of the present disclosure, when the first body part 400a slides again to face the second body part 400b, the camera module 470a of the first body part 400a may overlap the second body part 400b and may be simultaneously covered with the second body part 400b so that the lens of the camera module 470a may be closed.

According to an embodiment of the present disclosure, a sliding module (not illustrated) may be provided between the first and second body parts 400a and 400b to slide the first body part 400a.

According to an embodiment of the present disclosure, an electronic device may include a housing that includes a first surface, a second surface opposite to the first surface, and a third surface formed of a side surface that surrounds the space between the first and second surfaces, wherein the first to third surfaces are all substantially formed of a material capable of transmitting light, a first display disposed in the housing adjacent to the first surface a second display disposed in the housing adjacent to the second surface and a third display disposed in the housing adjacent to the side surface and extending from the edge of the first display to the edge of the second display, wherein a combination of the first to third displays may be disposed to provide a display region to the substantially whole surface of the housing.

According to an embodiment of the present disclosure, the material capable of transmitting light may include at least one of a glass material and a polymer material.

According to an embodiment of the present disclosure, the electronic device may further include a processor electrically connected to the first to third displays, and a memory electrically connected to the processor, wherein the memory may store instructions that, when being executed, allow the processor to display one piece of content using a combination of at least two of the first to third displays.

According to an embodiment of the present disclosure, at least one portion of the side surface of the housing may be bent from the edge of the first display toward the edge of the second display.

According to an embodiment of the present disclosure, at least one portion of the third display may be bent in conformity with the bent portion of the side surface of the housing.

According to an embodiment of the present disclosure, the bent portion of the third display may contain an OLED.

According to an embodiment of the present disclosure, an electronic device may include a housing that includes a first surface, a second surface opposite to the first surface, and a third surface formed of a side surface that surrounds the space between the first and second surfaces, wherein the first to third surfaces are all substantially formed of a material capable of transmitting light, a first display disposed in the housing adjacent to the first surface, a second display disposed in the housing adjacent to the second surface, a third display that is disposed on opposite ends of the first and second displays in the housing and connects the first and second displays, and a touch panel disposed inside the first to third displays, wherein the first to third displays may be disposed to provide a display region to the substantially whole surface of the housing.

According to an embodiment of the present disclosure, the housing may be formed of at least one of a transparent glass window and a window made of transparent polymer material.

According to an embodiment of the present disclosure, the third display may include first and second curved displays.

According to an embodiment, the first display may include one of an LCD, an LED display, an OLED display, a MEMS display, and an electronic paper display.

According to an embodiment of the present disclosure, the second display may include one of an e-ink display, a color display, an LED display, and an OLED display.

According to an embodiment of the present disclosure, the touch panel may include one of a resistive type of touch panel and a capacitive type of touch panel.

According to an embodiment of the present disclosure, the housing may include a solar film material.

According to an embodiment of the present disclosure, a printed circuit board may be provided inside the first to third displays, first and second connectors electrically connected to the first and second displays may be mounted on the printed circuit board, a plurality of support columns that support the printed circuit board may be provided inside the first to third displays, the plurality of support columns may include a first support column connected to a first end of the printed circuit board and a second support column connected to a second end opposite to the first end, and first and second support members that support bent portions of the first and second displays may be provided on the upper and lower portions of the first and second support columns.

According to an embodiment of the present disclosure, the electronic device may have an internal camera module that photographs an image through the transparent housing.

According to an embodiment of the present disclosure, the electronic device may include a first body part that includes a first display and a first housing that surrounds the exterior of the first display, a second body part that includes a second display disposed on the rear surface of the first display and a second housing that surrounds the exterior of the second display, and a touch panel provided inside the first and second displays, wherein the first body part may slide relative to the second body part to open/close a camera module embedded in the rear surface of the first body part.

Figure 5A:
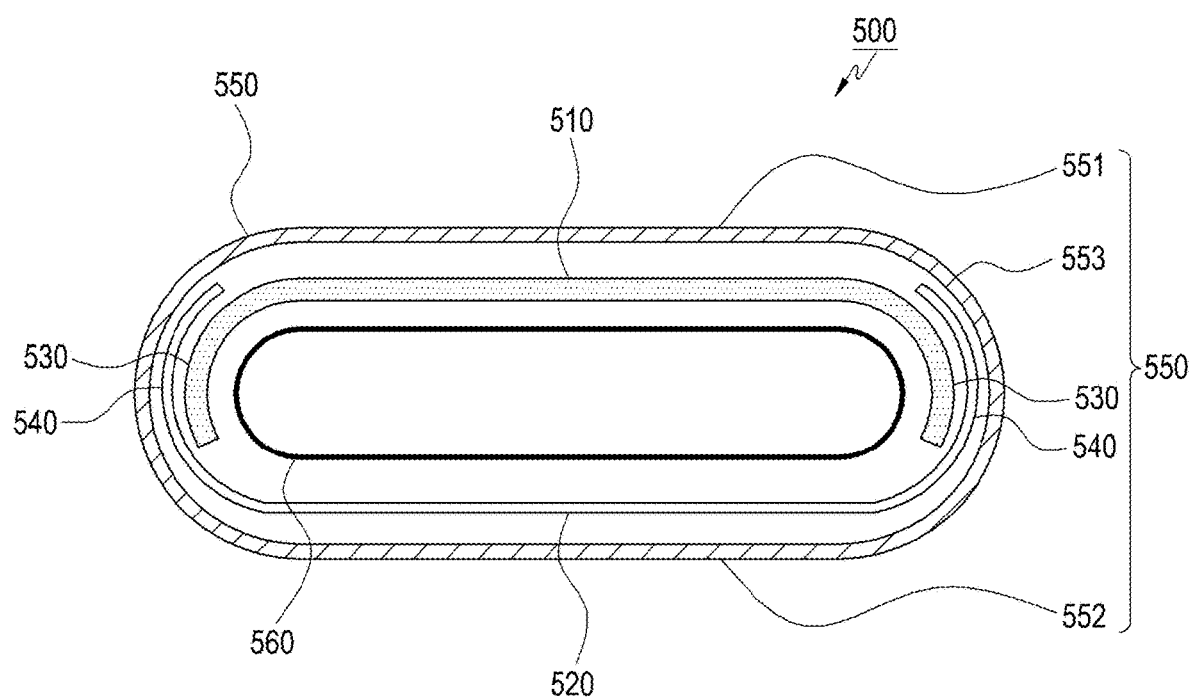
FIG. 5A is a side sectional view illustrating an electronic device according to various embodiments of the present disclosure.

FIG. 5A is a side sectional view illustrating an electronic device according to various embodiments of the present disclosure.

Referring to FIG. 5A, an electronic device 500 may include at least some elements to be similar to, or the same as, those of the electronic devices 100, 200, 20, 10, 300, and 400, which have been described above.

The electronic device 500 may include, for example, first and second displays 510 and 520, first and second curved displays 530 and 540, a housing 550, and a touch panel 560.

The housing 550 may include a first surface 551, a second surface 552 opposite to the first surface 551, and a third surface 553 formed of a side surface that surrounds the space between the first and second surface 551 and 552, and the first to third surfaces 551, 552, and 553 may all be formed of a transparent material that can transmit light.

The first display 510 may be disposed on the front surface of the electronic device 500 in order to deliver visual content through the external appearance of the electronic device 500.

The second display 520 may be disposed on the rear surface of the first display 510 in order to deliver visual content through the external appearance of the electronic device 500.

The first and second curved displays 530 and 540 are disposed on opposite ends of the first and second displays 510 and 520 to overlap each other in order to continuously display content, which is displayed on the screens of the first and second displays 510 and 520, without breaking off the content. For example, the first and second curved displays 530 and 540 may be integrally formed with the opposite ends of the first and second displays 510 and 520 and may simultaneously overlap each other.

The touch panel 560 may be included inside the first and second displays 510 and 520 and the first and second curved displays 530 and 540 to recognize the coordinates of a touch of a person's hand or an object on a specific point of the housing 550 and to perform the command of software specified for the corresponding touch point to process a specific function.

As described above, by configuring the first and second displays 510 and 520 and the first and second curved displays 530 and 540 that are integrally formed with the opposite ends of the first and second displays and are disposed to overlap each other, visual content on the screens of the displays 510 and 520 may be displayed in cooperation with each other while overlapping each other. For example, the overlapping portion may represent at least one of a color, a transparency, and a gradation, thereby visually delivering information through the whole external appearance of the electronic device 500 and implementing an appealing design even in low-power and standby states.

Since the structure and operation of the touch panel 560 have already been described in the preceding embodiments, the description thereof will be omitted.

As illustrated in FIG. 5A, the first display 510 may be disposed on the front surface of the electronic device 500, and the second display 520 may be disposed on the rear surface of the electronic device 500. The first and second curved displays 530 and 540 may be disposed on the opposite ends of the first and second displays 510 and 520 to overlap each other. The main home screen may be displayed on the first display 510, and a sub-screen may be displayed on the second display 520.

According to an embodiment of the present disclosure, in cases where the electronic device 500 has several pages of different sub-screens, the sub-screens may be screens other than the main home screen.

In this case, the colors of the main home screen and the sub-screen, which are displayed on the first and second displays 510 and 520, respectively, may be displayed to overlap each other by the first and second curved displays 530 and 540. According to one of the various embodiments of the present disclosure, the transparencies of the main home screen and the sub-screen, which are displayed on the first and second displays 510 and 520, respectively, may be displayed to overlap each other in three dimensions by the first and second curved displays 530 and 540. For example, the first and second curved displays 530 and 540 overlap each other so that the transparent colors of the first and second curved displays 530 and 540 overlap each other, thereby representing a 3D effect.

Figure 5B:
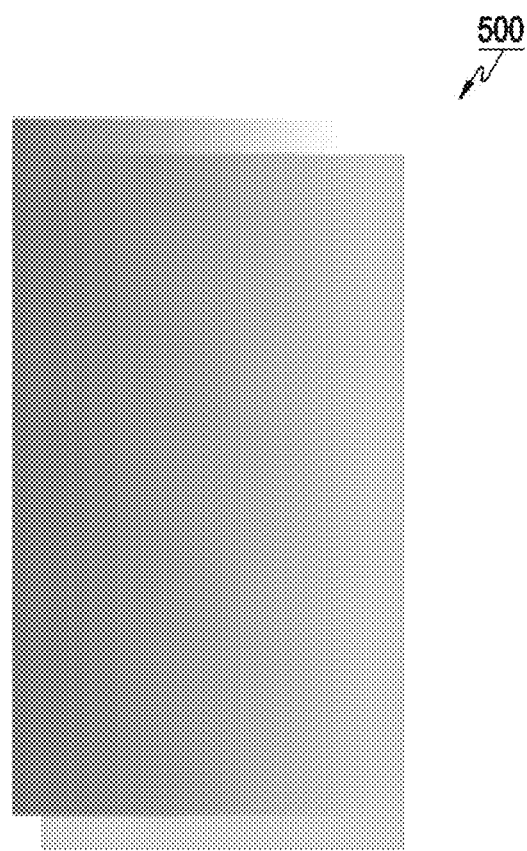
FIG. 5B is a view illustrating a gradation effect of first and second displays according to various embodiments of the present disclosure.

FIG. 5B is a view illustrating a gradation effect of first and second displays according to various embodiments of the present disclosure.

Referring to FIGS. 5A and 5B, in cases where the main home screen and the sub-screen, which are displayed on first and second displays 510 and 520, are subjected to a gradation, the first and second displays 510 and 520 that overlap each other may further represent the gradation effect. For example, when the first display 510 performs display in gray, the second display 520 that overlaps the first display 510 may form a bright gray color, thereby further enhancing the gradation effect using a difference in the brightness between the gray color of the first display 510 and the gray color of the second display 520. For example, in order to represent the gradation effect, the first and second displays that overlap each other may have an effect in which the transparencies thereof are mixed with each other while being changed.

According to an embodiment of the present disclosure, an electronic device may include a housing that includes a first surface, a second surface opposite to the first surface, and a third surface formed of a side surface that surrounds the space between the first and second surfaces, wherein the first to third surfaces are all substantially formed of a material capable of transmitting light, a first display disposed in the housing adjacent to the first surface, a second display disposed in the housing adjacent to the second surface, a first curved display provided on opposite ends of the first display and disposed in the housing, a second curved display provided on opposite ends of the second display and overlapping the first curved display disposed in the housing, and a touch panel disposed inside the first and second displays and the first and second curved displays, wherein the first and second displays and the first and second curved displays may be disposed to provide a display region to the substantially whole surface of the housing and may perform display while overlapping each other.

According to an embodiment of the present disclosure, one of a color, a transparency, and a gradation may be included in the portion where the first and second curved displays overlap each other.

Figure 6:
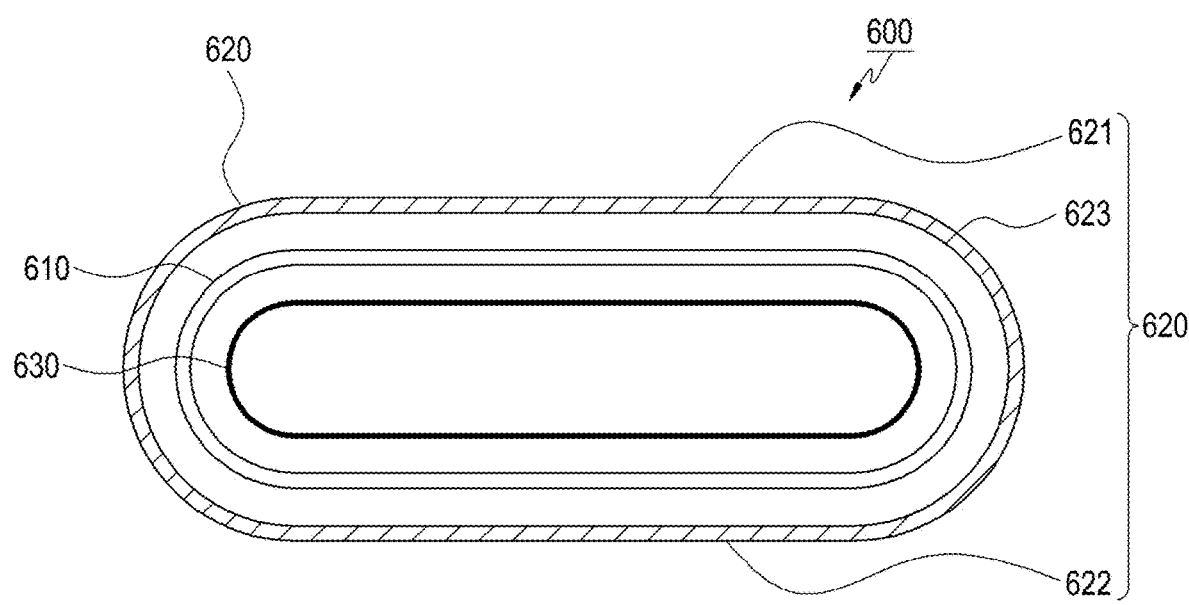
FIG. 6 is a side sectional view of an electronic device according to various embodiments of the present disclosure.

FIG. 6 is a side sectional view of an electronic device according to various embodiments of the present disclosure.

Referring to FIG. 6, an electronic device may include at least some elements to be similar to, or the same as, those of the electronic devices 100, 200, 20, 10, 300, 400, and 500, which have been described above.

The electronic device 600 may include, for example, a flexible display 610, a housing 620, and a touch panel 630.

The housing 620 may include a first surface 621, a second surface 622 opposite to the first surface 621, and a third surface 623 formed of a side surface that surrounds the space between the first and second surface 621 and 622, and the first to third surfaces 621, 622, and 623 may all be formed of a transparent material that can transmit light.

The flexible display 610 may be disposed on the front surface of the electronic device 600 and may surround the whole exterior of the touch panel 630 in order to deliver visual content through the external appearance of the electronic device 600.

The flexible display 610 may continuously display content displayed thereon without breaking off the content.

The touch panel 630 may be included inside the flexible display 610 to recognize the coordinates of a touch of a person's hand or an object on a specific point of the housing 620 and to perform the command of software specified for the corresponding touch point to process a specific function.

Since the structure and operation of the touch panel 630 have already been described in the preceding embodiments, the description thereof will be omitted.

As described above, one flexible display 610 is configured to surround the whole touch panel 630 so that it is possible to easily control the resolution of the display 610, thereby reducing the power consumption of the electronic device 600, and visual content may be displayed in cooperation with each other on the screen of the display 610. For example, it is possible to deliver visual information through the whole external appearance of the electronic device 600 and implement an appealing design even in a low-power and standby states.

As illustrated in FIG. 6, the flexible display 610 may be configured to surround the whole touch panel 630 of the electronic device 600, and the housing 620 may surround the whole exterior of the flexible display 610. Accordingly, the flexible display 610 may be configured as a tubular flexible display 610. The flexible display 610 is not limited to the tubular flexible display 610. For example, various shapes of displays capable of surrounding the whole touch panel 630 may be employed for the flexible display 610. For example, the flexible display 610 may be formed in at least one of an oval shape, a circular shape, and a rectangular shape.

According to an embodiment of the present disclosure, in cases where a high resolution is required, all pixels provided in the flexible display 610 may operate to raise the resolution of the display 610, and in cases where a low resolution is required, only at least some of the pixels provided in the flexible display 610 may operate to lower the resolution of the display 610, thereby reducing the power consumption of the display 610.

For example, according to the property of the flexible display 610, it is possible to adjust the resolution the display 610 by controlling the pixels provided in the display 610 through a controller (not illustrated) provided in the electronic device. The electronic device 600, according to the various embodiments of the present disclosure, can control the resolution using one flexible display 610, reduce power consumption, and display various types of visual content as a whole.

According to an embodiment of the present disclosure, an electronic device may include a housing that includes a first surface, a second surface opposite to the first surface, and a third surface formed of a side surface that surrounds the space between the first and second surfaces, wherein the first to third surfaces are all substantially formed of a material capable of transmitting light, and a flexible display disposed in the housing and surrounding the whole exterior of a touch panel equipped to the electronic device, wherein the flexible display may be disposed to provide a display region to the substantially whole surface of the housing, and content may be displayed in the display region.

According to an embodiment of the present disclosure, the flexible display may include a tubular flexible display.

According to an embodiment of the present disclosure, the electronic device may further include at least one first sensor that detects the state information of the electronic device, a memory that stores a plurality of graphic objects for representing weather, and a controller that selects a first graphic object corresponding to weather information acquired from an external server from the plurality of graphic objects and controls to display the selected first graphic object on the flexible display.

According to an embodiment of the present disclosure, the controller may determine the state in which the electronic device has been placed by using the state information of the electronic device, determine at least one first region within the flexible display for displaying the first graphic object based on the determination result, and control to display the first graphic object in the determined at least one first region.

The configuration of an electronic device 700 that includes a plurality of displays, according to various embodiments of the present disclosure, will be described below in detail.

Figure 7A:
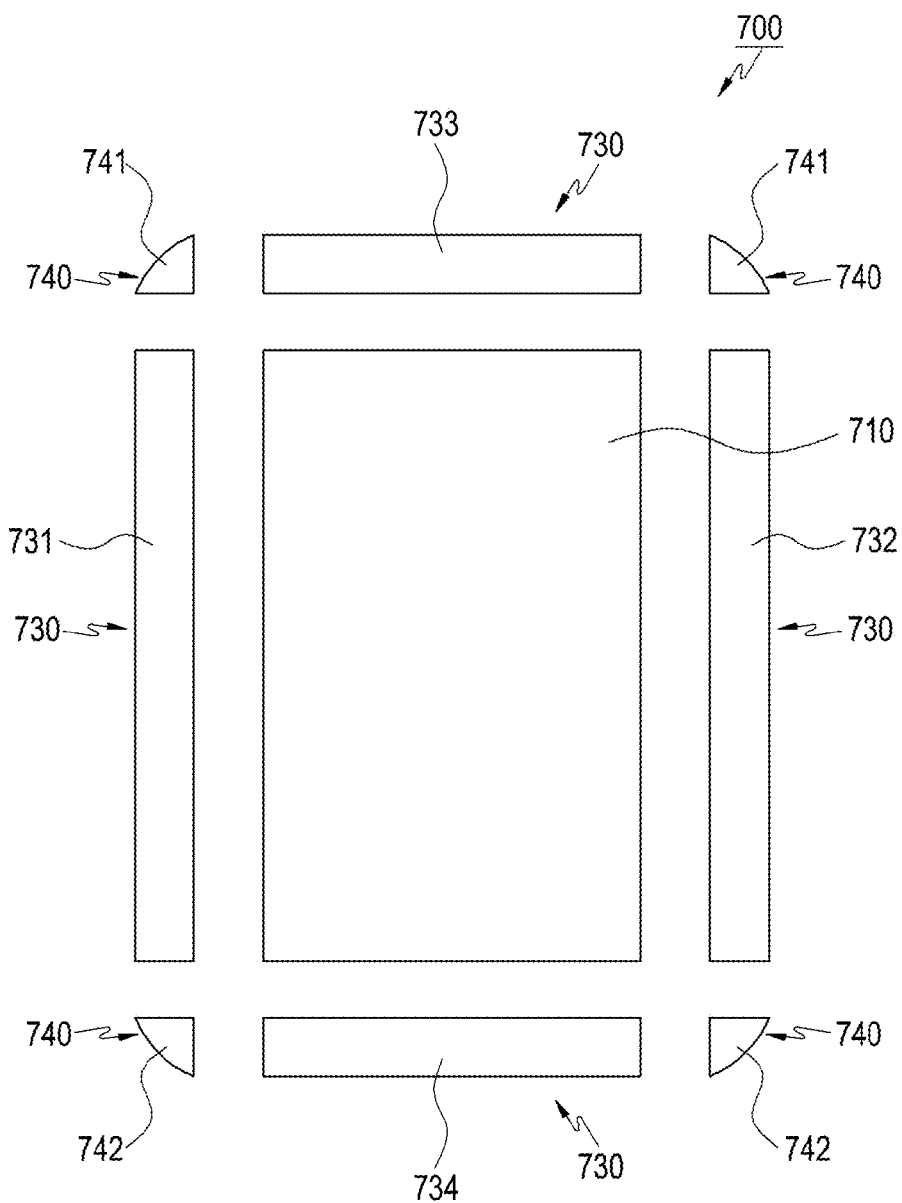
FIG. 7A is an exploded view illustrating an electronic device according to various embodiments of the present disclosure.

FIG. 7A is an exploded view of an electronic device according to various embodiments of the present disclosure.

Referring to FIG. 7A, an electronic device may include at least some elements may be configured to be similar to, or the same as, those of the electronic devices 100, 200, 20, 10, 300, 400, 500, and 600, which have been described above.

The electronic device 700 may include, for example, a first display 710, a second display (not illustrated), a plurality of curved displays 730, a plurality of semispherical displays 740, a housing 770, and a touch panel 760. The first display 710 may be disposed on the front surface of the electronic device 700 in order to deliver visual content through the external appearance of the electronic device 700.

The second display (not illustrated) may be disposed on the rear surface of the first display 710 in order to deliver visual content through the external appearance of the electronic device 700.

The plurality of curved displays 730 may be disposed on the sides of the first display 710 and the second display (not illustrated) to continuously display content, which is displayed on the screens of the first display 710 and the second display (not illustrated), without breaking off the content.

The plurality of semispherical displays 740 may be disposed on the corners of the first display 710 and the second display (not illustrated) located between the plurality of curved displays 730, and may continuously display content, which is displayed on the screens of the first display 710, the second display (not illustrated), and the plurality of curved displays 730, without breaking off the content.

The housing 770 may surround the first display 710, the second display (not illustrated), the plurality of curved displays 730, and the plurality of semispherical displays 740 in order to preserve the external appearance thereof and protect them.

The touch panel 760 may be included inside the first display 710, the second display (not illustrated), and the plurality of curved displays 730 to recognize the coordinates of a touch of a person's hand or an object on a specific point of the housing 770 and to perform the command of software specified for the corresponding touch point to process a specific function.

Since the structure and operation of the touch panel 760 have already been described in the preceding embodiments, the description thereof will be omitted.

As described above, the first display 710, the second display (not illustrated), the plurality of curved displays 730, and the plurality of semispherical displays 740 are coupled to each other to form one display, thereby delivering visual information through the whole external appearance of the electronic device 700 and implementing an appealing design even in low-power and standby states.

As illustrated in FIG. 7A, the plurality of curved displays 730 may include first to fourth curved displays 731 to 734.

The first and second curved displays 731 and 732 may be coupled to the left and right sides of the first and second displays. The third and fourth curved displays 733 and 734 may be coupled to the upper and lower sides of the first and second displays.

According to an embodiment of the present disclosure, the plurality of semispherical displays 740 may include first and second semispherical displays 741 and 742. The first semispherical displays 741 may be coupled to ends of the first and second curved displays 731 and 732 and the opposite ends of the third curved display 733.

The second semispherical displays 742 may be coupled to the other ends of the first and second curved displays 731 and 732 and the opposite ends of the fourth curved display 734.

The operating state of the electronic device 700, according to the various embodiments of the present disclosure, will be described below in detail.

Figure 7B:
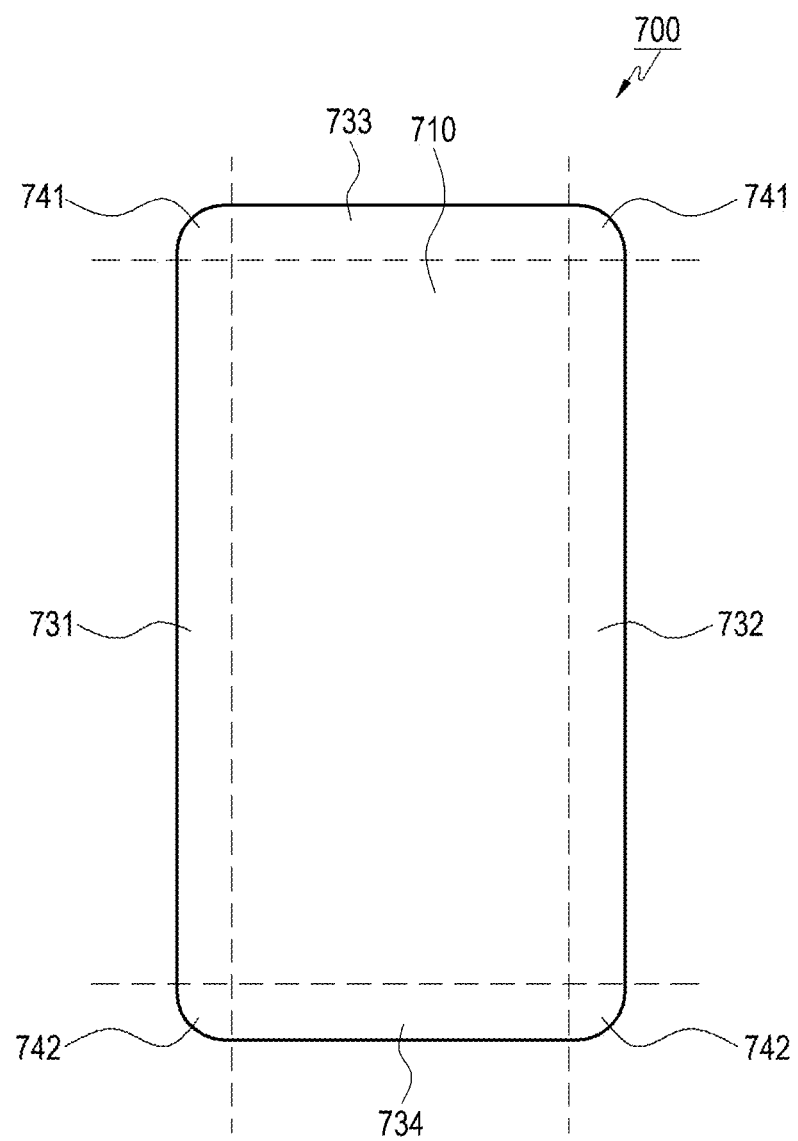
FIG. 7B is a front view of an electronic device according to various embodiments of the present disclosure.
Figure 7C:
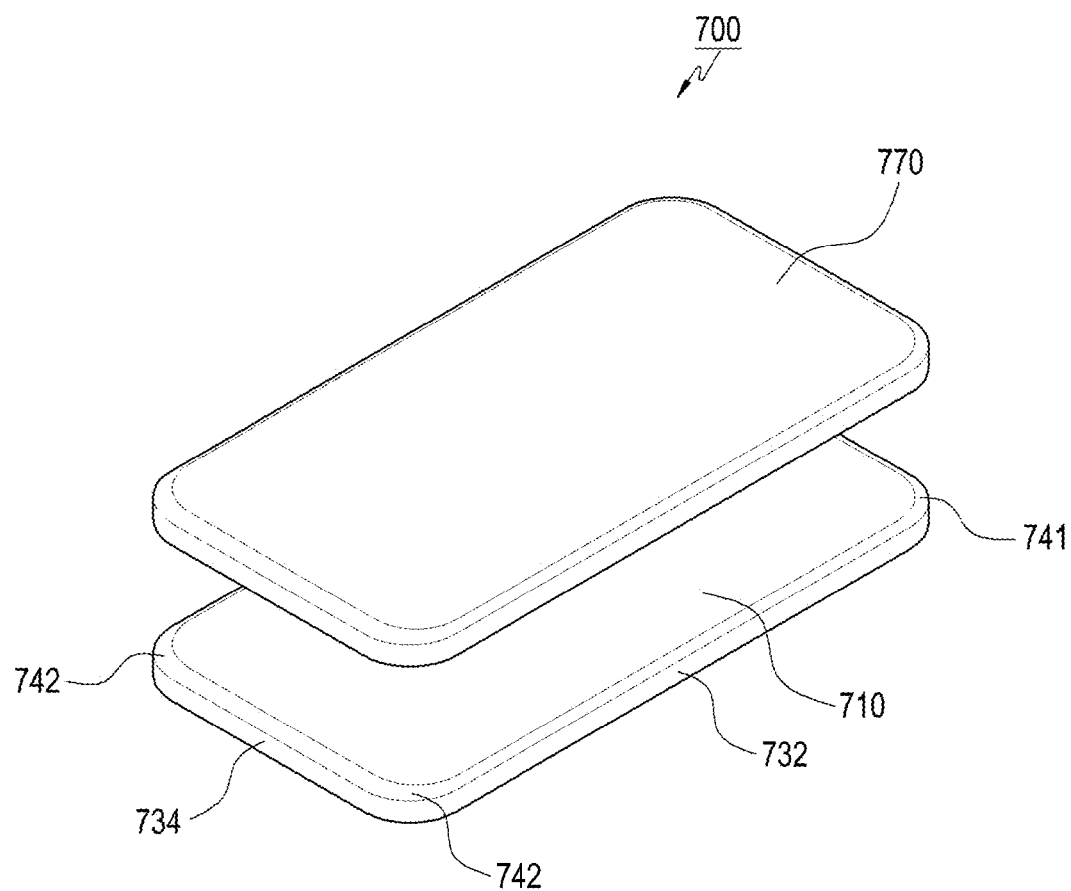
FIG. 7C is an exploded view illustrating a an electronic device, according to various embodiments of the present disclosure.

FIG. 7B is a front view of an electronic device according to various embodiments of the present disclosure, is assembled, and FIG. 7C is an exploded view illustrating an electronic device according to various embodiments of the present disclosure.

Referring to FIG. 7B, the first display 710 may be disposed on the front surface of the electronic device 700. The second display (not illustrated) may be disposed on the rear surface of the electronic device 700.

Referring to FIG. 7A, the first and second curved displays 731 and 732 may be coupled to the left and right sides of the first display 710, and the third and fourth curved displays 733 and 734 may be coupled to the upper and lower sides of the first display 710. In this state, surfaces of the first semispherical displays 741 may be coupled to the ends of the first and second curved displays 731 and 732, and other surfaces of the first semispherical displays 741 may be coupled to the opposite ends of the second curved display 732. Surfaces of the second semispherical displays 742 may be coupled to the other ends of the first and second curved displays 731 and 732, and other surfaces of the second semispherical displays 742 may be coupled to the opposite ends of the fourth curved display 734.

Referring to FIG. 7B, the first to fourth curved displays 731 to 734 are coupled to the first and second displays, and the first and second semispherical displays 741 and 742 are coupled to the first, second, third, and/or fourth curved display 731, 732, 733, and/or 734. In this state, as illustrated in FIG. 7C, the housing 770 is coupled to the upper portion of the single display, into which the plurality of displays are integrated, to protect the display.

The single display can display various types of content in cooperation with each other without breaking off the content. Accordingly, it is possible to deliver visual information through the whole external appearance of the electronic device 700 and implement an appealing design even in a low-power and standby states.

Since the specific operations of the first and second displays have already been described, the description thereof will be omitted.

Figure 7D:
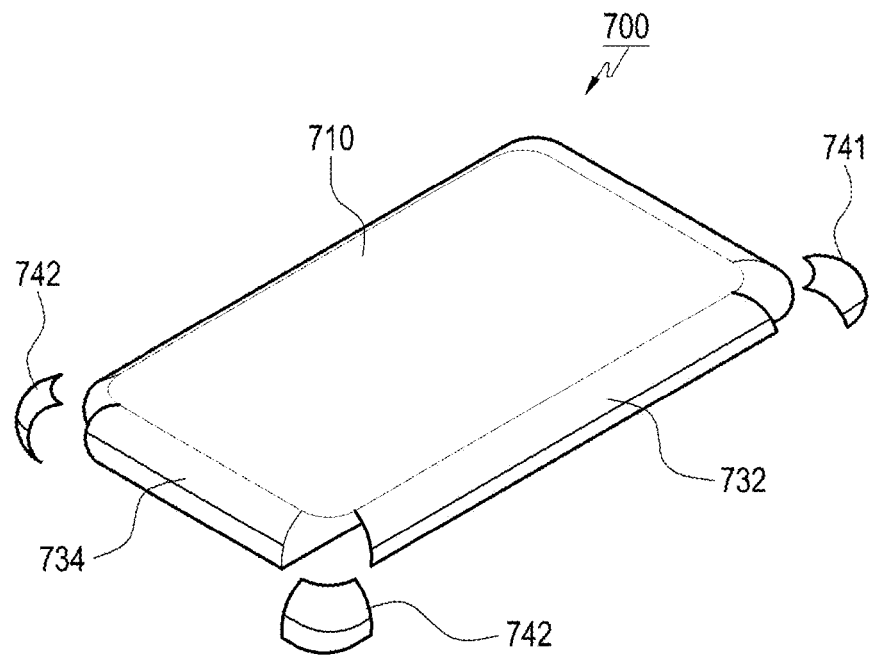
FIG. 7D is a perspective view illustrating a state in which displays are coupled to each other according to various embodiments of the present disclosure.
Figure 7E:
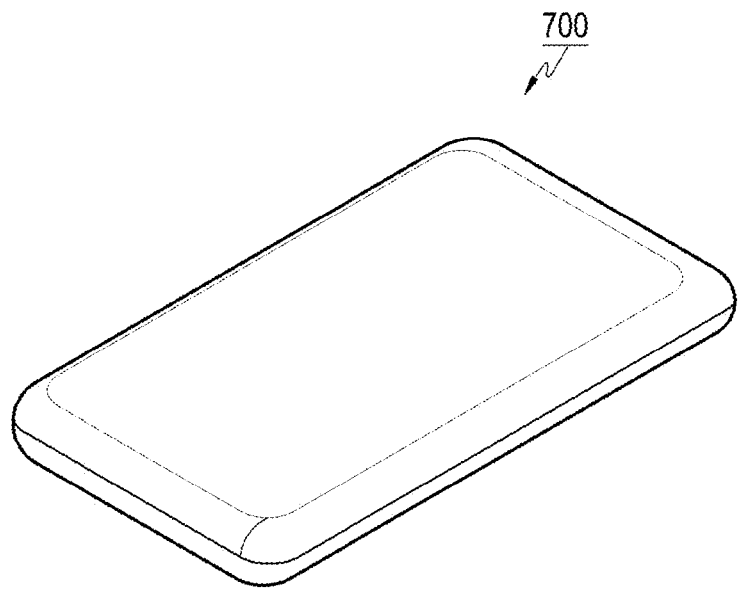
FIG. 7E is a perspective view illustrating a state in which the displays are coupled within a housing according to various embodiments of the present disclosure.

FIG. 7D is a perspective view illustrating a state in which displays are coupled to each other according to various embodiments of the present disclosure, and FIG. 7E is a perspective view illustrating a state in which displays are coupled within a housing according to various embodiments of the present disclosure.

Referring to FIGS. 7D and 7E, the first display 710 may be disposed on the front surface of the electronic device 700, and the second display (not illustrated) may be disposed on the rear surface of the electronic device 700. The first and second curved displays 731 and 732 may be coupled to the left and right sides of the first display 710, and the third and fourth curved displays 733 and 734 may be coupled to the upper and lower sides of the first display 710. The curved displays may be separately manufactured in a spherical shape. For example, the curved displays are independent of each other, but may perform display while being connected to each other.

The first and second displays and the curved displays may be assembled in parts.

In this state, the first and second semispherical displays 741 and 742 may be connected to the corners of the first and second displays and the curved displays.

According to an embodiment of the present disclosure, an electronic device may further include a housing that includes a first surface, a second surface opposite to the first surface, and a third surface formed of a side surface that surrounds the space between the first and second surfaces, wherein the first to third surfaces are all substantially formed of a material capable of transmitting light, a first display disposed in the housing, a second display disposed on the rear surface of the first display in the housing, a plurality of third displays provided around the first and second displays in the housing and connects the first and second displays in cooperation with each other, a plurality of semispherical displays provided on the corners of the first and second displays and the plurality of third displays in the housing, and a touch panel provided inside the first and second displays, the plurality of third displays, and the plurality of semispherical displays, wherein the first and second displays, the plurality of third displays, and the plurality of semispherical displays may be disposed to provide a display region to the substantially whole surface of the housing, and content may be displayed in the display region.

According to an embodiment of the present disclosure, the plurality of third displays may include first to fourth curved displays, wherein the first and second curved displays may be coupled to the left and right ends of the first and second displays, and the third and fourth curved displays may be coupled to the upper and lower ends of the first and second displays.

According to an embodiment of the present disclosure, the plurality of semispherical displays may include first and second semispherical displays, wherein the first semispherical display may be coupled to ends of the first and second curved displays and opposite ends of the third curved display, and the second semispherical display may be coupled to the other ends of the first and second curved displays and opposite ends of the fourth curved display.

Another embodiment of the plurality of curved displays, according to the various embodiments of the present disclosure, will be described.

Figure 8A:
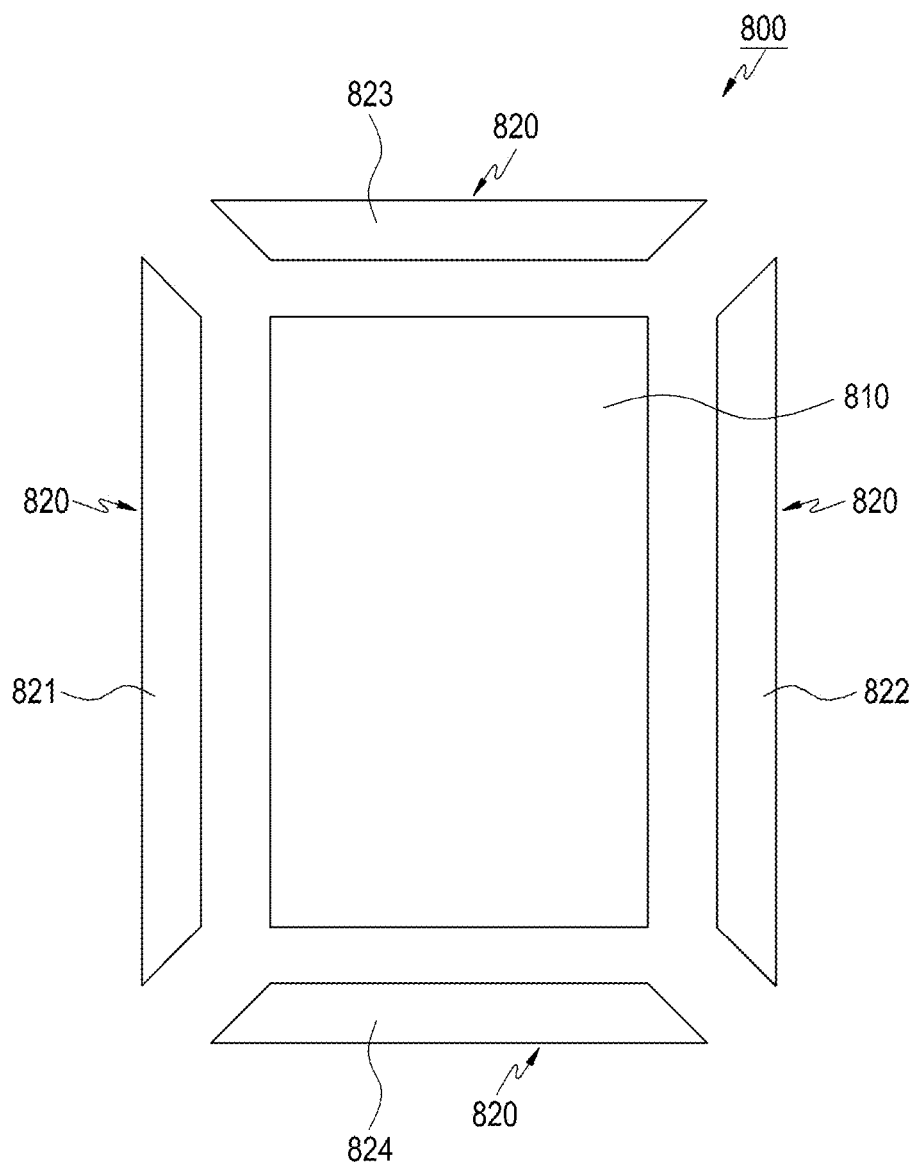
FIG. 8A is an exploded view of an electronic device according to various embodiments of the present disclosure.
Figure 8B:
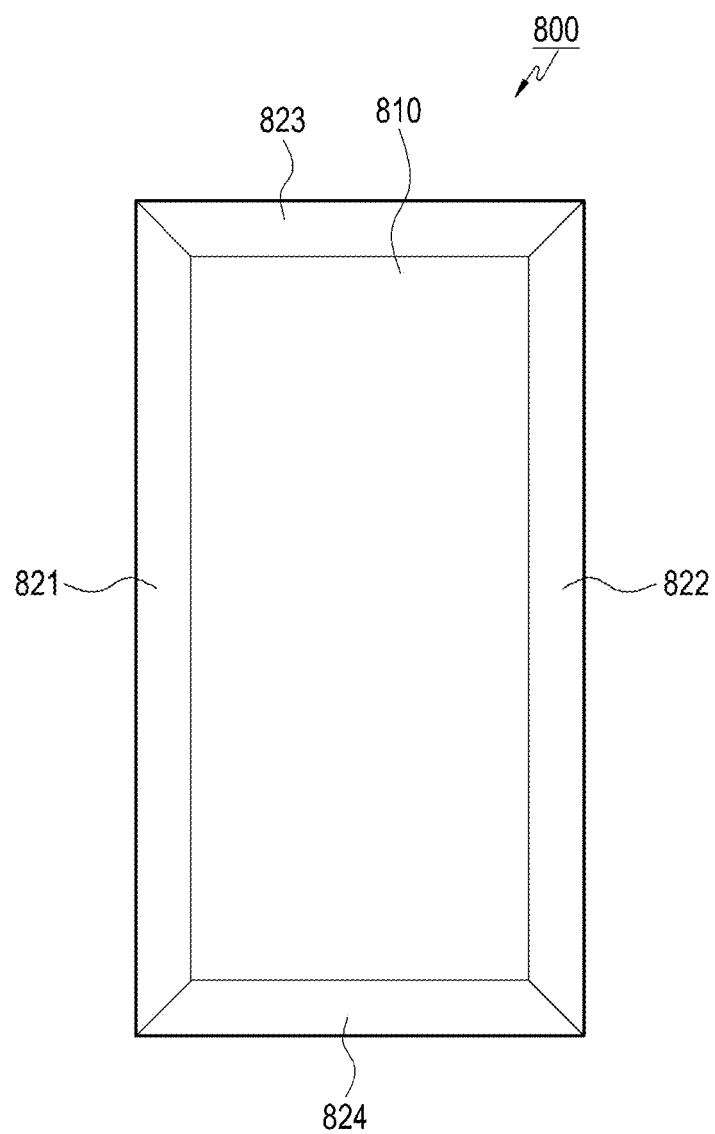
FIG. 8B is a front view illustrating a state in which the electronic device is assembled, according to various embodiments of the present disclosure.
Figure 8C:
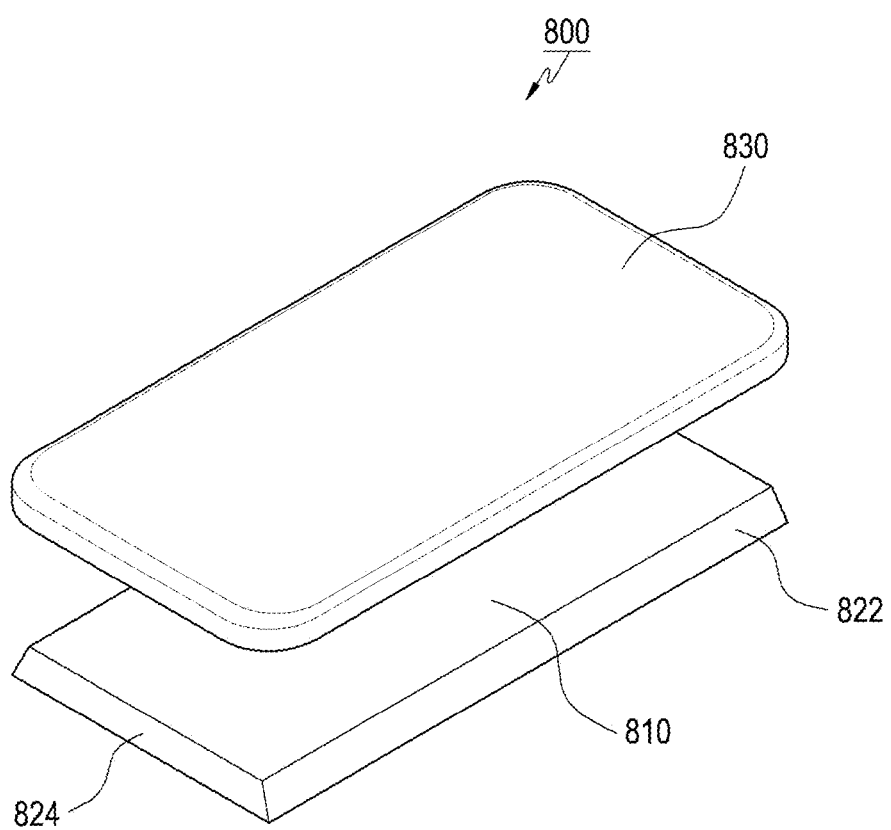
FIG. 8C is an exploded view illustrating a state before a window part and displays of an electronic device are coupled to each other, according to various embodiments of the present disclosure.
Figure 8D:
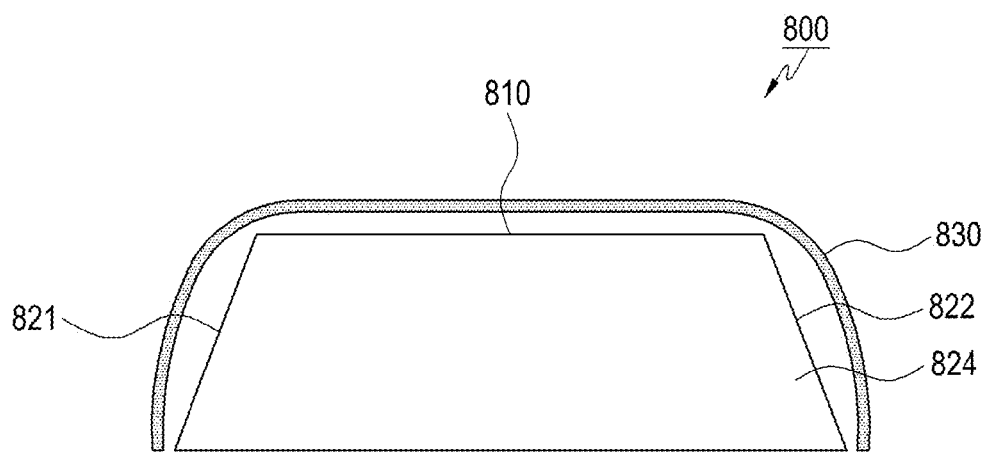
FIG. 8D is a sectional view illustrating a state in which a window part and displays of an electronic device are coupled to each other, according to various embodiments of the present disclosure.

FIG. 8A is an exploded view of an electronic device according to various embodiments of the present disclosure, FIG. 8B is a front view illustrating a state in which an electronic device is assembled according to various embodiments of the present disclosure, FIG. 8C is an exploded view illustrating a state before a window part and displays of an electronic device are coupled to each other according to various embodiments of the present disclosure, and FIG. 8D is a sectional view illustrating a state in which a window part and displays of an electronic device are coupled to each other according to various embodiments of the present disclosure.

Referring to FIGS. 8A, 8B, 8C, and 8D, an electronic device may include at least some elements configured to be similar to, or the same as, those of the electronic devices 100, 200, 20, 10, 300, 400, 500, 600, and 700, which have been described above.

Referring to FIGS. 8A and 8B, first and second trapezoidal displays 821 and 822 may be coupled to the left and right sides of a first display 810, and third and fourth trapezoidal displays 823 and 824 may be coupled to the upper and lower sides of the first display 810. In this state, the edges of the first to fourth trapezoidal displays 821 to 824 are coupled to each other. For example, the first to fourth trapezoidal displays 821 to 824 are coupled to each other while inclined surfaces formed on the opposite ends of the first and second trapezoidal displays 821 and 822 face inclined surfaces formed on the opposite ends of the third and fourth trapezoidal displays 823 and 824. Further, surfaces of the first and second trapezoidal displays 821 and 822 are coupled to the left and right side surfaces of the first display 810, and surfaces of the third and fourth trapezoidal displays 823 and 824 are coupled to the upper and lower side surfaces of the first display 810.

Referring to FIGS. 8C and 8D, a curved housing 830 is coupled to the upper portion of the single display, into which the plurality of displays are integrated, to protect the display.

For example, the trapezoidal flat displays 820 may be manufactured in a 3D structure through bonding, thereby displaying various types of content in cooperation with each other without breaking off the content. In addition, by virtue of the curved housing, the electronic device 800 may have a smooth external appearance.

After the first to fourth trapezoidal displays 821 to 824 are coupled to each other, the curved housing 830 may be coupled to the upper portion of the displays. A curved window part may be configured to have different distortion curvatures such that the internal displays may perform display while being connected to each other in a streamlined shape.

Figure 8E:
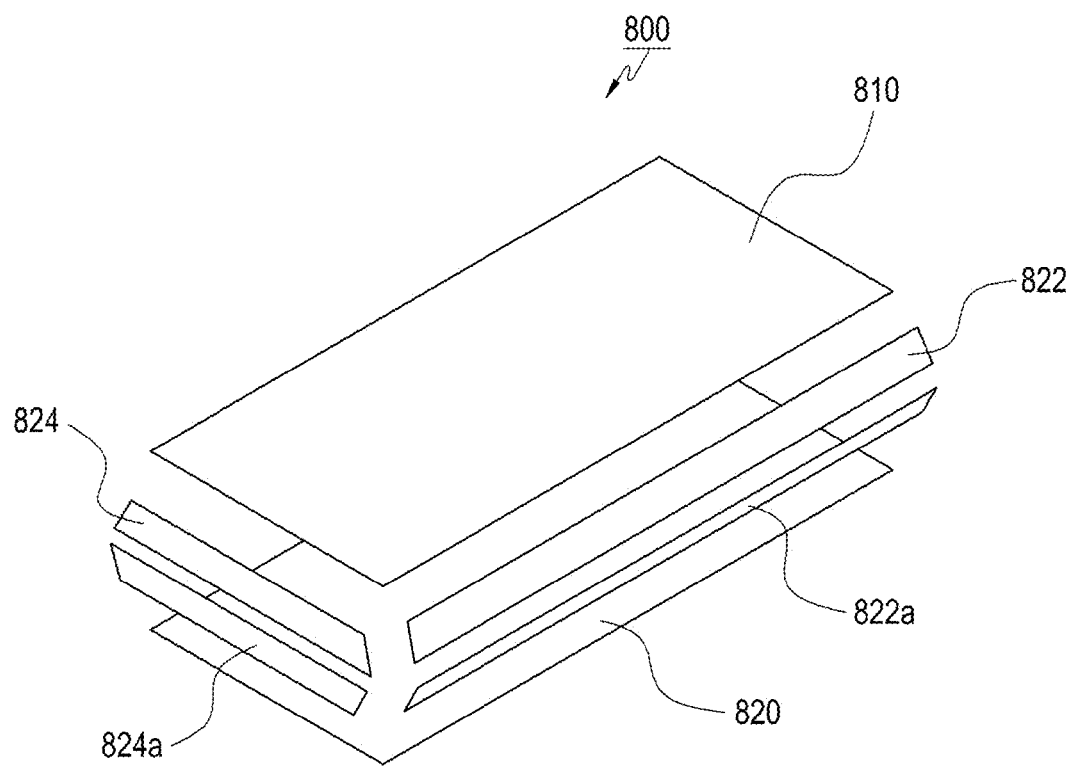
FIG. 8E is a perspective view illustrating a state in which displays of an electronic device are coupled to each other according to various embodiments of the present disclosure.
Figure 8F:
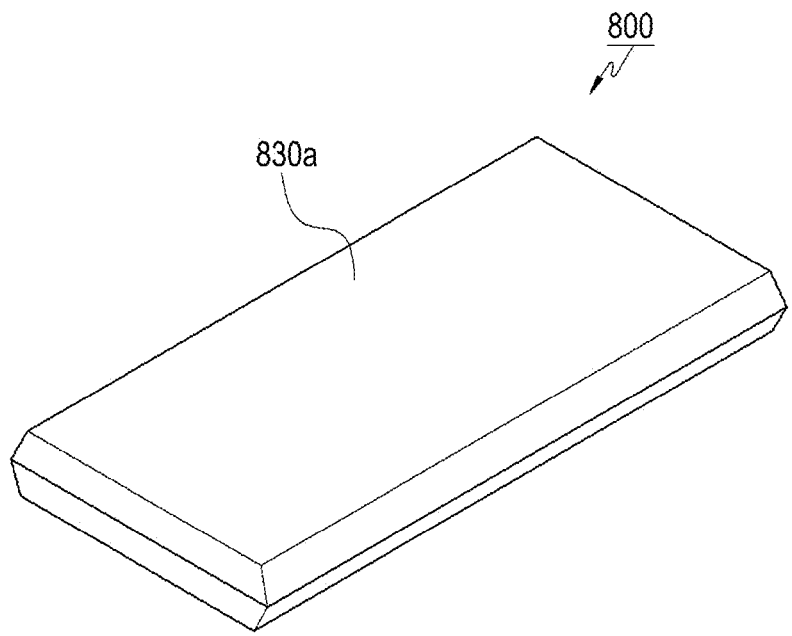
FIG. 8F is a perspective view illustrating a state in which displays are coupled within a housing according to various embodiments of the present disclosure.

FIG. 8E is a perspective view illustrating a state in which the displays of an electronic device are coupled to each other according to various embodiments of the present disclosure, and FIG. 8F is a perspective view illustrating a state in which displays are coupled within a housing according to various embodiments of the present disclosure.

Referring to FIGS. 8E and 8F, the first display 810 may be disposed on the front surface of the electronic device 800, and the trapezoidal display 820 may be disposed on the rear surface of the electronic device 800.

The first and second trapezoidal displays 821 and 822 may be coupled to the left and right sides of the first display 810, and first and second trapezoidal displays 821a and 822a may be coupled to the left and right sides of the trapezoidal display 820. Further, the third and fourth trapezoidal displays 823 and 824 may be coupled to the upper and lower sides of the first display 810, and third and fourth trapezoidal displays 823a and 824a may be coupled to the upper and lower sides of the trapezoidal display 820. In this state, the edges of the first to fourth trapezoidal displays 821 to 824 are coupled to each other, and the edges of the first to fourth trapezoidal displays 821a to 824a are coupled to each other. For example, the first to fourth trapezoidal displays 821 to 824 are coupled to each other while the inclined surfaces formed on the opposite ends of the first and second trapezoidal displays 821 and 822 face the inclined surfaces formed on the opposite ends of the third and fourth trapezoidal displays 823 and 824, and the first to fourth trapezoidal displays 821a to 824a are coupled to each other while inclined surfaces formed on the opposite ends of the first and second trapezoidal displays 821a and 822a face inclined surfaces formed on the opposite ends of the third and fourth trapezoidal displays 823a and 824a. Further, surfaces of the first and second trapezoidal displays 821, 822, 821a, and 822a are coupled to the left and right side surfaces of the displays 810 and 820, and surfaces of the third and fourth trapezoidal displays 823, 824, 823*a*, and 824*a* are coupled to the upper and lower side surfaces of the displays 810 and 820.

A housing 830*a* having a trapezoidal shape may be coupled to the upper and lower portions of the displays. The housing 830*a* may also have another shape, in addition to the trapezoidal shape.

Since the specific operations of the displays have already been described in the preceding embodiments, the description thereof will be omitted.

According to an embodiment, the plurality of third displays may include a trapezoidal display.

The configuration of an electronic device 900 that includes a plurality of displays, according to various embodiments of the present disclosure, will be described below in detail.

Figure 9A:
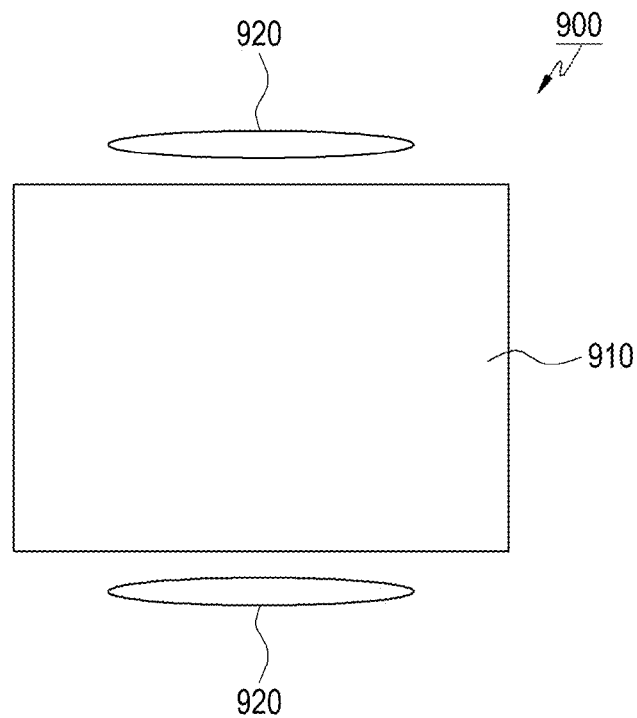
FIG. 9A is an exploded view illustrating an electronic device according to various embodiments of the present disclosure.

FIG. 9A is an exploded view of an electronic device according to various embodiments of the present disclosure.

Referring to FIG. 9A, an electronic device may include at least some elements configured to be similar to, or the same as, those of the electronic devices 100, 200, 20, 10, 300, 400, 500, 600, 700, and 800, which have been described above.

The electronic device 900 may include, for example, a first oval display 910, a plurality of second oval displays 920, a housing 930, and a touch panel (not illustrated).

The first oval display 910 may surround the whole exterior of the touch panel (not illustrated) to continuously display content displayed on the screen thereof without breaking off the content.

The plurality of second oval displays 920 are disposed on opposite sides of the first oval display 910 to continuously display the content displayed on the screen of the first oval display 910 without breaking off the content.

The housing 930 may surround the first oval display 910 and the plurality of second oval displays 920 in order to preserve the external appearance thereof and protect them.

The touch panel (not illustrated) may be included inside the displays to recognize the coordinates of a touch of a person's hand or an object on a specific point of the housing 930 and to perform the command of software specified for the corresponding touch point to process a specific function.

Since the structure and operation of the touch panel (not illustrated) have already been described in the preceding embodiments, the description thereof will be omitted.

As described above, by configuring the first oval display 910 that surrounds the touch panel (not illustrated) and the plurality of second oval displays 920 coupled to the opposite sides of the first oval display 910, it is possible to deliver visual information through the whole external appearance of the electronic device 900 and to implement an appealing design even in low-power and standby states.

Figure 9B:
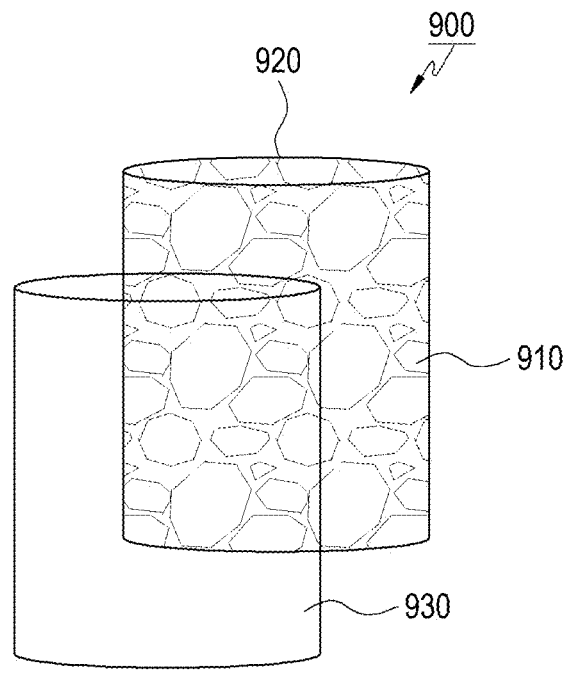
FIG. 9B is a front view illustrating a state before a window part and displays of an electronic device are coupled to each other, according to various embodiments of the present disclosure.

FIG. 9B is a front view illustrating a state before a window part and displays of an electronic device are coupled to each other according to various embodiments of the present disclosure.

Referring to FIG. 9B, the first oval display 910 may surround the outsides of the second over displays 920. According to various embodiments of the present disclosure, the first oval display 910 may be formed of a flexible display.

The operating state of the electronic device 900, according to the various embodiments of the present disclosure, will be described below.

The first oval display 910 may be disposed to surround the exterior of the touch panel (not illustrated) of the electronic device 900, and the second oval displays 920 may be disposed on the opposite sides of the first oval display 910.

The housing 930 is coupled to the outside of the single display, into which the displays are integrated, while surrounding the single display in order to protect the display.

The single display can display various types of content in cooperation with each other without breaking off the content. Accordingly, it is possible to deliver visual information through the whole external appearance of the electronic device 900 and implement an appealing design even in a low-power and standby states.

Since the specific operations of the first and second oval displays 910 and 920 are the same as those of the first and second displays that have already been described in the preceding embodiments, the description thereof will be omitted.

According to an embodiment of the present disclosure, an electronic device may include an oval housing that includes a first surface, a second surface opposite to the first surface, and a third surface formed of a side surface that surrounds the space between the first and second surfaces, wherein the first to third surfaces are all substantially formed of a material capable of transmitting light, a first oval display disposed in the housing and surrounding the whole exterior of a touch panel equipped to the electronic device, and a plurality of second oval displays provided on opposite ends of the first oval display in the oval housing, wherein the first and second oval displays may be disposed to provide a display region to the substantially whole surface of the housing, and content may be displayed in the whole display region.

According to an embodiment of the present disclosure, the first oval display may include a flexible display to surround the exterior of the second oval displays.

FIGS. 10A to 10E are views for explaining a method of turning on/off an electronic device according to various embodiments of the present disclosure.

Figure 10A:
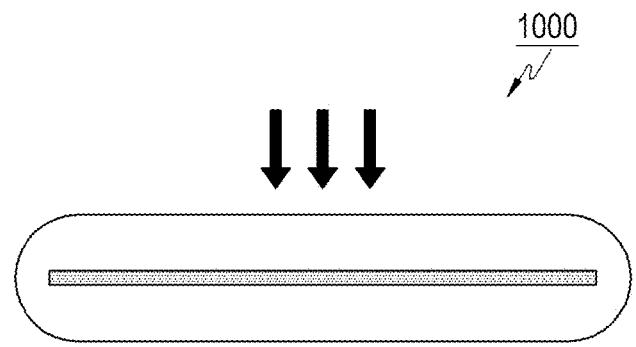
FIGS. 10A to 10E are views for explaining a method of turning on/off an electronic device according to various embodiments of the present disclosure.

Referring to FIG. 10A, an electronic device 1000 may turn on/off the power thereof by using a user input received through a touch panel that is included in the electronic device 1000. At least some elements of the electronic device 1000 may be configured to be similar to, or the same as, those of the electronic devices 100, 200, 20, 10, 300, 400, 500, 600, 700, 800, and 900, which have been described above.

The electronic device 1000 may turn on/off the power thereof using the user input received through the touch panel without using a button, which is a separate hardware element for turning on/off the electronic device 1000.

In cases where the electronic device 1000 is turned off, the touch panel has to be driven in order to receive a user input for turning on the electronic device 1000. Accordingly, in one embodiment, the electronic device 1000 may include a piezoelectric film sensor 1010 that generates a voltage according to a pressure applied from the outside of the electronic device 1000.

Figure 10B:
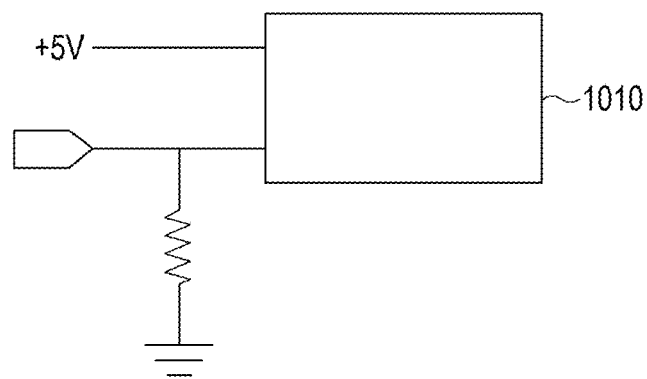

Referring to FIG. 10B, the electronic device 1000 may include a circuit that includes the piezoelectric film sensor 1010. The piezoelectric film sensor 1010 may generate an electric charge when one of the panels that face each other with a predetermined gap therebetween is drawn or pressed, in which case one becomes positively charged and the other becomes negatively charged, thereby generating a potential difference therebetween. The potential difference generated between the panels may be proportional to an applied voltage.

For example, when a user holds the electronic device 1000, the piezoelectric film sensor 1010 included in the electronic device 1000 may sense the pressure caused by the user's hold and may generate a voltage by virtue of the pressure. A controller of the electronic device 1000 may drive the touch panel and at least one of a plurality of displays by using the generated voltage.

According to an embodiment of the present disclosure, an operation of turning on the electronic device 1000 according to a user input for receiving the power for the electronic device 1000 may be performed as follows.

Figure 10C:
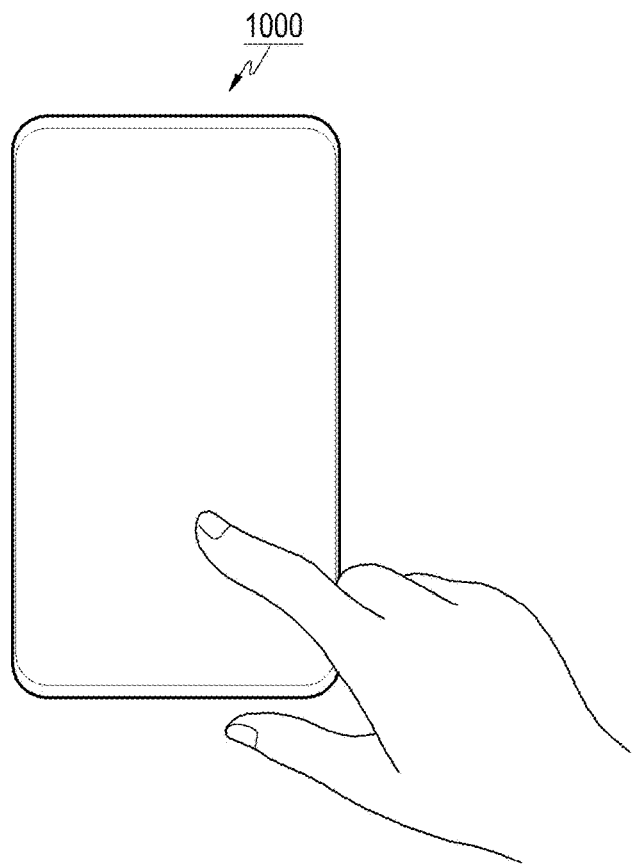

Referring to FIG. 10C, the electronic device 1000, while being turned off, may sense a pressure according to a user input by using the piezoelectric film sensor 1010 included therein and may generate a voltage by the pressure.

Figure 10D:
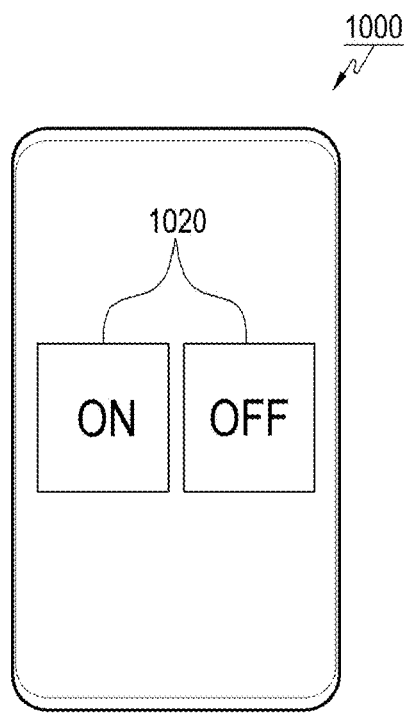

Referring to FIG. 10D, the electronic device 1000 may drive the touch panel and at least one of the displays by using the voltage generated by the pressure and may display a graphic object 1020 for receiving an input for selecting the on/off state of the electronic device. Here, the graphic object may include all objects that can be displayed through a display, such as an image, a video, etc.

As illustrated in FIG. 10D, the electronic device 1000 may display the graphic object 1020 such that a user may select the on/off of the electronic device 1000 through at least one driven display. The graphic object 1020 illustrated in FIG. 10D is merely an example for illustrative purposes, and various forms of graphic objects may be displayed in order for the user to select the on/off state of the electronic device 1000.

Figure 10E:

In cases where the electronic device 1000 receives an input for turning on the electronic device 1000 from the user, the electronic device 1000 may be turned on to display the home screen, or the screen when the electronic device 1000 was turned off, as illustrated in FIG. 10E.

After the graphic object 1020 is displayed, the electronic device 1000 may be turned on or off according to a user input.

In another embodiment, the electronic device 1000 may include a touch panel that can be driven with low power even in a state in which the electronic device 1000 is turned off. In this case, the electronic device 1000 may detect the user's hold through the touch panel, and when the user's hold is detected, the electronic device 1000 may drive at least one of the plurality of displays in order to display the graphic object 1020. The electronic device 1000 may induce the user to enter an input for selecting the on/off state of the electronic device 1000 by displaying the graphic object 1020 on at least one driven display.

Figure 11A:
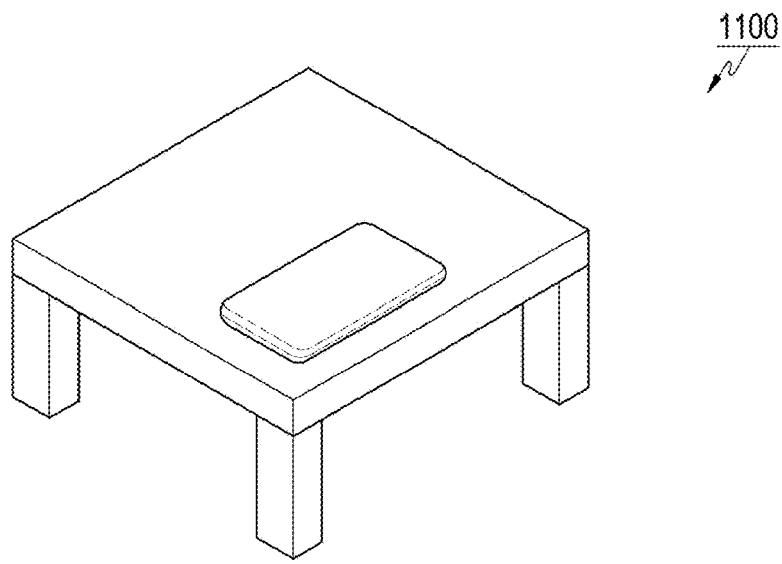
FIGS. 11A to 11C are views for explaining an operation of an electronic device when an electronic device senses a user's access or hold according to various embodiments of the present disclosure.
Figure 11B:
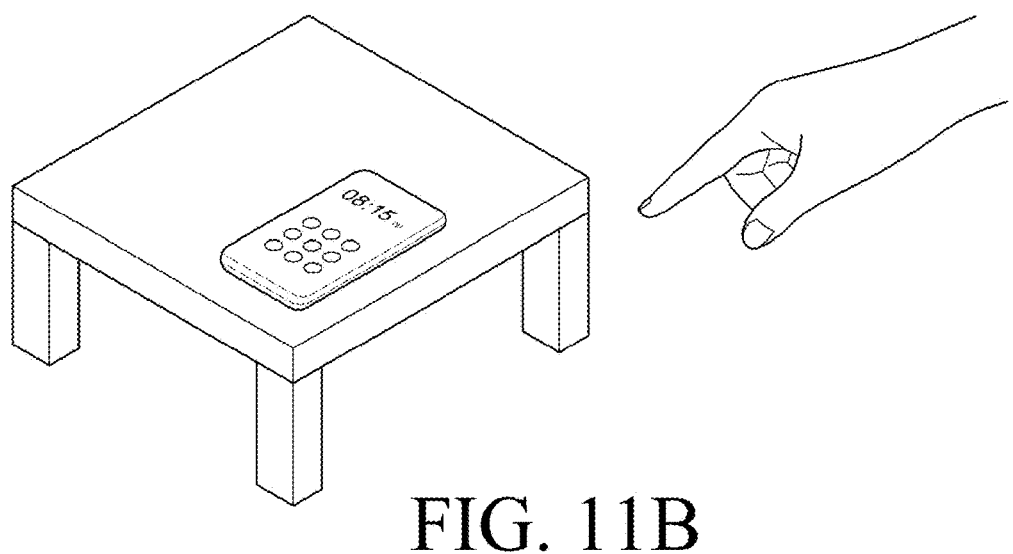
Figure 11C:
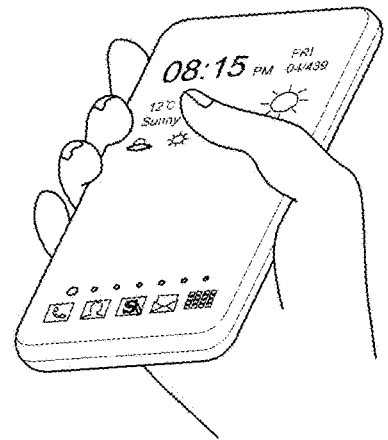

FIGS. 11A to 11C are views for explaining an operation of an electronic device when the electronic device senses a user's access or hold, according to various embodiments of the present disclosure.

Referring to FIG. 11A, when a condition for entrance to a preset low-power state is satisfied, an electronic device 1100 may enter the low-power state for reducing power consumption. At least some elements of the electronic device 1100 may be configured to be similar to, or the same as, those of the electronic devices 200, 10, 20, 300, 400, 500, 600, 700, 800, 900, and 1000, which have been described above. For example, the electronic device 1100 may enter the low-power state in cases where a user input is not received for a preset period of time, or in cases where there is no running task or application.

Referring to FIG. 11B, the electronic device 1100 may sense a user's access to the electronic device 1100 through at least one sensor. The electronic device 1100 may include various sensors that can sense the state information thereof. For example, the electronic device 1100 may sense the state information thereof through various sensors, such as a gyro sensor, a grip sensor, a proximity sensor, a biometric sensor, etc. The state information of the electronic device may include various types of information on the state of the electronic device, such as the direction of the electronic device 1100, a pressure applied to the electronic device 1100, whether the user holds the electronic device 1100 or not, whether the user accesses the electronic device 1100 or not, etc.

A controller (e.g., the processor 120) included in the electronic device 1100 may determine whether the user accesses the electronic device 1100 by using the state information of the electronic device 1100 that is sensed through the sensor. When it is determined that the user accesses the electronic device, the controller may control to display a preset graphic object on at least one of the plurality of displays of the electronic device. For example, when it is determined that the user accesses the electronic device 1100, the electronic device 1100 may control to display a graphic object for representing a lock screen on the at least one display. Further, when it is determined that the user accesses the electronic device, the controller may release the low-power state and may display the graphic object, and when an unlocking command is input by the user, the controller may also control to release the low-power state.

Referring to FIG. 11C, the electronic device 1100 may sense whether the user has held the electronic device 1100 through at least one sensor. As described above, the electronic device 1100 may include various sensors that can sense the state information of the electronic device, and may sense whether the user has held the electronic device 1100 through the various sensors.

In cases where the user's hold is detected, the controller may release the low-power state of the electronic device 1100. Further, when the user's hold is detected and an unlocking command is received, the controller may also release the low-power state. In one embodiment, the low-power state may include a state in which one of the multiple displays is turned on. For example, the low-power state may include a state in which only the display configured as the main display is turned on and the rest of the multiple displays are turned off, except the main display. Further, the low-power state may include a state in which at least one display that is configured by the user among the multiple displays is turned on and the rest of them are turned off. In addition, the low-power state may include not only a state of turning off the displays, but also various states of reducing the power consumed by the driven displays, such as adjusting the brightness of the screens of the multiple displays.

The controller may identify, through a touch panel, the user's hand with which the user has held the electronic device 1100. For example, the controller may identify the contact area with the user's hand through the touch panel, and may identify the user's hand with which the user has held the electronic device 1100 based on the identified contact area. Since the shape and size of the contact area when the user holds the electronic device 1100 with the right hand are different from those when the user holds the electronic device 1100 with the left hand, the controller can identify the user's hand with which the user has held the electronic device 1100 based on the identified contact area.

Further, based on the identified contact area, the controller may determine at least one display that will display a graphic object among the plurality of displays. For example, the controller may determine at least one display of which the contact area with the user's hand is smaller than a preset threshold value, and may control to display the graphic object on the determined display.

In addition, the controller may determine a first region where the graphic object, content, etc. are to be displayed on the determined at least one display by using at least one sensor that senses the state information of the electronic device, such as a gyro sensor. For example, the controller may determine the remaining portion, except the portion of the determined at least one display with which the user's hand makes contact, to be the first region, and may control to display the graphic object in the first region.

In one embodiment, the controller may also determine at least one display that will display the graphic object among the plurality of displays by using at least one sensor that senses the state information of the electronic device, such as a gyro sensor. For example, the controller may sense the direction of the electronic device 1100 using the gyro sensor and may determine at least one display to display the graphic object based on the sensed direction.

Figure 12:
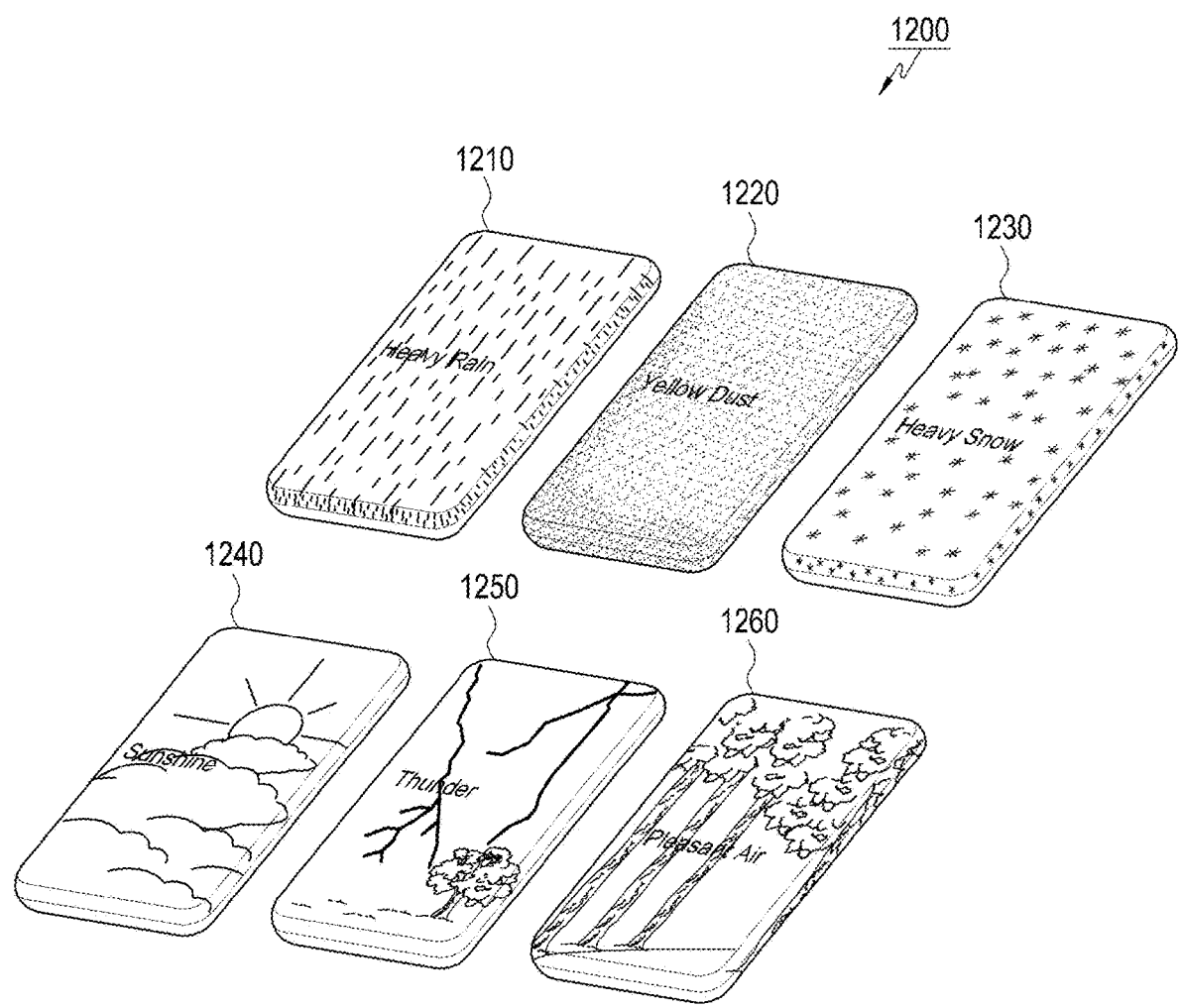
FIG. 12 illustrates graphic objects that are displayed in an electronic device according to various embodiments of the present disclosure.

FIG. 12 illustrates graphic objects that are displayed in an electronic device according to various embodiments of the present disclosure.

Referring to FIG. 12, a controller of an electronic device 1200 may acquire weather information from an external server for providing weather information through a communication interface 170 via a network. At least some elements of the electronic device 1200 may be configured to be similar to, or the same as, those of the electronic devices 100, 200, 20, 10, 300, 400, 500, 600, 700, 800, 900, 1000, and 1100, which have been described above. As illustrated in FIG. 12, based on the acquired weather information, the controller may display a graphic object that corresponds to the acquired weather information, among a plurality of graphic objects for representing weather, on at least one of the plurality of displays of the electronic device. The plurality of graphic objects for representing weather may be stored in a memory (e.g., the memory 130) of the electronic device 1200. The plurality of graphic objects may be stored in connection with information on the weather represented thereby.

Referring to FIG. 12, the plurality of graphic objects for representing weather may include a graphic object 1210 for representing heavy rain, a graphic object 1220 for representing yellow dust, a graphic object 1230 for representing heavy snow, a graphic object 1240 for representing sunshine, a graphic object 1250 for representing thunder, a graphic object 1260 for representing pleasant air, etc. However, these are merely for illustrative purposes, and the plurality of graphic objects may include various graphic objects for representing weather, without being limited thereto. Further, a user may also set a graphic object to be displayed according to weather information.

Figure 13:
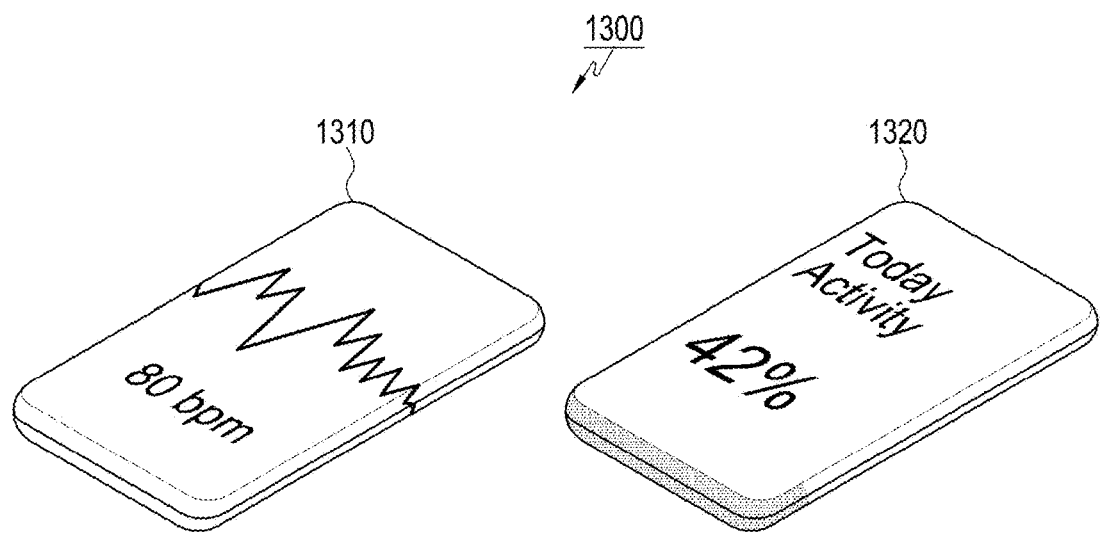
FIG. 13 illustrates graphic objects for representing a user's state information according to various embodiments of the present disclosure.

FIG. 13 illustrates graphic objects for representing a user's state information according to various embodiments of the present disclosure.

Referring to FIG. 13, an electronic device 1300 may include at least one sensor for sensing the user's state information. For example, the user's state information may include all information relating to the user's state, such as a heart rate, the number of operations of the user, the amount of activity, a work rate, a calorie, etc. At least some elements of the electronic device 1300 may be configured to be similar to, or the same as, those of the electronic devices 100, 200, 20, 10, 300, 400, 500, 600, 700, 800, 900, 1000, 1100, and 1200, which have been described above.

A controller of the electronic device 1300 may display the user's state information, which is acquired through the sensor, on at least one display in various manners through various graphic objects. For example, the controller may acquire state information on the user's heart rate and may display the user's heart rate using a graph 1310. Further, the controller may acquire state information on the user's activity, display a graphic object 1320 that indicates the state information with text or a numerical number through one of the plurality of displays of the electronic device, and display the state information on the user's activity through another display by using a graphic object 1330 having a progress bar shape.

In addition, the controller may display a graphic object that represents a relation between preset reference information for the user's state information and the user's sensed state information, which makes it possible for a user to intuitively recognize his/her sensed state information. For example, in a case where the user's state information is the number of operations, the controller may display a relation between the number of preset target operations that the user has to take and the number of sensed operations of the user. This may help the user to intuitively recognize the number of remaining operations to the number of target operations.

Figure 14:
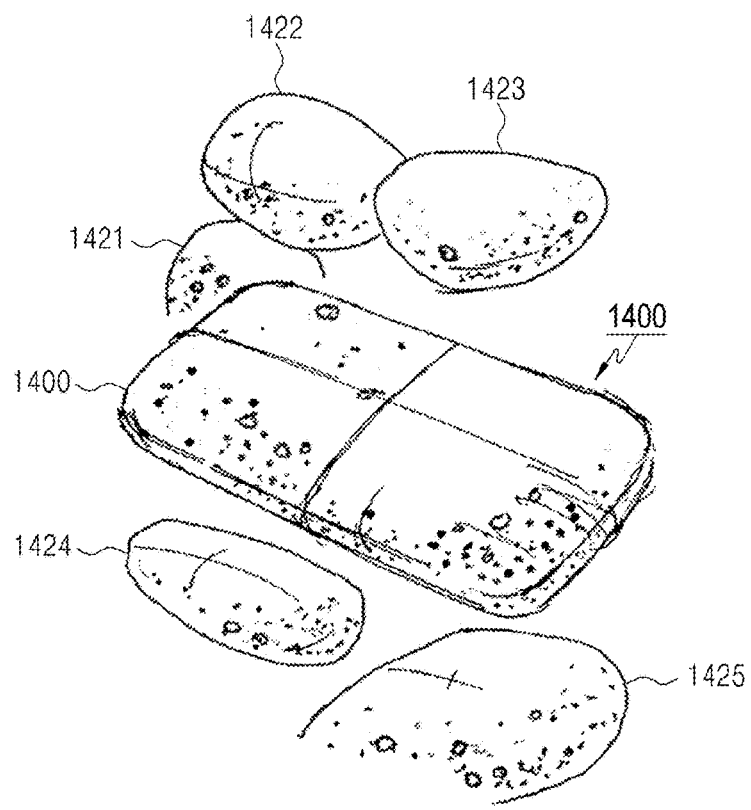
FIG. 14 illustrates graphic objects for representing surroundings according to various embodiments of the present disclosure.

FIG. 14 illustrates graphic objects for representing surroundings according to various embodiments of the present disclosure.

Referring to FIG. 14, a controller of an electronic device 1400 may detect color information for a surrounding environment of the electronic device 1400 through a camera module. At least some elements of the electronic device 1400 may be configured to be similar to, or the same as, those of the electronic devices 100, 200, 20, 10, 300, 400, 500, 600, 700, 800, 900, 1000, 1100, 1200, and 1300, which have been described above.

Further, the controller may detect sound information for a surrounding environment of the electronic device 1400 through a microphone. The controller may select a graphic object corresponding to at least one of the acquired color and sound information from a plurality of graphic objects for representing surrounding environments. The controller may control to display the selected graphic object on at least one of the plurality of displays of the electronic device. The plurality of graphic objects for representing the surrounding environments may be stored in a memory (e.g., the memory 130) of the electronic device 1400. The plurality of graphic objects may be stored in connection with color information and/or sound information of the surrounding environments, which are represented by the plurality of graphic objects.

Referring to FIG. 14, the controller may detect color information of pebbles 1421 to 1425 around the electronic device 1400 through the camera. The controller may select a first graphic object 1410 corresponding to the detected color information of the pebbles 1421 to 1425 around the electronic device from the plurality of graphic objects stored in the memory. The controller may control to display the first graphic object on at least one of the plurality of displays of the electronic device.

According to an embodiment of the present disclosure, the controller may detect the color of a surrounding environment of the electronic device 1400 through the camera. The controller may detect the color of the surrounding environment (e.g., a desk=brown) and may control to display brown, or a color similar to brown, on the display.

Further, in cases where a user is in a subway station, the controller may detect color information of the subway station, which is a surrounding environment, through the camera and may detect sound information of the subway station through the microphone. The controller may select a second graphic object corresponding to the detected color and/or sound information from the plurality of graphic objects and may control to display the second graphic object on at least one of the plurality of displays.

Figure 15:
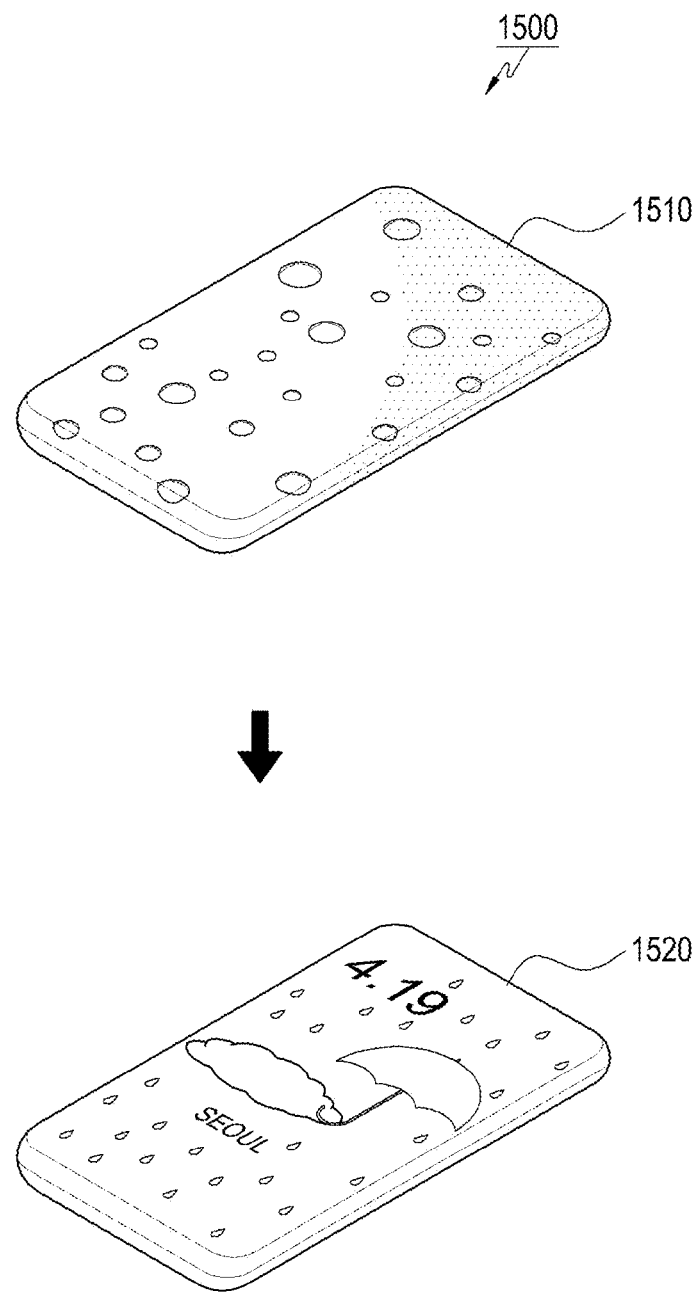
FIG. 15 is a view for explaining a method in which a graphic object displayed in an electronic device changes based on a user's pattern of usage according to various embodiments of the present disclosure.

FIG. 15 is a view for explaining a method in which a graphic object displayed in an electronic device changes based on a user's pattern of usage according to various embodiments of the present disclosure.

Referring to FIG. 15, a controller of an electronic device 1500 may store the user's pattern of usage of the electronic device 1500 in a memory. At least some elements of the electronic device 1500 may be configured to be similar to, or the same as, those of the electronic devices 100, 200, 20, 10, 300, 400, 500, 600, 700, 800, 900, 1000, 1100, 1200, 1300, and 1400, which have been described above. The controller may store the user's pattern of usage of the electronic device 1500 according to time or locations, or in consideration of both time and locations. In cases where the number of times that the user has identified weather information at a specific time exceeds a preset number of times, the controller may store the user's pattern of usage in which the user identifies weather information at the specific time. Further, in cases where the number of times that the user has identified traffic information at a specific location exceeds a preset number of times, the controller may store the user's pattern of usage in which the user identifies traffic information at the specific location. The above described method for setting the user's pattern of usage is merely an example for illustrative purposes, and the controller may store the user's pattern of usage in the memory according to time or locations in various manners.

Based on the pattern of usage stored in the memory, the controller may execute a first application corresponding to at least one of the time and location identified by the electronic device 1500, or may control to display first information on at least one of the plurality of displays of the electronic device.

For example, when it is identified that specific time has elapsed, the controller may control to display weather information on the at least one display. Further, when it is identified that the location of the electronic device 1500 corresponds to a specific location, the controller may provide traffic information, or may control to execute an application that provides traffic information.

The controller, when providing the first information based on the user's pattern of usage, may display the first information through a graphic object 1510 in order for a user to intuitively recognize the first information. For example, when displaying weather information, the controller may display a graphic object 1520 corresponding to the weather information, and when displaying the traffic information, the controller may display a graphic object corresponding to the traffic information.

Figure 16:
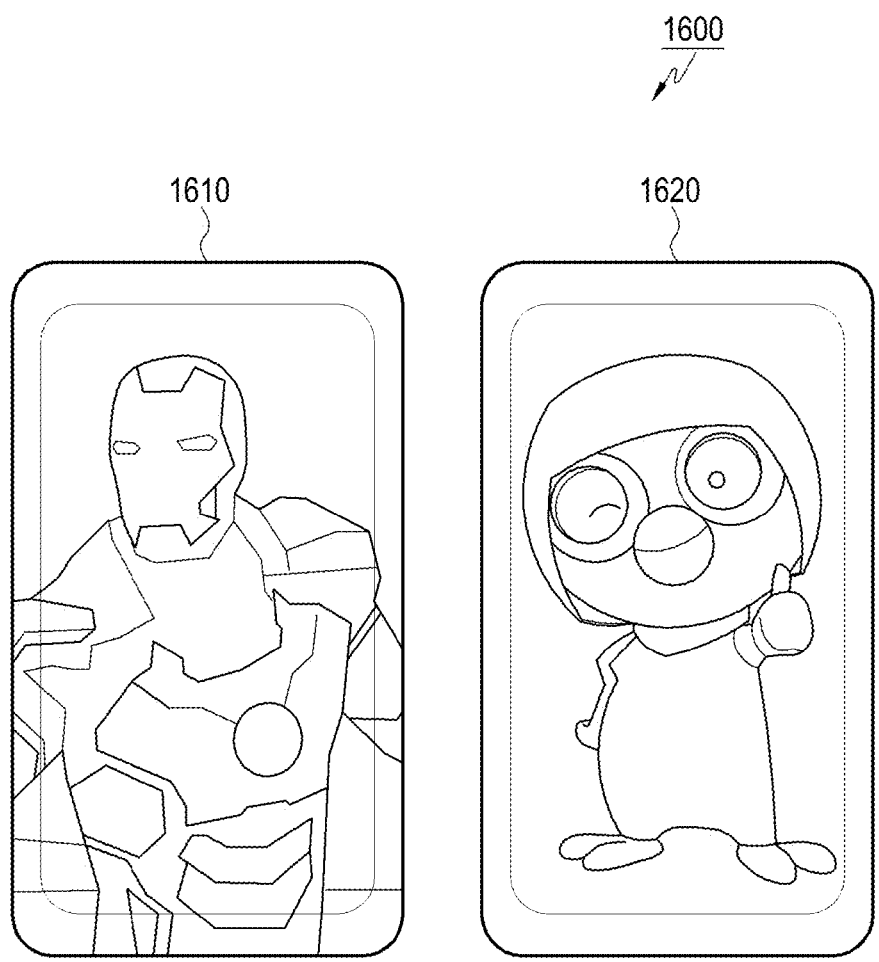
FIG. 16 illustrates images that are displayed on at least one of a plurality of displays of an electronic device according to various embodiments of the present disclosure.

FIG. 16 illustrates images that are displayed on at least one of the plurality of displays of an electronic device according to various embodiments of the present disclosure.

Referring to FIG. 16, a controller of an electronic device 1600 may control to display a graphic object, which is preset by a user, on at least one of the plurality of displays of the electronic device at all times. For example, the controller may control to display preset graphic objects 1610 and 1620 through a display, such as e-ink display, at all times even when the electronic device 1600 is turned off. At least some elements of the electronic device 1600 may be configured to be similar to, or the same as, those of the electronic devices 100, 200, 20, 10, 300, 400, 500, 600, 700, 800, 900, 1000, 1100, 1200, 1300, 1400, and 1500, which have been described above.

Further, the controller may control to display the screen of a running application through one display and to display the preset graphic objects 1610 and 1620 through the rest of the displays irrespective of the operation of the application.

Figure 17:
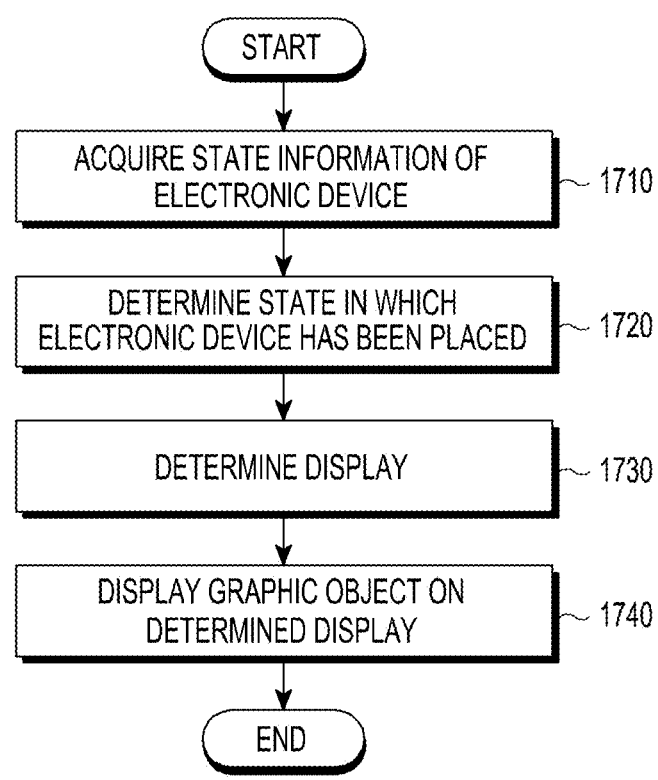
FIG. 17 is a flowchart illustrating a method of displaying a graphic object by an electronic device according to various embodiments of the present disclosure.

FIG. 17 is a flowchart illustrating a method of displaying a graphic object by an electronic device, according to various embodiments of the present disclosure.

Referring to FIG. 17, a method of determining at least one display that will display the graphic objects will be described. At least some elements of the electronic device that will be described with reference to FIG. 17 may be configured to be similar to, or the same as, those of the electronic devices 100, 200, 20, 10, 300, 400, 500, 600, 700, 800, 900, 1000, 1100, 1200, 1300, 1400, 1500, and 1600, which have been described above.

In operation 1710, a controller of the electronic device may acquire the state information of the electronic device through at least one sensor. The state information of the electronic device may include various types of information on the state of the electronic device, such as the direction of the electronic device, a pressure applied to the electronic device, whether a user holds the electronic device or not, whether the user accesses the electronic device or not, etc.

In operation 1720, the controller may determine the state in which the electronic device has been placed based on the state information of the electronic device. For example, the controller may determine the state in which the electronic device has been placed according to the directions of the plurality of displays that are identified based on the direction of the electronic device that is included in the state information of the electronic device. For example, when it is identified that a second display is directed toward the ground and a first display is directed toward the opposite direction to the ground, the controller may determine that the electronic device has been placed with the second display as the rear surface thereof.

Further, the controller may determine the state in which the electronic device has been placed based on information acquired through the sensor included in the electronic device. For example, the controller may determine the state in which the electronic device has been placed based on the direction toward which the gravitational force is directed and the directions of the displays, which are acquired through the sensor. Moreover, the controller may also determine the state in which the electronic device has been placed by determining, through a proximity sensor, whether the display oriented in the direction in which the proximity sensor is located makes contact with another object or the user's body. In addition, the controller may also determine the state in which the electronic device has been placed by recognizing the user's face through a camera included in the electronic device and tracking the user's line of sight through the recognized face of the user. In this way, the controller may control to display a video, an image, and the like according to the user's line of sight even while one of the plurality of displays is directed upward.

However, it is apparent to those skilled in the art that the above described method of determining the state in which the electronic device is placed is merely an example for illustrative purposes and the state in which the electronic device has been placed may be determined in various manners using the state information of the electronic device that is acquired through the sensor.

In operation 1730, the controller may determine at least one display that will display a graphic object among the plurality of displays according to the determination result of operation 1720 on the state in which the electronic device has been placed. For example, when it is determined that the electronic device has been placed with the second display as the rear surface thereof, the controller may determine to display a graphic object through at least one of the remaining displays other than the second display.

In operation 1740, the controller may control to display a graphic object on the at least one display determined in operation 1730, or in at least one region.

Although it has been described above that the electronic device includes the plurality of displays, the present disclosure is not limited thereto, and the controller may determine the state in which the electronic device has been placed even though the electronic device includes only one flexible display. For example, in cases where the electronic device includes only one flexible display, the controller may divide the flexible display into a plurality of regions and may determine at least one first region where a graphic object is to be displayed according to the directions toward which the plurality of regions are directed.

Further, in cases where the electronic device includes only one flexible display, the controller may determine to display a graphic object through the remaining regions other than the region located on the rear surface of the electronic device among the plurality of preset regions of the flexible display.

However, this is merely for illustrative purposes, and the electronic device, without being limited thereto, may also display a graphic object using all the plurality of displays irrespective of the state in which the electronic device has been placed.

FIGS. 18A to 18D are views for explaining a method of changing a display on which an image is displayed according to various embodiments of the present disclosure.

Referring to FIGS. 18A to 18D, a controller of an electronic device 1800 may display graphic objects, such as images, icons, etc., through a plurality of displays. Although not illustrated, the electronic device 1800 may include only one flexible display, and the flexible display may be divided into a plurality of regions to operate in the same manner. At least some elements of the electronic device 1800 may be configured to be similar to, or the same as, those of the electronic devices 100, 200, 20, 10, 300, 400, 500, 600, 700, 800, 900, 1000, 1100, 1200, 1300, 1400, 1500, and 1600, which have been described above.

For example, the controller may display a first image selected by a user input, among the plurality of images, on a first display disposed on the front surface of the electronic device 1800, and may display the remaining images, other than the first image, as a thumbnail image on displays (e.g., a first curved display and a second curved display, or a second region of the flexible display) that are disposed on the side surfaces of the electronic device.

Further, the controller may display an image currently photographed by a camera module on the first display, and may display images previously photographed by the camera module as a thumbnail image on the displays (e.g., the first curved display and the second curved display, or the second region of the flexible display) that are disposed on the side surfaces of the electronic device.

Further, the controller may display the execution screen of a first application corresponding to a first icon selected by a user input, among the plurality of icons, on the first display, and may display the remaining icons, other than the first icon, on the displays (e.g., the first curved display and the second curved display, or the second region of the flexible display) that are disposed on the side surfaces of the electronic device.

As described above, the controller may display images, icons, etc. selected by a user input through the first display disposed on the front surface of the electronic device 1800, or through the first region of the flexible display, and may display unselected images, icons, etc. through the first and second curved displays disposed on the side surfaces of the electronic device, or through the second region of the flexible display.

Figure 18A:
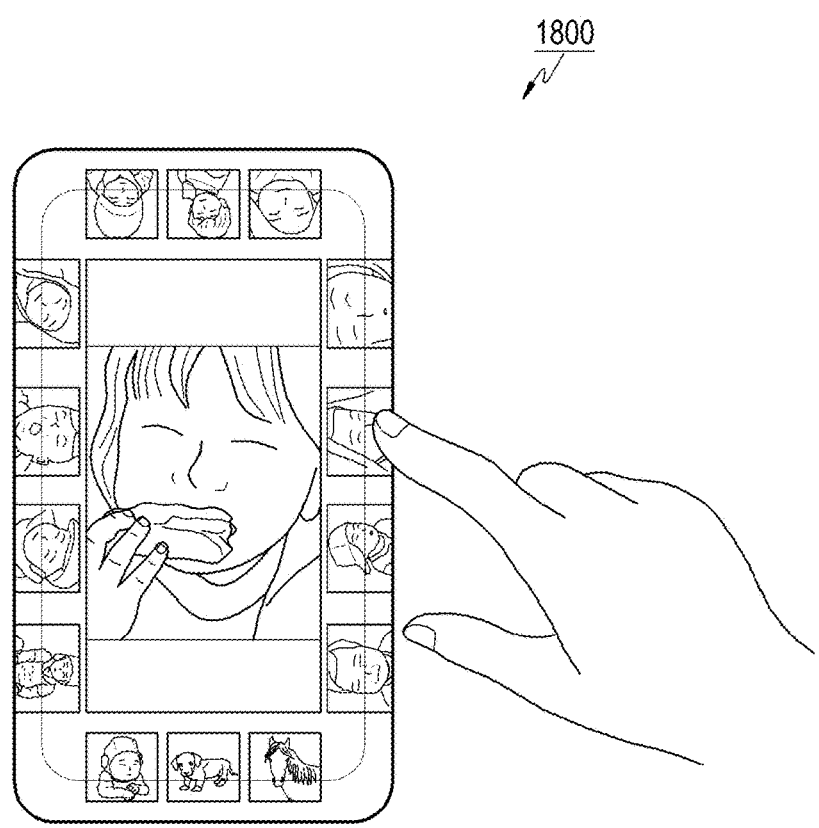
FIGS. 18A to 18D are views for explaining a method of changing a display on which an image is displayed according to various embodiments of the present disclosure.
Figure 18B:
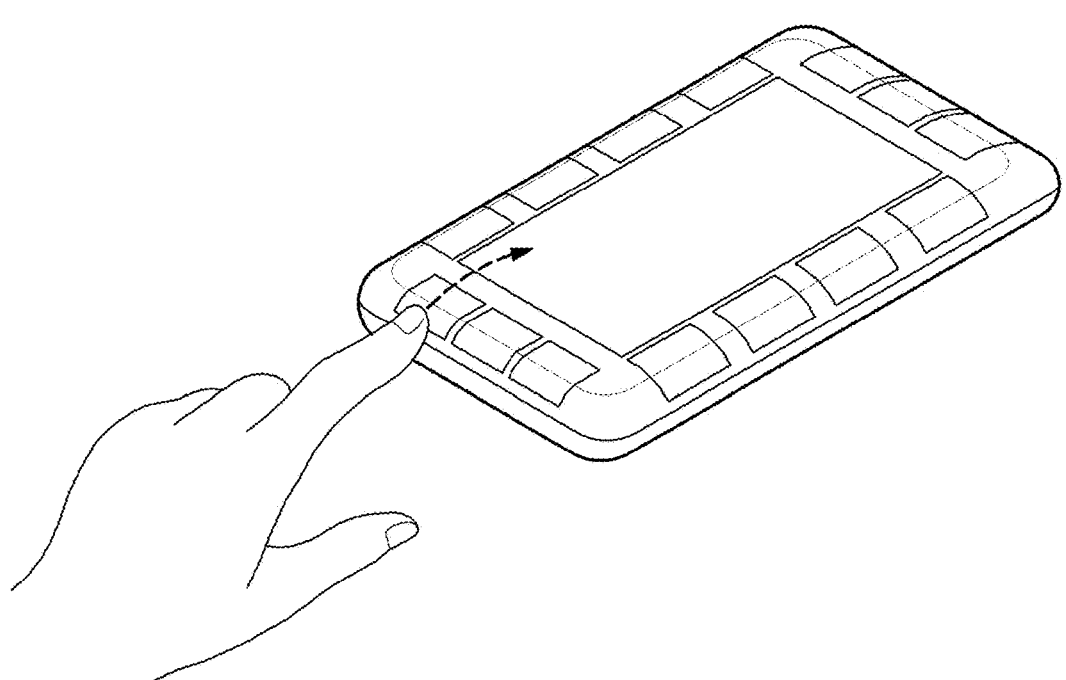

Referring to FIG. 18B, the controller may change the graphic object displayed on the first display disposed on the front surface of the electronic device 1800, or the graphic object displayed in the first region of the flexible display, according to a user input.

For example, a user may select a first thumbnail image from the plurality of thumbnail images that are displayed through the first and second curved displays disposed on the side surfaces of the electronic device or through the second region of the flexible display. Further, the user may move the first thumbnail image to the first display or the first region through a drag and drop input. When the user input is recognized, the controller may control to change the currently displayed image to an image corresponding to the first thumbnail image and display the changed image, and may control to display the currently displayed image in the form of a thumbnail image on the displays (e.g., the first and second curved displays, or the second region of the flexible display) that are disposed on the side surfaces of the electronic device. As described above, the controller may change the graphic object displayed on the first display, or in the first region, according to the user input.

Figure 18C:
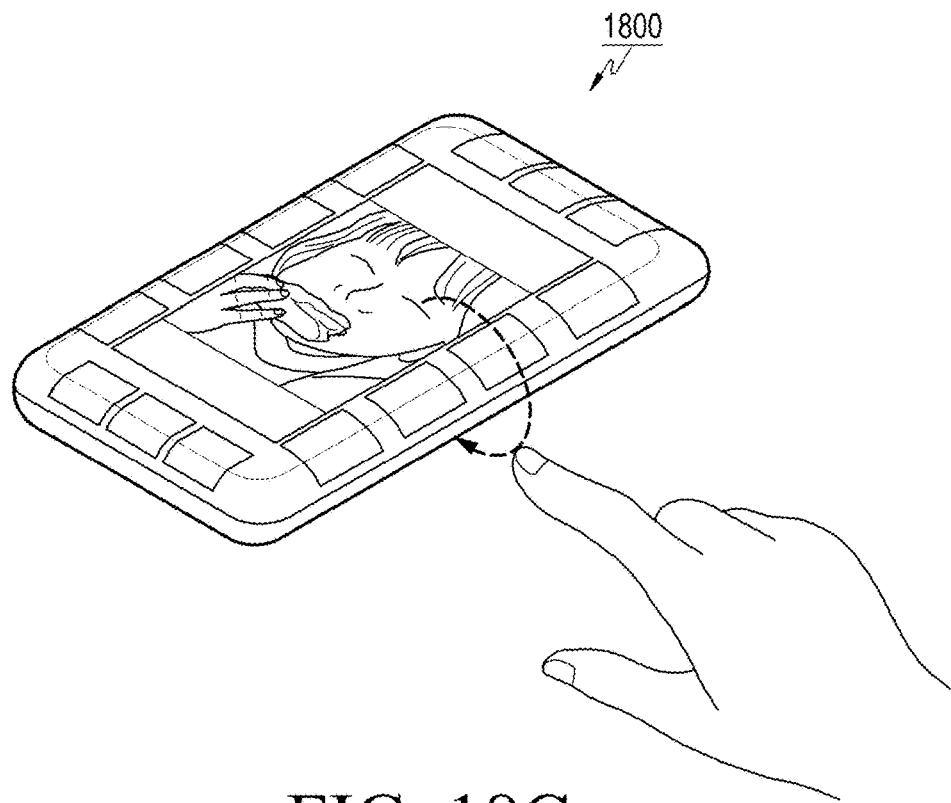

Referring to FIG. 18C, according to a user input, the controller may move the graphic object displayed on the first display disposed on the front surface of the electronic device 1800, or the graphic object displayed in the first region of the flexible display, to the second display disposed on the rear surface of the electronic device 1800, or the third region of the flexible display.

Figure 18D:
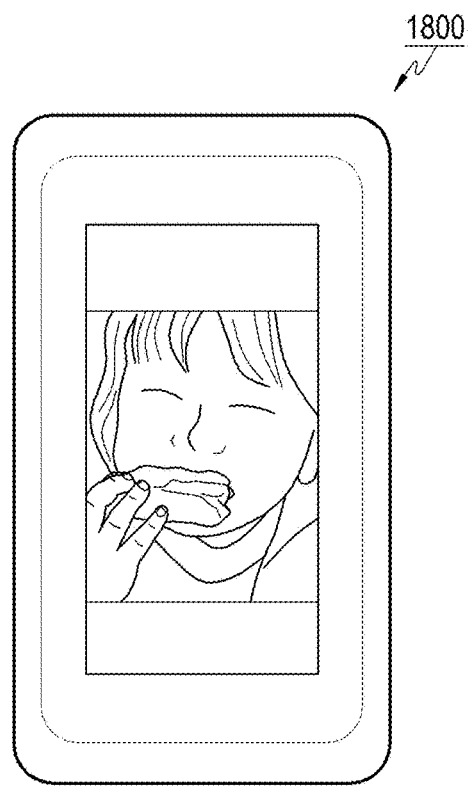

For example, the user may select the image displayed on the first display and may move the selected image to the second display or the third region through a drag and drop input. According to the user input, the controller may control to display the image, which is displayed on the first display, on the second display, or in the third region, as illustrated in FIG. 18D.

Figure 19A:
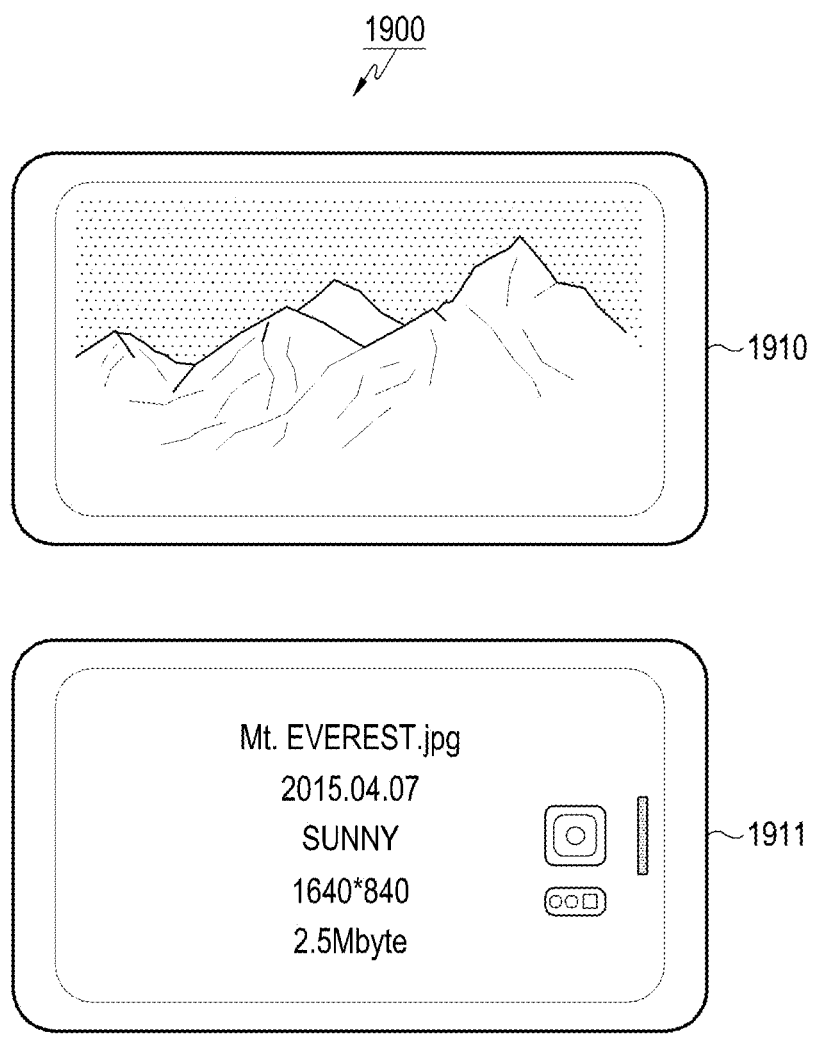
FIG. 19A illustrates an electronic device that displays one of an image and information relating thereto according to various embodiments of the present disclosure.

FIG. 19A illustrates an electronic device that displays one of an image and information relating thereto according to various embodiments of the present disclosure.

Referring to FIG. 19A, a controller of an electronic device 1900 may determine a state in which the electronic device 1900 has been placed based on the state information of the electronic device 1900 sensed by at least one sensor, and may control to display one of an image and information relating thereto on at least one of the plurality of displays of the electronic device according to the determined state in which the electronic device has been placed. At least some elements of the electronic device 1900 may be configured to be similar to, or the same as, those of the electronic devices 100, 200, 20, 10, 300, 400, 500, 600, 700, 800, 900, 1000, 1100, 1200, 1300, 1400, 1500, 1600, and 1800, which have been described above.

The controller may display an image 1910 through a first display of the electronic device. In cases where a user turns the electronic device 1900 down while the image 1910 is being displayed, the first display may be directed downward, and a second display opposite to the first display may be directed upward. Accordingly, the controller may display information 1911 relating to the image 1910 through the second display. As described above, the controller may control to display one of the image and the information relating thereto according to the state in which the electronic device 1900 has been placed.

Figure 19B:
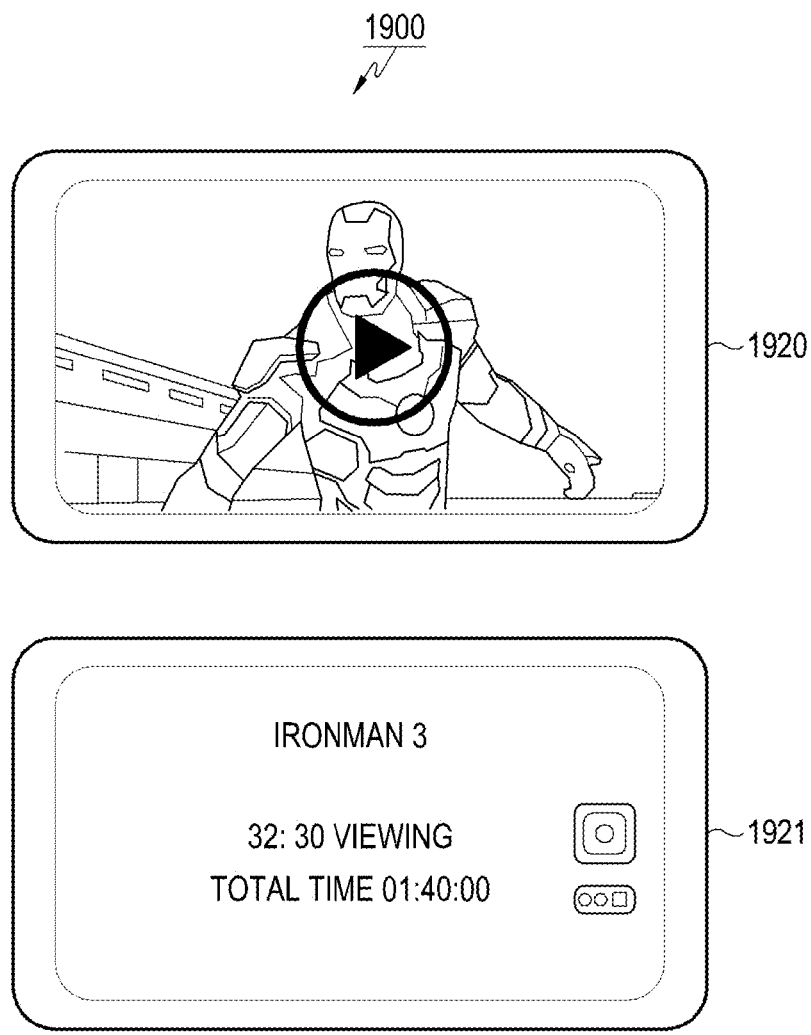
FIG. 19B illustrates an electronic device that displays one of a video and information relating thereto according to various embodiments of the present disclosure.

FIG. 19B illustrates an electronic device that displays one of a video and information relating thereto according to various embodiments of the present disclosure.

The controller of the electronic device 1900 may determine a state in which the electronic device 1900 has been placed based on the state information of the electronic device 1900 sensed by at least one sensor, and may control to display one of a video and information relating thereto on at least one of the plurality of displays of the electronic device according to the determined state in which the electronic device has been placed.

Referring to FIG. 19B, the controller may reproduce a video 1920 through the first display. In cases where a user turns the electronic device 1900 down while the video 1920 is being reproduced, the first display may be directed downward, and the second display opposite to the first display may be directed upward. Accordingly, the controller may display information 1921 relating to the video 1920 through the second display. In addition, the controller may control to stop the video that is being reproduced through the first display.

Figure 19C:
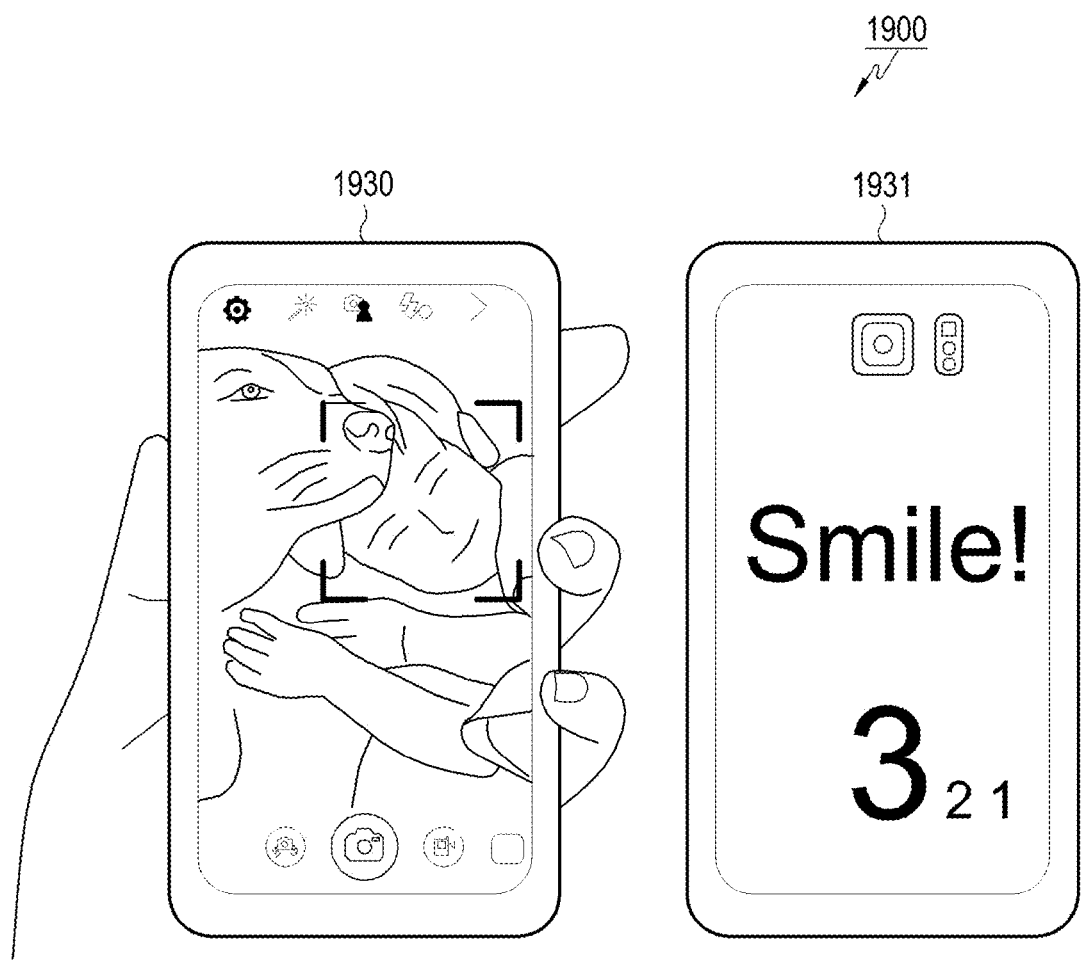
FIG. 19C illustrates an electronic device that displays an execution screen of an application and a graphic object corresponding to the application according to various embodiments of the present disclosure.

FIG. 19C illustrates an electronic device that displays an execution screen of an application and a graphic object corresponding to the application according to various embodiments of the present disclosure.

Referring to FIG. 19C, a controller of the electronic device 1900 may display the execution screen of a first application that is being executed through the first display. Further, the controller may control to display a preset graphic object corresponding to the first application on at least one of the displays (e.g., first and second curved displays or a second region of a flexible display) disposed on the side surfaces of the electronic device and the displays (e.g., the second display or the third region of the flexible display) disposed on the rear surface of the electronic device.

When a user executes a camera application, the controller may display the execution screen 1930 of the camera application through the first display. Further, the controller may display a graphic object corresponding to the camera application. A plurality of graphic objects may correspond to the camera application, and according to the operation of the camera application, a graphic object corresponding thereto may be determined.

For example, as illustrated in FIG. 19C, when the user photographs an image using the camera application, the controller may control to display a graphic object 1931 that corresponds to the photographing through the second display. Further, although not illustrated, the controller may also control to display an image acquired by the camera module included in the electronic device 1900 through the second display while the camera application is being executed.

Figure 20:
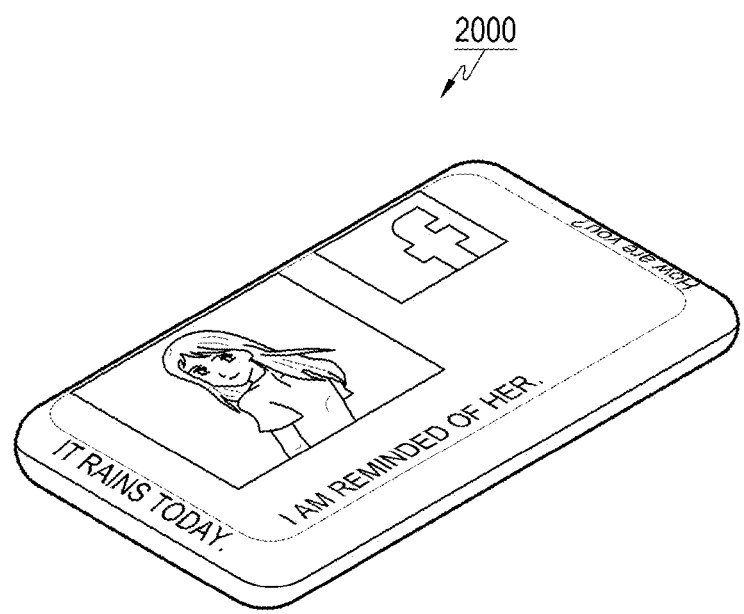
FIG. 20 illustrates an electronic device that displays social networking service (SNS) content and materials associated with the SNS content according to various embodiments of the present disclosure.

FIG. 20 illustrates an electronic device that displays social networking service (SNS) content and materials associated with the SNS content according to various embodiments of the present disclosure.

Referring to FIG. 20, a controller of an electronic device 2000 may control to display materials associated with contents posted in an SNS. For example, the controller may control to display materials associated with contents posted in an SNS that have recently been created by a user, or materials associated with one of the contents posted in the SNS that has been selected by the user, through at least one of the plurality of displays of the electronic device. At least some elements of the electronic device 2000 may be configured to be similar to, or the same as, those of the electronic devices 100, 200, 20, 10, 300, 400, 500, 600, 700, 800, 900, 1000, 1100, 1200, 1300, 1400, 1500, 1600, 1800, and 1900, which have been described above.

Figure 21:
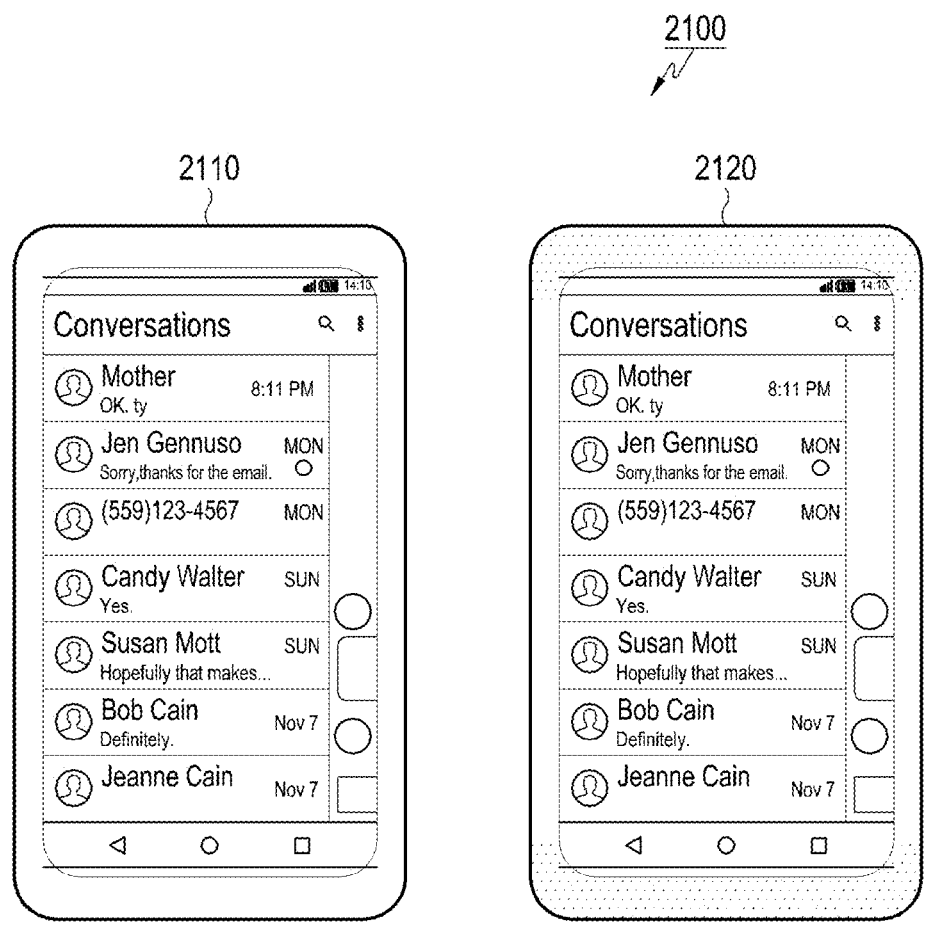
FIG. 21 is a view for explaining a method in which an electronic device performs display according to various embodiments of the present disclosure.

FIG. 21 is a view for explaining a method in which an electronic device performs display according to various embodiments of the present disclosure.

Referring to FIG. 21, a controller of an electronic device 2100 may display an execution screen 2110 of an application through a first display. However, in cases where the execution screen 2110 is displayed through the first display only, the execution screen may be displayed as if a display bezel is shown. At least some elements of the electronic device 2100 may be configured to be similar to, or the same as, those of the electronic devices 100, 200, 20, 10, 300, 400, 500, 600, 700, 800, 900, 1000, 1100, 1200, 1300, 1400, 1500, 1600, 1800, 1900, and 2000, which have been described above.

The controller may display a graphic object 2120 for hiding the display bezel through displays (e.g., first and second curved displays or a second region of a flexible display) that are disposed on the side surfaces of the electronic device 2100. As described above, the controller may display the graphic object 2120 through the displays disposed on the side surfaces of the electronic device 2100, thereby realizing an effect of hiding the bezel of the display.

Figure 22A:
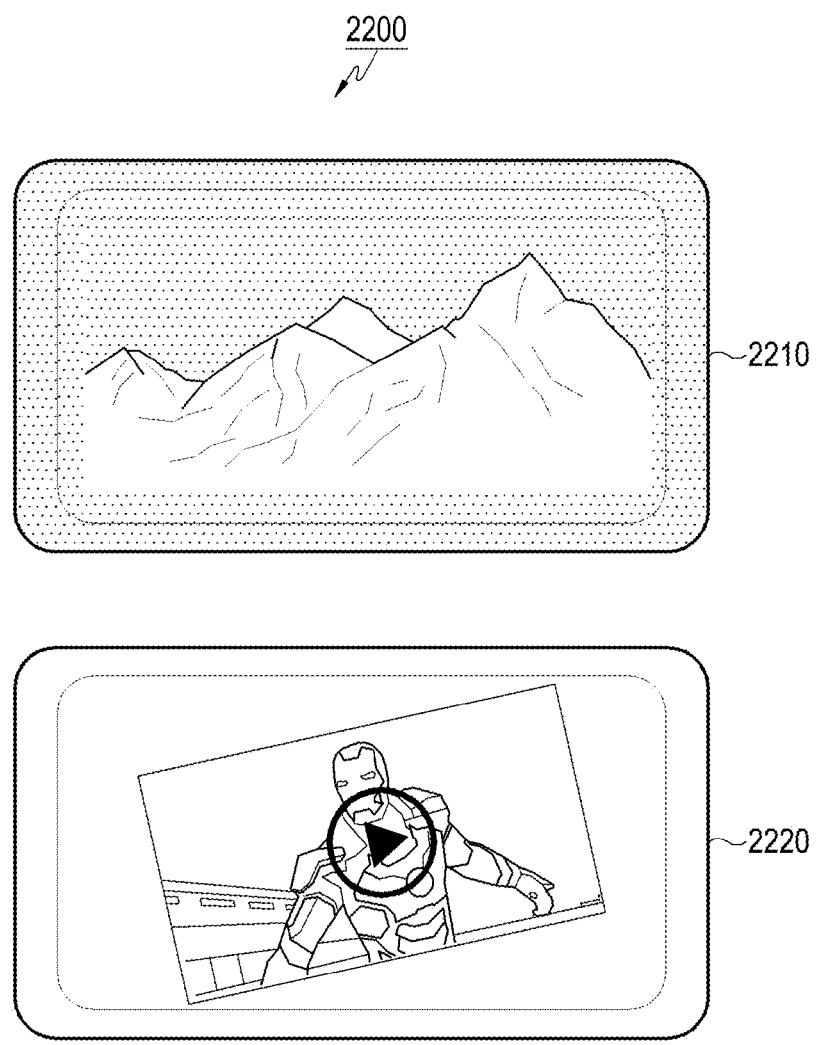
FIGS. 22A and 22B are views for explaining a method in which an electronic device performs display according to various embodiments of the present disclosure.
Figure 22B:
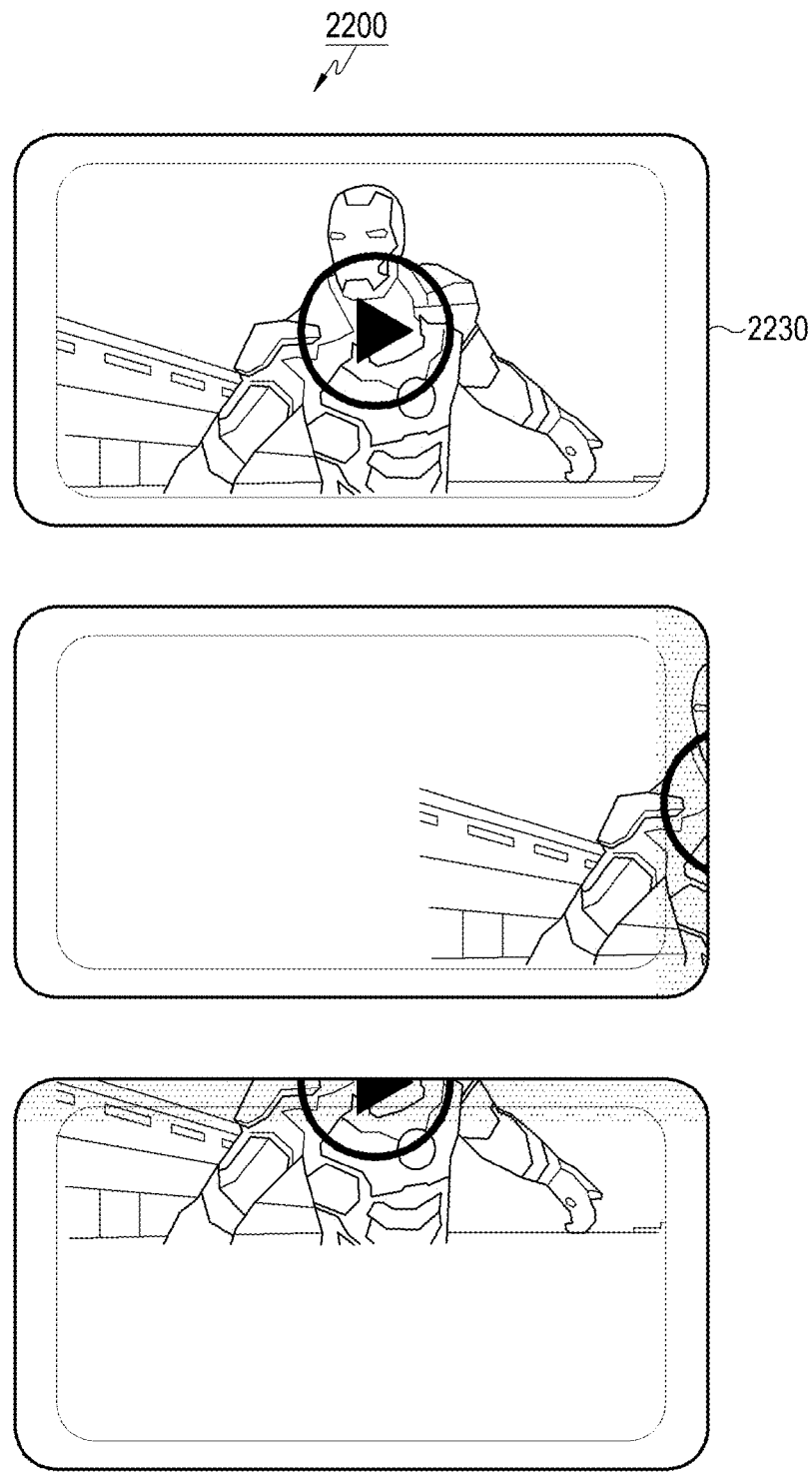

FIGS. 22A and 22B are views for explaining a method in which an electronic device performs display according to various embodiments of the present disclosure.

Referring to FIG. 22A, a controller of an electronic device 2200 may control to display the same color as that of a part of an image 2210, which is displayed through a first display, on displays (e.g., first and second curved displays or a second region of a flexible display) that are disposed on the side surfaces of the electronic device 2200. In this way, the first image may be displayed in an integrated form without a boundary. At least some elements of the electronic device 2200 may be configured to be similar to, or the same as, those of the electronic devices 100, 200, 20, 10, 300, 400, 500, 600, 700, 800, 900, 1000, 1100, 1200, 1300, 1400, 1500, 1600, 1800, 1900, 2000, and 2100, which have been described above.

Further, the controller may control to display content (an image, a video, etc.) displayed through the first display in a display direction according to a user's setting or the setting for the content, and not in a fixed display direction. Referring to FIG. 22A, a video 2220 reproduced through the first display may be displayed in a diagonal direction inclined at a preset angle, and not in the horizontal direction. The display direction may be changed according to a user input.

Referring to FIG. 22B, a method of displaying content over at least two of the plurality of displays included in the electronic device 2200 will be described. The controller may generally display a video 2230 to correspond to the first display.

Further, the controller may control to display the video over a plurality of displays according to the user's selection of the video and a drag and drop input. For example, the controller may control to display the video over the first display and a display disposed on the side surface of the electronic device 2200.

As described above, according to the user's input, the controller may display content using all the displays included in the electronic device 2200 without being limited to the region of the first display. Accordingly, the user may move the displayed content to the upper, lower, left, or right region without being limited to the first display. In addition, when using a multi-screen, the user may also freely move and use split screens by using all the displays included in the electronic device 2200 without any limitation on the split-screen.

According to an embodiment of the present disclosure, the electronic device may further include a piezoelectric film sensor that generates a voltage by an external pressure and a controller that controls to display a graphic object for receiving, from a user, an input for selecting the on/off of the electronic device by using the generated voltage on at least one of the first to third displays while the electronic device is turned off.

According to an embodiment of the present disclosure, the electronic device may further include at least one first sensor that detects the state information of the electronic device, wherein the controller may determine the state in which the electronic device has been placed by using the state information of the electronic device, determine at least one display that is to display the graphic object among the first to third displays based on the determination result, and display the graphic object on the determined at least one display.

According to an embodiment of the present disclosure, the electronic device may further include a sensor that detects a user's hold, and a controller that releases a low-power state of the electronic device when the user's hold is detected while the electronic device is in the low-power state.

According to an embodiment of the present disclosure, the electronic device may further include a memory that stores a plurality of graphic objects for representing weather, and a controller that selects a first graphic object corresponding to weather information acquired from an external server from the plurality of graphic objects and controls to display the selected first graphic object on at least one of the first to third displays.

According to an embodiment of the present disclosure, the electronic device may further include at least one first sensor that detects the state information of the electronic device, at least one second sensor that detects the state information of the user, and a controller that identifies the user's hand with which the user holds the electronic device through the touch panel, determines at least one display that is to display the state information of the user among the first to third displays based on the identification result and the state information of the electronic device, and displays the state information of the user on the determined at least one display.

According to an embodiment of the present disclosure, the controller may determine a first region within the determined at least one display, where the state information of the user is to be displayed, on the basis of the state information of the electronic device, and may display the state information of the user in the determined first region.

According to an embodiment of the present disclosure, the electronic device may further include a memory that stores a plurality of graphic objects for representing surrounding environments and a controller that selects a first graphic object corresponding to color information for a surrounding environment of the electronic device that is detected through the camera module from the plurality of graphic objects and controls to display the selected first graphic object on at least one of the first to third displays.

According to an embodiment of the present disclosure the electronic device may further include a microphone, and the controller may select the first graphic object from the plurality of graphic objects by additionally using sound information detected through the microphone.

According to an embodiment of the present disclosure, the electronic device may further include a proximity sensor that determines whether a user accesses the electronic device, and a controller that controls to display a preset graphic object on at least one of the first to third displays when the user's access to the electronic device is determined through the proximity sensor.

According to an embodiment of the present disclosure, the electronic device may further include a controller that controls to display, on the first or second display, a first image selected by a user, an image photographed through the camera module, or a first icon selected by the user, and controls to display, on the third display, a thumbnail image for the remaining images other than the first image, an image previously photographed through the camera module, or the remaining icons other than the first icon.

According to an embodiment of the present disclosure, the electronic device may further include at least one second sensor that detects the state information of the user, and a controller that controls to display the state information of the user on the first or second display and controls to display a graphic object for representing a relation between preset reference information on the user's state and the state information of the user on the third display.

According to an embodiment of the present disclosure, the electronic device may further include a controller that controls to move a first image displayed on the first display to the second and third displays based on a user's touch input received through the touch panel.

According to an embodiment of the present disclosure, the electronic device may further include at least one first sensor that detects the state information of the electronic device, and a controller that controls to reproduce the first content selected by a user on the first display and displays information on the first content on the second display when it is determined that the state in which the electronic device has been placed is changed on the basis of the state information of the electronic device.

According to an embodiment of the present disclosure, the controller may stop reproducing the first content when it is determined that the state in which the electronic device has been placed is changed.

According to an embodiment of the present disclosure, the electronic device may further include a controller that controls to display the execution screen of a first application on the first display and to display a present graphic object corresponding to the first application on the second and third displays.

According to an embodiment of the present disclosure, the electronic device may further include a controller that controls to display the first content on the first display in a display direction determined based on a user input or the setting for the first content.

According to an embodiment of the present disclosure, the electronic device may further include a controller that controls to display the first content over at least two of the first to third displays based on a user input or the setting for the first content.

According to an embodiment of the present disclosure, the electronic device may further include a memory that stores a user's pattern of usage according to the time or the location of the electronic device, and a controller that controls to execute a first application corresponding to at least one of the time and location identified by the electronic device, or to display the first information based on the user's pattern of usage.

Figure 23:
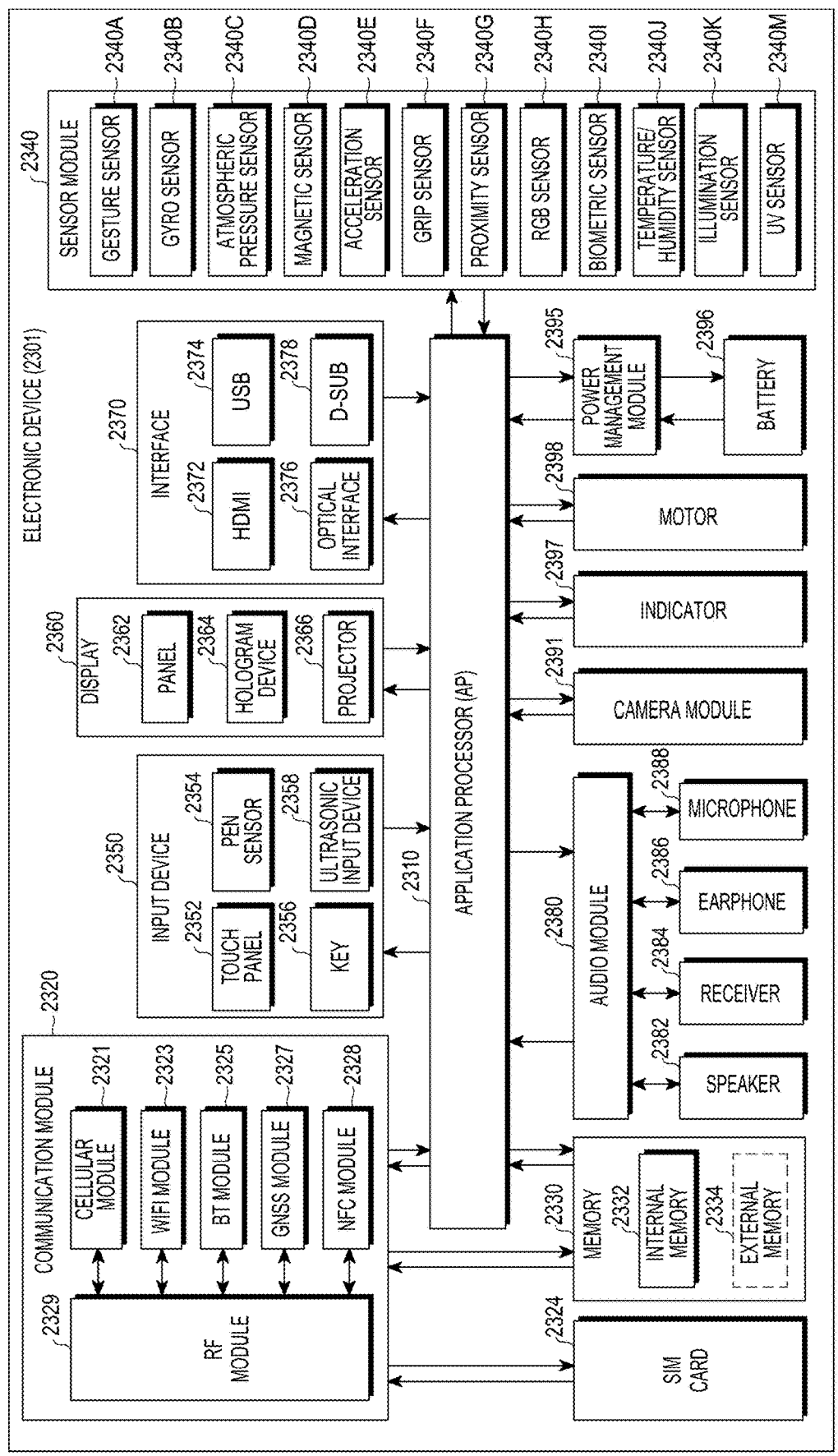
FIG. 23 is a block diagram of an electronic device according to various embodiments of the present disclosure.

FIG. 23 is a block diagram of an electronic device according to various embodiments of the present disclosure.

Referring to FIG. 23, an electronic device 2301 may include, for example, the entirety or a part of the electronic device 100 illustrated in FIG. 1. The electronic device 2301 may include at least one processor (e.g., an AP) 2310, a communication module 2320, a Subscriber Identification Module (SIM) 2324, a memory 2330, a sensor module 2340, an input device 2350, a display 2360, an interface 2370, an audio module 2380, a camera module 2391, a power management module 2395, a battery 2396, an indicator 2397, and a motor 2398.

For example, the processor 2310 may control a plurality of hardware or software elements connected thereto by driving an OS or application programs, and may perform various types of data processing and operations. The processor 2310 may be implemented by, for example, a system on chip (SoC). According to an embodiment, the processor 2310 may further include a graphics processing unit (GPU) and/or an image signal processor. The processor 2310 may also include at least some (e.g., a cellular module 2321) of the elements illustrated in FIG. 23. The processor 2310 may load, into a volatile memory, instructions or data received from at least one (e.g., a non-volatile memory) of the other elements, process the loaded instructions or data, and store various types of data in a non-volatile memory.

The communication module 2320 may have the same, or a similar, configuration to the communication interface 170 of FIG. 1. The communication module 2320 may include, for example, the cellular module 2321, a WiFi module 2323, a Bluetooth module 2325, a GNSS module 2327 (e.g., a GPS module, a Glonass module, a Beidou module, or a Galileo module), an NFC module 2328, and a radio frequency (RF) module 2329.

The cellular module 2321 may provide, for example, a voice call, a video call, a text message service, an Internet service, etc. through a communication network.

According to an embodiment of the present disclosure, the cellular module 2321 may distinguish and authenticate the electronic device 2301 within a communication network by using the SIM 2324 (e.g., a SIM card).

According to an embodiment of the present disclosure, the cellular module 2321 may perform at least some of the functions that the processor 2310 may provide. According to an embodiment of the present disclosure, the cellular module 2321 may include a CP.

The WiFi module 2323, the Bluetooth module 2325, the GNSS module 2327, or the NFC module 2328 may include, for example, a processor that processes data transmitted and received through the corresponding module. According to an embodiment, at least some (e.g., two or more) of the cellular module 2321, the WiFi module 2323, the Bluetooth module 2325, the GNSS module 2327, and the NFC module 2328 may be included in one integrated chip (IC) or IC package.

The RF module 2329 may transmit/receive, for example, a communication signal (e.g., an RF signal). The RF module 2329 may include, for example, a transceiver, a power amplifier module (PAM), a frequency filter, a low noise amplifier (LNA), an antenna, etc.

According to another embodiment of the present disclosure, at least one of the cellular module 2321, the WiFi module 2323, the Bluetooth module 2325, the GNSS module 2327, and the NFC module 2328 may transmit and receive an RF signal through a separate RF module.

The SIM 2324 may include, for example, a card that includes a SIM and/or an embedded SIM, and may contain unique identification information (e.g., an integrated circuit card identifier (ICCID)) or subscriber information (e.g., an international mobile subscriber identity (IMSI)).

The memory 2330 (e.g., the memory 130) may include, for example, an internal memory 2332 or an external memory 2334. The internal memory 2332 may include at least one of, for example, a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 2334 may further include a flash drive, for example, a compact flash (CF), a secure digital (SD), a micro-SD, a mini-SD, an eXtreme digital (xD), a multi-media card (MMC), a memory stick, etc. The external memory 2334 may be functionally and/or physically connected to the electronic device 2301 through various interfaces.

The sensor module 2340, for example, may measure a physical quantity or detect the operating state of the electronic device 2301 and may convert the measured or detected information into an electrical signal. The sensor module 2340 may include at least one of, for example, a gesture sensor 2340A, a gyro sensor 2340B, an atmospheric pressure sensor 2340C, a magnetic sensor 2340D, an acceleration sensor 2340E, a grip sensor 2340F, a proximity sensor 2340G, a color sensor 2340H (e.g., a red, green, blue (RGB) sensor), a biometric sensor 2340I, a temperature/humidity sensor 2340J, an illumination sensor 2340K, and a ultraviolet (UV) sensor 2340M. Additionally or alternatively, the sensor module 2340 may include, for example, an E-nose sensor, an electromyography (EMG) sensor, an electroencephalogram (EEG) sensor, an electrocardiogram (ECG) sensor, an IR sensor, an iris sensor, and/or a fingerprint sensor. The sensor module 2340 may further include a control circuit for controlling one or more sensors included therein. In some embodiments, the electronic device 2301 may further include a processor configured to control the sensor module 2340 as a part of, or separately from, the processor 2310 and may control the sensor module 2340 while the processor 2310 is in a sleep state.

The input device 2350 may include, for example, a touch panel 2352, a (digital) pen sensor 2354, a key 2356, or an ultrasonic input device 2358. The touch panel 2352 may use at least one of, for example, a capacitive type, a resistive type, an IR type, and an ultrasonic type. According to one of the various embodiments of the present disclosure, the touch panel 2352 may also further include a control circuit. The touch panel 2352 may further include a tactile layer to provide a tactile reaction to a user.

The (digital) pen sensor 2354 may include, for example, a recognition sheet that is a part of the touch panel, or is separate from the touch panel. The key 2356 may include, for example, a physical button, an optical key, or a keypad. The ultrasonic input device 2358 may detect ultrasonic waves generated by an input tool through a microphone (e.g., the microphone 2388) and may identify data corresponding to the detected ultrasonic waves.

The display 2360 (e.g., the display 160) may include a panel 2362, a hologram device 2364, or a projector 2366. The panel 2362 may include the same, or a similar, configuration to the display 160 illustrated in FIG. 1. The panel 2362 may be implemented to be, for example, flexible, transparent, or wearable. The panel 2362 and the touch panel 2352 may be implemented as a single module. The hologram device 2364 may show a three dimensional image in the air by using interference of light. The projector 2366 may display an image by projecting light onto a screen. The screen may be located, for example, in the interior of, or on the exterior of, the electronic device 2301.

According to an embodiment of the present disclosure, the display 2360 may further include a control circuit for controlling the panel 2362, the hologram device 2364, or the projector 2366.

The interface 2370 may include, for example, an HDMI 2372, a USB 2374, an optical interface 2376, or a D-subminiature (D-sub) 2378. The interface 2370 may be included in, for example, the communication interface 170 illustrated in FIG. 1. Additionally or alternatively, the interface 2370 may include, for example, a mobile high-definition link (MHL) interface, a SD card/MMC interface, or an infrared data association (IrDA) standard interface.

The audio module 2380, for example, may convert a sound into an electrical signal, and vice versa. At least some elements of the audio module 2380 may be included in, for example, the input/output interface 150 illustrated in FIG. 1. The audio module 2380 may process sound information that is input or output through, for example, a speaker 2382, a receiver 2384, earphones 2386, the microphone 2388, etc.

The camera module 2391 is a device that can photograph a still image and a dynamic image.

According to an embodiment of the present disclosure, the camera module 291 may include one or more image sensors (e.g., a front sensor or a back sensor), a lens, an image signal processor (ISP), or a flash (e.g., an LED or a xenon lamp).

The power management module 2395 may manage, for example, the power of the electronic device 2301. According to an embodiment, the power management module 2395 may include a power management integrated circuit (PMIC), a charger IC, or a battery or fuel gauge. The PMIC may use a wired and/or wireless charging method. Examples of the wireless charging method may include a magnetic resonance method, a magnetic induction method, an EM wave method, etc. Additional circuits (e.g., a coil loop, a resonance circuit, a rectifier, etc.) for wireless charging may be further included. The battery gauge may measure, for example, the residual quantity of the battery 2396, and a voltage, a current, or a temperature while charging. The battery 2396 may include, for example, a rechargeable battery or a solar battery.

The indicator 2397 may indicate a particular state (e.g., a booting state, a message state, a charging state, etc.) of the electronic device 2301 or a part thereof (e.g., the processor 120). The motor 2398 may convert an electrical signal into a mechanical vibration and may generate a vibration, a haptic effect, etc. Although not illustrated, the electronic device 2301 may include a processing unit (e.g., a GPU) for mobile TV support. The processing unit for mobile TV support may, for example, process media data according to a standard, such as digital multimedia broadcasting (DMB), digital video broadcasting (DVB), mediaFlo™, etc.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Further, some of the elements of the electronic device according to various embodiments of the present disclosure may be coupled to form a single entity while performing the same functions as those of the corresponding elements before the coupling.

Figure 24:
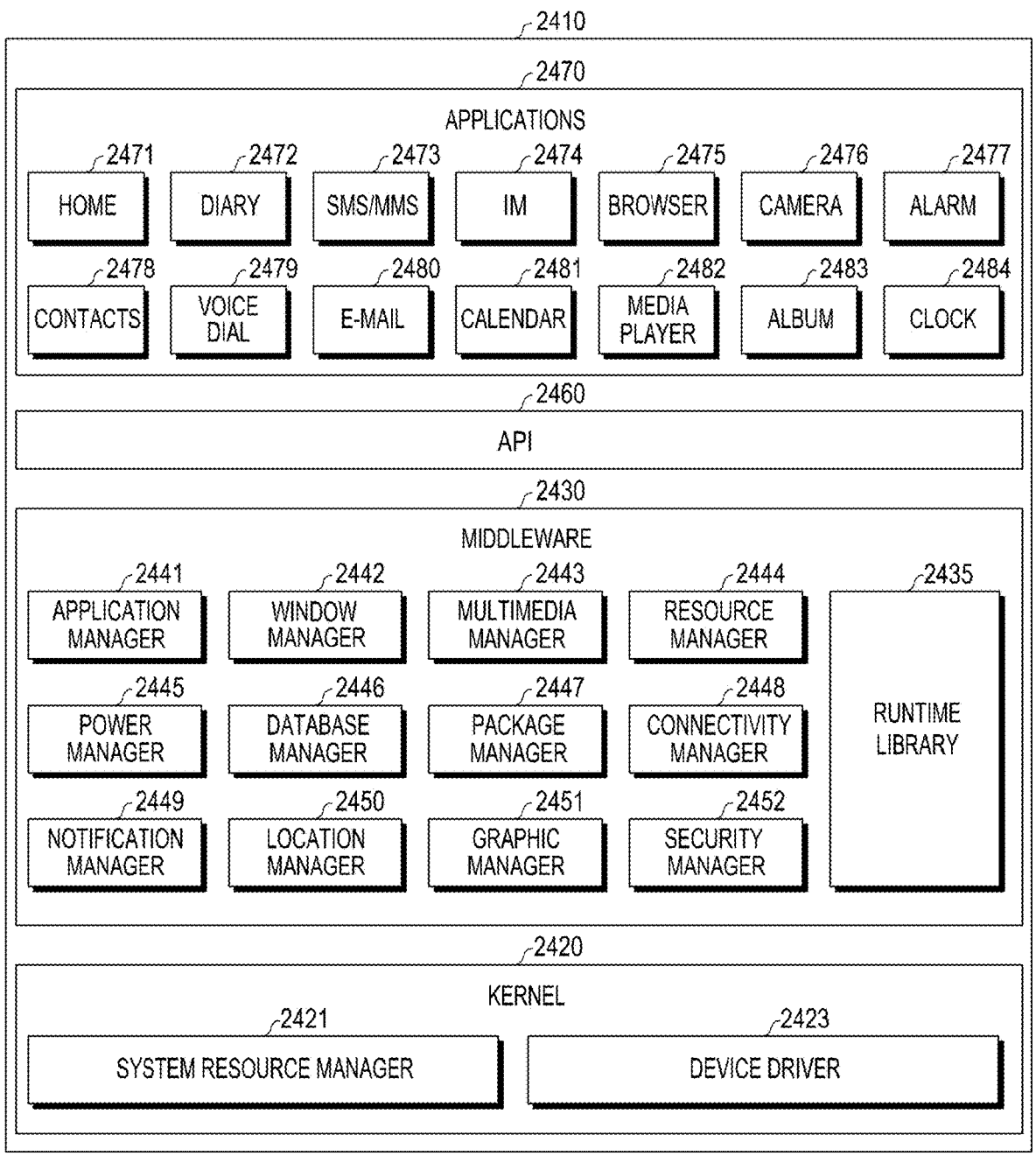
FIG. 24 is a block diagram of a program module according to various embodiments of the present disclosure.

FIG. 24 is a block diagram of a program module according to various embodiments of the present disclosure.

Referring to FIG. 24, a program module 2410 (e.g., the program 140) may include an OS that controls resources related to an electronic device (e.g., the electronic device 100) and/or various applications (e.g., the application programs 147) that are executed on the operating system. The OS may be, for example, Android, iOS, Windows, Symbian, Tizen, Bada, etc.

The program module 2410 may include a kernel 2420, middleware 2430, an API 2460, and/or applications 2470. At least a part of the program module 2410 may be preloaded on the electronic device, or may be downloaded from an external electronic device (e.g., the electronic device 102 or 104, or the server 106).

The kernel 2420 (e.g., the kernel 141) may include, for example, a system resource manager 2421 and/or a device driver 2423. The system resource manager 2421 may control, assign, or collect system resources. According to an embodiment, the system resource manager 2421 may include a process management unit, a memory management unit, or a file system management unit. The device driver 2423 may include, for example, a display driver, a camera driver, a Bluetooth driver, a shared memory driver, a USB driver, a keypad driver, a WiFi driver, an audio driver, or an inter-process communication (IPC) driver.

The middleware 2430 may, for example, provide functions commonly required by the applications 2470, or may provide various functions to the applications 2470 through the API 2460 so that the applications 2470 can efficiently use limited system resources within the electronic device.

According to an embodiment of the present disclosure, the middleware 2430 (e.g., the middleware 143) may include at least one of, for example, a runtime library 2435, an application manager 2441, a window manager 2442, a multimedia manager 2443, a resource manager 2444, a power manager 2445, a database manager 2446, a package manager 2447, a connectivity manager 2448, a notification manager 2449, a location manager 2450, a graphic manager 2451, and a security manager 2452.

The runtime library 2435 may include, for example, a library module that a compiler uses in order to add new functions through a programming language while the applications 2470 are executed. The runtime library 2435 may perform input/output management, memory management, a function for an arithmetic function, etc.

The application manager 2441 may manage, for example, the life cycle of at least one of the applications 2470. The window manager 2442 may manage graphical user interface (GUI) resources that are used on a screen. The multimedia manager 2443 may identify formats required for the reproduction of various media files and may encode or decode a media file using a codec suitable for the corresponding format. The resource manager 2444 may manage resources of at least one of the applications 2470, such as a source code, a memory, a storage space, etc.

The power manager 2445 may mange a battery or the power while operating together with, for example, a basic input/output system (BIOS), etc. and may provide power information, etc. required for the operation of the electronic device. The database manager 2446 may generate, search, or change a database to be used by at least one of the applications 2470. The package manager 2447 may manage the installation or the updating of an application that is distributed in the form of a package file.

The connectivity manager 2448 may manage a wireless connection, for example, WiFi, Bluetooth, etc. The notification manager 2449 may display, or notify of, events, such as an arrival message, an appointment, proximity notification, etc., in such a manner so as not to disturb a user. The location manager 2450 may manage the location information of the electronic device. The graphic manager 2451 may manage a graphic effect to be provided to a user and a user interface relating to the graphic effect. The security manager 2452 may provide all security functions required for system security or user authentication.

According to an embodiment of the present disclosure, when the electronic device (e.g., the electronic device 100) has a telephone call function, the middleware 2430 may further include a telephony manager for managing a voice call function or a video call function of the electronic device.

The middleware 2430 may include a middleware module that forms combinations of various functions of the above described elements. The middleware 2430 may provide specialized modules according to the types of operating systems in order to provide differentiated functions. According to an embodiment of the present disclosure, the middleware 2430 may dynamically delete some of the existing elements, or may add new elements.

The API 2460 (e.g., the API 145) is, for example, a set of API programming functions, and may be provided with different configurations according to operating systems. For example, in the case of Android or iOS, one API set may be provided to each platform, and in the case of Tizen, two or more API sets may be provided to each platform.

The applications 2470 (e.g., the application programs 147) may include, for example, one or more applications that can provide functions, such as home 2471, dialer 2472, short message service (SMS)/multimedia messaging service (MMS) 2473, instant message (IM) 2474, browser 2475, camera 2476, alarm 2477, contacts 2478, voice dial 2479, e-mail 2480, calendar 2481, media player 2482, album 2483, clock 2484, health care (e.g., measuring exercise quantity or blood sugar), or providing environment information (e.g., atmospheric pressure, humidity, temperature information, etc.).

According to an embodiment of the present disclosure, the applications 2470 may include an application (hereinafter, referred to as an "information exchange application" for the convenience of description) that supports information exchange between the electronic device (e.g., the electronic device 100) and an external electronic device (e.g., the electronic device 102 or 104). The information exchange application may include, for example, a notification relay application for forwarding specific information to an external electronic device, or a device management application for managing an external electronic device.

For example, the notification relay application may include a function of forwarding, to an external electronic device (e.g., the electronic device 102 or 104), notification information generated from the other applications of the electronic device (e.g., the SMS/MMS application, the e-mail application, the health care application, the environmental information application, etc.). According to an embodiment of the present disclosure, the notification relay application, for example, may receive notification information from an external electronic device and may provide the received notification information to a user.

For example, the device management application may manage (e.g., install, delete, or update) at least one function of an external electronic device (e.g., the electronic device 102 or 104) that communicates with the electronic device (e.g., a function of turning on/off the external electronic device itself (or some components thereof) or a function of adjusting the brightness (or resolution) of a display), applications that operate in the external electronic device, or services provided by the external electronic device (e.g., a telephone call service, a message service, etc.).

According to an embodiment of the present disclosure, the applications 2470 may include applications (e.g., a health care application of a mobile medical appliance, etc.) that are specified according to attributes of an external electronic device (e.g., the electronic device 102 or 104). According to an embodiment of the present disclosure, the applications 2470 may include an application received from an external electronic device (e.g., the server 106, or the electronic device 102 or 104). According to an embodiment of the present disclosure, the applications 2470 may include a preloaded application or a third party application that may be downloaded from a server. Names of the elements of the program module 2410, according to the above-described embodiments of the present disclosure, may change depending on the type of OS.

According to various embodiments of the present disclosure, at least some of the program module 2410 may be implemented in software, firmware, hardware, or a combination of two or more thereof. At least some of the program module 2410 may be implemented (e.g., executed) by, for example, the processor (e.g., the processor 120). At least some of the program module 2410 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc ROM (CD-ROM)

and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing comprising a first surface, a second surface opposite to the first surface, and a third surface formed of a side surface that encloses the space between the first and second surfaces, wherein each of the first to third surfaces includes a material capable of transmitting light;
   a first display disposed in the housing adjacent to the first surface;
   a second display disposed in the housing adjacent to the second surface; and
   a third display disposed in the housing adjacent to a whole of the third surface and extending from an edge of the first display to an edge of the second display;
   a piezoelectric film sensor configured to generate a voltage by an external pressure; and
   a controller configured to display a graphic object for receiving, from a user, an input for turning on/off of the electronic device by using the voltage generated by the piezoelectric film sensor, on at least one of the first display, the second display, and the third display while the electronic device is turned off,
   wherein the first to third displays are disposed to substantially provide a display region to a whole surface of the housing.

2. The electronic device of claim 1, wherein the material comprises at least one of a glass material and a polymer material.

3. The electronic device of claim 1, further comprising:
   a processor configured to:
      control the first to third displays, and
      determine to display one piece of content using at least two of the first to third displays; and
   a memory.

4. The electronic device of claim 1, wherein a bent portion of the side surface of the housing is bent from the edge of the first display toward the edge of the second display.

5. The electronic device of claim 4,
   wherein a bent portion of the third display conforms with the bent portion of the side surface of the housing, and
   wherein the bent portion of the third display contains an organic light-emitting diode (OLED).

6. The electronic device of claim 1,
   wherein the first display comprises one of a liquid crystal display (LCD), a light-emitting diode (LED) display, an organic LED (OLED) display, a micro electro mechanical systems (MEMS) display, and an electronic paper display, and
   wherein the second display comprises one of an e-ink display, a color display, an LED display, and an OLED display.

7. The electronic device of claim 1, wherein the housing comprises a solar film material.

8. The electronic device of claim 1, further comprising a printed circuit board disposed between the first to third displays, the printed circuit board comprising:
   first and second connectors electrically connected to the first and second displays and mounted on the printed circuit board,
   a plurality of support columns attached to the first to third display to support the printed circuit board,
   the plurality of support columns comprise a first support column connected to a first end of the printed circuit board and a second support column connected to a second end opposite to the first end, and
   first and second support members that support bent portions of the first and second displays on upper and lower portions of the first and second support columns.

9. The electronic device of claim 1, further comprising:
   a first body part and a first housing that surrounds the exterior of the first display;
   a second body part disposed on a rear surface of the first display and a second housing that surrounds the exterior of the second display; and
   a touch panel provided inside the first and second displays,
   wherein the first body part slides relative to the second body part to open/close a camera module embedded in a rear surface of the first body part.

10. The electronic device of claim 1, further comprising:
    a first sensor configured to detect state information of the electronic device,
    a second sensor configured to detect state information of the user; and
    wherein the controller is further configured to:
       identify the user's hand that holds the electronic device through a touch panel,
       determine at least one of the first to third displays to display the state information of the user based on the user's hand that holds the electronic device and the state information of the electronic device, and
       display the state information of the user on the determined at least one of the first to third displays,
    wherein the state information of the user is displayed in a first region within the determined at least one of the first to third displays, and
    wherein the first region is determined based on the state information of the electronic device.

11. The electronic device of claim 1, further comprising:
    a memory configured to store a plurality of graphic objects for representing surrounding environments;
    a camera module configured to detect color information from a surrounding environment of the electronic device;
    a microphone configured to detect sound information from the surrounding environment of the electronic device; and wherein the controller is further configured to:
  select a first graphic object corresponding to at least one of the color information, the sound information and weather information acquired from an external server, from the plurality of graphic objects, and
  display the first graphic object on at least one of the first to third displays.

12. The electronic device of claim 1, further comprising:
a camera module; and
wherein the controller is further configured to:
  display, on the first display or the second display, a first image selected by the user, an image photographed through the camera module, or a first icon selected by the user, and
  display, on the third display, a thumbnail image for the remaining images other than the first image, an image previously photographed through the camera module, or the remaining icons other than the first icon.

13. The electronic device of claim 1, further comprising:
a first sensor configured to detect state information of the electronic device; and
wherein the controller is further configured to:
  display first content selected by the user on the first display,
  display information related to the first content on the second display when a state of the electronic device changes based on the state information of the electronic device, and
  stop displaying the first content when the state of the electronic device changes.

14. An electronic device comprising:
a housing comprising a first surface, a second surface opposite to the first surface, and a third surface formed of a side surface that surrounds the space between the first and second surfaces, wherein each of the first to third surfaces includes a material capable of transmitting light;
a first display disposed in the housing adjacent to the first surface;
a second display disposed in the housing adjacent to the second surface;
a first curved display provided on opposite ends of the first display and disposed in the housing;
a second curved display provided on opposite ends of the second display and overlapping the first curved display disposed in the housing;
a touch panel disposed inside the first display, the second display, the first curved display, and the second curved display;
a piezoelectric film sensor configured to generate a voltage by an external pressure; and
a controller configured to display a graphic object for receiving, from a user, an input for turning on/off of the electronic device by using the voltage generated by the piezoelectric film sensor, on at least one of the first display, the second display, the first curved display, and the second curved display while the electronic device is turned off,
wherein the first curved display and the second curved display are disposed in the housing adjacent to a whole of the third surface,
wherein the first display, the second display, the first curved display, and the second curved display are disposed to substantially provide a display region to a whole surface of the housing, and
wherein the first display and the second display overlap and the first curved display and the second curved display overlap.

15. The electronic device of claim 14, wherein one of a color, a transparency, and a gradation is included in the portion where the first curved display and the second curved display overlap.

16. An electronic device comprising:
a housing including a first surface, a second surface opposite to the first surface, and a third surface formed of a side surface that surrounds the space between the first and second surfaces, wherein the first to third surfaces are formed of a material capable of transmitting light;
a flexible display disposed in the housing and substantially surrounding a whole exterior of a touch panel;
a piezoelectric film sensor configured to generate a voltage by an external pressure; and
a controller configured to display a graphic object for receiving, from a user, an input for turning on/off of the electronic device by using the voltage generated by the piezoelectric film sensor, on the flexible display while the electronic device is turned off,
wherein the flexible display is disposed in the housing adjacent to a whole of the third surface, and
wherein the flexible display is disposed to substantially provide a display region to a whole surface of the housing.

17. The electronic device of claim 16, wherein the flexible display comprises a tubular flexible display.

18. An electronic device comprising:
a housing including a first surface, a second surface opposite to the first surface, and a third surface formed of a side surface that surrounds the space between the first and second surfaces, wherein the first to third surfaces are formed of a material capable of transmitting light;
a first display disposed in the housing;
a second display disposed on a rear surface of the first display in the housing;
a plurality of third displays provided around the first display and the second display in the housing and connecting the first display to the second displays;
a plurality of semispherical displays provided on corners of the first display, the second display, and the plurality of third displays in the housing;
a touch panel provided inside the first display, the second display, the plurality of third displays, and the plurality of semispherical displays;
a piezoelectric film sensor configured to generate a voltage by an external pressure; and
a controller configured to display a graphic object for receiving, from a user, an input for turning on/off of the electronic device by using the voltage generated by the piezoelectric film sensor, on at least one of the first display, the second display, the plurality of third displays, and the plurality of semispherical displays while the electronic device is turned off,
wherein the plurality of third displays and the plurality of semispherical displays are disposed in the housing adjacent to a whole of the third surface, and
wherein the first display, the second display, the plurality of third displays, and the plurality of semispherical displays are disposed to substantially provide a display region to a whole surface of the housing.

19. The electronic device of claim 18,
wherein the plurality of third displays comprise first to fourth curved displays,
wherein the first curved display and the second curved display are coupled to left and right ends of the first and second displays,
wherein the third curved display and the fourth curved display are coupled to upper and lower ends of the first and second displays,
wherein the plurality of semispherical displays comprise a first semispherical display and a second semispherical display,
wherein the first semispherical display is coupled to ends of the first curved display and the second curved display,
wherein the first semispherical display is coupled to opposite ends of the third curved display,
wherein the second semispherical display is coupled to the other ends of the first curved display and the second curved display, and
wherein the second semispherical display is coupled to opposite ends of the fourth curved display.

20. The electronic device of claim 18, wherein the plurality of third displays comprise a trapezoidal display.

21. An electronic device comprising:
an oval housing including a first surface, a second surface opposite to the first surface, and a third surface formed of a side surface that surrounds the space between the first and second surfaces, wherein the first to third surfaces are formed of a material capable of transmitting light;
a first oval display disposed in the oval housing and surrounding a whole exterior of a touch panel;
a plurality of second oval displays provided on opposite ends of the first oval display in the oval housing;
a piezoelectric film sensor configured to generate a voltage by an external pressure; and
a controller configured to display a graphic object for receiving, from a user, an input for turning on/off of the electronic device by using the voltage generated by the piezoelectric film sensor, on at least one of the first oval display and the plurality of second oval displays while the electronic device is turned off,
wherein the first and second oval displays are disposed to substantially provide a display region to a whole surface of the oval housing.

22. The electronic device of claim 21, wherein the first oval display comprises a flexible display to surround the exterior of the second oval displays.

23. The electronic device of claim 1, wherein the first display, the second display, and the third display are different structures.

* * * * *